(12) United States Patent
Hikosaka et al.

(10) Patent No.: US 8,519,082 B2
(45) Date of Patent: Aug. 27, 2013

(54) POLYCARBONATE COPOLYMER, COATING LIQUID USING SAME, AND ELECTROPHOTOGRAPHIC PHOTOSENSITIVE BODY

(75) Inventors: Takaaki Hikosaka, Sodegaura (JP); Hideyuki Miyamoto, Tokyo (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/261,105

(22) PCT Filed: Jun. 25, 2010

(86) PCT No.: PCT/JP2010/060887
§ 371 (c)(1), (2), (4) Date: Dec. 23, 2011

(87) PCT Pub. No.: WO2010/150885
PCT Pub. Date: Dec. 29, 2010

(65) Prior Publication Data
US 2012/0100474 A1    Apr. 26, 2012

(30) Foreign Application Priority Data

Jun. 26, 2009 (JP) ................. 2009-152977
Jun. 26, 2009 (JP) ................. 2009-152978
Jun. 26, 2009 (JP) ................. 2009-152979
Jun. 26, 2009 (JP) ................. 2009-152980

(51) Int. Cl.
*C08G 64/00* (2006.01)
*C08G 63/02* (2006.01)

(52) U.S. Cl.
USPC .................................. 528/196; 528/198

(58) Field of Classification Search
USPC ............... 430/69; 524/588, 611; 528/196, 528/198, 201, 204
See application file for complete search history.

(56) References Cited

U.S. PATENT DOCUMENTS

| 4,638,077 A | 1/1987 | Brunelle et al. |
| 5,213,924 A | 5/1993 | Sakamoto |
| 5,876,892 A | 3/1999 | Fujimori et al. |
| 6,191,249 B1 | 2/2001 | Tanaka et al. |
| 2007/0213498 A1 | 9/2007 | Mahood |
| 2010/0048851 A1 | 2/2010 | Miyake et al. |
| 2012/0245388 A1* | 9/2012 | Tohyama et al. ............. 564/218 |

FOREIGN PATENT DOCUMENTS

| CN | 101432336 A | 5/2009 |
| JP | 62-500784 A | 2/1987 |
| JP | 02-219820 A | 9/1990 |
| JP | 04-179961 A | 6/1992 |
| JP | 05-070582 A | 3/1993 |
| JP | 05-080548 A | 4/1993 |
| JP | 06-136108 A | 5/1994 |
| JP | 08-027068 A | 1/1996 |
| JP | 09-268226 A | 10/1997 |
| JP | 11-065137 A | 3/1999 |
| JP | 11-172003 A | 6/1999 |
| JP | 2001-206943 A | 7/2001 |
| JP | 2004-354759 A | 12/2004 |
| JP | 2005-139339 A | 6/2005 |
| WO | WO 2007/064678 A1 | 6/2007 |
| WO | WO 2007/106279 A2 | 9/2007 |
| WO | WO 2008/038608 A1 | 4/2008 |
| WO | WO 2008/136521 A1 | 11/2008 |

OTHER PUBLICATIONS

First Notification of Reason for Rejection Chinese Application No. 2010800280799 dated Jan. 18, 2013.

* cited by examiner

*Primary Examiner* — Terressa Boykin
(74) *Attorney, Agent, or Firm* — Foley & Lardner LLP

(57) ABSTRACT

A polycarbonate copolymer includes a repeating unit represented by a formula (1) below and a molar copolymer composition represented by $Ar^2/(Ar^1+Ar^2)$ in a range of 25 mol % to 50 mol %.

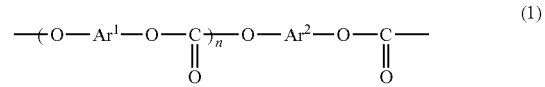

In the formula (1): $Ar^1$ and $Ar^2$ represent a divalent aromatic group; a chain end is terminated by a monovalent aromatic group or a monovalent fluorine-containing aliphatic group; and n represents an average repeating number of an $Ar^1$ block and is a numeral of 1.0 to 3.0, provided that $Ar^1$ and $Ar^2$ are not the same.

46 Claims, No Drawings

POLYCARBONATE COPOLYMER, COATING LIQUID USING SAME, AND ELECTROPHOTOGRAPHIC PHOTOSENSITIVE BODY

CROSS-REFERENCE TO RELATED APPLICATIONS

This application is a National Stage application of PCT/JP2010/060887, filed Jun. 25, 2010, which claims priority from Japanese applications JP 2009-152977, filed Jun. 26, 2009, JP 2009-152978, filed Jun. 26, 2009, JP 2009-152979, filed Jun. 26, 2009, and JP 2009-152980, filed Jun. 26, 2009.

TECHNICAL FIELD

The present invention relates to a polycarbonate copolymer, a coating liquid using the same and an electrophotographic photoreceptor.

BACKGROUND ART

Polycarbonate resins have been used as a material for molded products in various industrial fields because of its excellent mechanical characteristics, thermal characteristics and electrical characteristics. Recently, the polycarbonate resin has often been used in a field of a functional product requiring optical characteristics of the polycarbonate resin as well as the above characteristics. In accordance with such an expansion in application, the polycarbonate resin has been demanded to have a variety of performance.

The functional product is exemplified by an electrophotographic photoreceptor in which the polycarbonate resins are used as a binder resin for functional materials such as a charge generating material and a charge transporting material.

The electrophotographic photoreceptor has been demanded to have a predetermined sensitivity, electrical characteristics and optical characteristics in accordance with electrical photography process to be applied. A surface of a photosensitive layer of the electrophotographic photoreceptor is repeatedly subjected to operations such as corona electrification, toner development, transfer onto paper, cleaning and the like. Electrical and mechanical external-forces are applied on the surface of the photosensitive layer every time such operations are performed. Accordingly, the photosensitive layer provided on the surface of the electrophotographic photoreceptor is required to have durability against these external forces in order to maintain electrophotography image quality for a long period of time.

Moreover, since the electrophotographic photoreceptor is typically manufactured by dissolving a functional material and a binder resin in an organic solvent and film-casting the obtained solvent on a conductive substrate and the like, the electrophotographic photoreceptor is required to have solubility in the organic solvent and stability of the obtained solvent.

Traditionally, a polycarbonate resin using, for instance, 2,2-bis(4-hydroxyphenyl)propane (bisphenol A) and 1,1-bis (4-hydroxyphenyl)cyclohexane (bisphenol Z) as an ingredient have been used as a binder resin for an electrophotographic photoreceptor. However, such a polycarbonate resin is insufficient to satisfy durability such as wear resistance. In view of the above, various techniques have been used in response to such demands. A copolymerized polycarbonate has been known as one of effective techniques (see, for instance, Patent Literatures 1 to 3).

A resin disclosed in Patent Literature 1 includes a polycarbonate copolymer manufactured by copolymerizing a component having a biphenol skeleton that contributes to wear resistance with a component having a bisphenol Z skeleton that contributes to solubility. This polycarbonate copolymer is proved to have a wear resistance superior to that of a bisphenol-Z polycarbonate homopolymer.

Patent Literature 2 discloses an alternating copolymerized polycarbonate of bisphenol A and biphenol. The alternating copolymerized polycarbonate, in which a ratio of biphenol per copolymer is increased, is produced from an oligomer of a small number of repeating units as a starting material. A copolymerization ratio of biphenol contained in the alternating copolymer is 50 mol %.

Patent Literature 3 discloses technique for manufacturing a bischloroformate compound by reacting, for instance, bisphenol A and bisphenol Z with phosgene.

CITATION LIST

Patent Literatures

Patent Literature 1: JP-A-4-179961
Patent Literature 2: JP-A-5-70582
Patent Literature 3: JP-A-8-027068

SUMMARY OF THE INVENTION

Problems to be Solved by the Invention

In the aforementioned polycarbonate copolymer disclosed in Patent Literature 1, a content of a biphenol component, which contributes to improvement in wear resistance, is approximately 23 mol % at most. This is because oligomers (ingredient) having a chloroformate group at a molecule end are specifically a dimer, a trimer and a tetramer.

In order to increase the content of the biphenol component, an attempt has been made to manufacture an oligomer of biphenol by the method described in Patent Literature. However, an insoluble component is deposited to cause failure in synthesis of the oligomer.

Moreover, in order to increase the content of the biphenol component, an attempt has been made to manufacture an oligomer of biphenol by an interfacial method and copolymerize bisphenol A or bisphenol Z with the oligomer, thereby Manufacturing a polycarbonate copolymer. However, an insoluble component is deposited during manufacturing the oligomer of biphenol to cause failure in synthesis thereof. Accordingly, manufacturing process cannot proceed to copolymerization of bisphenol A or bisphenol Z with the oligomer of biphenol. Alternatively, in order to increase the content of the biphenol component, biphenol is mixed with bisphenol A or bisphenol Z to manufacture an oligomer by the interfacial method. Then, the oligomer is polymerized to provide a polycarbonate copolymer. In such a case, a solution obtained by dissolving the obtained polymer in an organic solvent is whitened.

Further, in order to increase the content of the biphenol component, an attempt has been made to manufacture the oligomer of biphenol by the interfacial method and copolymerize bisphenol A or 1,1-bis(4-hydroxyphenyl)ethane (bisphenol E) with the oligomer, thereby manufacturing a polycarbonate copolymer. However, an insoluble component is deposited during manufacturing the oligomer of biphenol to cause failure in synthesis thereof. Accordingly, manufacturing process cannot proceed to copolymerization of bisphenol A or bisphenol E with the oligomer of biphenol. Alternatively, in order to increase the content of the biphenol component, biphenol is mixed with bisphenol A or bisphenol E to manufacture an oligomer by the interfacial method. Then, the oligomer is polymerized to provide a polycarbonate copolymer. In such a case, a solution obtained by dissolving the obtained polymer in an organic solvent is whitened.

In order to increase the content of the biphenol component, an attempt has been made to manufacture the oligomer of biphenol by the interfacial method and copolymerize bisphenol A or 2,2-bis(3-methyl-4-hydroxyphenyl)propane (bisphenol C) with the oligomer, thereby manufacturing a polycarbonate copolymer. However, an insoluble component is deposited during manufacturing the oligomer of biphenol to cause failure in synthesis thereof. Accordingly, manufacturing process cannot proceed to copolymerization of bisphenol A or bisphenol C with the oligomer of biphenol. Alternatively, in order to increase the content of the biphenol component, biphenol is mixed with bisphenol A or bisphenol C to manufacture an oligomer by the interfacial method. Then, the oligomer is polymerized to provide a polycarbonate copolymer. In such a case, a solution obtained by dissolving the obtained polymer in an organic solvent is whitened.

When an electrophotographic photoreceptor is manufactured by using this solvent as a coating liquid, the electrophotographic photoreceptor exhibits poor electrical characteristics.

Since the polymer carbonate resin disclosed in Patent Literature 2 is not terminated, the polymer has a highly polar and highly reactive group (e.g. an OH group and a chloroformate group) at ends. For this reason, when the polycarbonate resin is used as, for instance, a binder resin of the electrophotographic photoreceptor, the polycarbonate resin unfavorably degrades a mixed functional material or deteriorates electrical characteristics.

Moreover, since the resin disclosed in Patent Literature 2 is an alternating copolymer having a less irregular structure, the obtained polymer is reported to be crystalline, thereby exhibiting poor solubility.

Patent Literature 3 only discloses that a bischloroformate compound is usable as an ingredient for a polycarbonate, but fails to disclose a structure of the polycarbonate resin.

An object of the invention is to provide a polycarbonate copolymer exhibiting excellent solubility in an organic solvent, excellent electrical characteristics and excellent wear resistance, a coating liquid using the same and an electrophotographic photoreceptor using the same.

Means for Solving the Problems

In order to solve the above problems, the present provides a polycarbonate copolymer, a coating liquid using the same and an electrophotographic photoreceptor.

[1] A polycarbonate copolymer according to an aspect of invention includes a repeating unit represented by a formula (1-1) below and a molar copolymer composition represented by $Ar^2/(Ar^1+Ar^2)$ in a range of 25 mol % to 50 mol %.

[Chemical Formula 1]

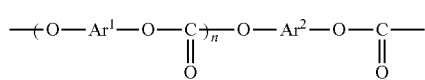

(1-1)

In the formula: $Ar^1$ and $Ar^2$ represent a divalent aromatic group; a chain end is terminated by a monovalent aromatic group or a monovalent fluorine-containing aliphatic group; n represents an average repeating number of an $Ar^1$ block and is a numeral of 1.0 to 3.0, provided that $Ar^1$ and $Ar^2$ are not the same.

Since n is an average value, n can be a numeral other than an integer.

[2] In the polycarbonate copolymer according to the above aspect of the invention, $Ar^1$ is a substituted or unsubstituted phenylene group, a substituted or unsubstituted naphthylene group, or a group represented by a formula (1-2) below.

[Chemical Formula 2]

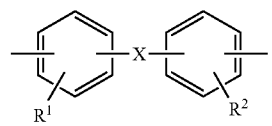

(1-2)

In the formula: $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms; $R^1$ and $R^2$ may be provided as a single aromatic ring with a plurality of groups, in which the plurality of groups may be the same or different; X represents a single bond, —O—, —CO—, —S—, —SO—, —SO$_2$—, —CR$^3$R$^4$— (in which $R^3$ and $R^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted arylene group having 6 to 12 carbon atoms and a divalent group represented by a formula (1-3) below.

[Chemical Formula 3]

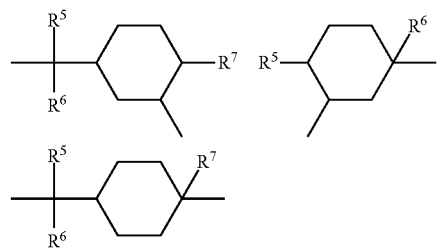

(1-3)

In the formula: $R^5$ to $R^7$ each represent the same groups for $R^1$ and $R^2$, or $R^5$ to $R^7$ each represent a group selected from an alkylidene arylene alkylidene group having 8 to 16 carbon atoms represented by a formula (1-4) below.

[Chemical Formula 4]

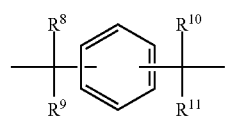

(1-4)

In the formula, $R^8$ to $R^{11}$ each represent the same groups for $R^1$ and $R^2$.

[3] In the polycarbonate copolymer according to the above aspect of the invention, $Ar^2$ is a substituted or unsubstituted phenylene group, a substituted or unsubstituted naphthylene group, or a group having the same structure as the structure represented by the formula (1-2) and has a skeleton different from that of $Ar^1$.

[4] In the polycarbonate copolymer according to the above aspect of the invention, it is preferable that the divalent aromatic group for $Ar^2$ further includes an organic siloxane modified phenylene group and a monovalent aromatic group at a chain end is an organic siloxane modified phenyl group, or it is preferable that the divalent aromatic group for $Ar^2$ further includes an organic siloxane modified phenylene group or a monovalent aromatic group at a chain end is an organic siloxane modified phenyl group.

[5] In the polycarbonate copolymer according to the above aspect of the invention, the divalent organic siloxane modified phenylene group is a group represented by a formula (1-2A) or (1-2B) below, and the monovalent organic siloxane modified phenyl group is a group represented by a formula (1-2C) below.

[Chemical Formula 5]

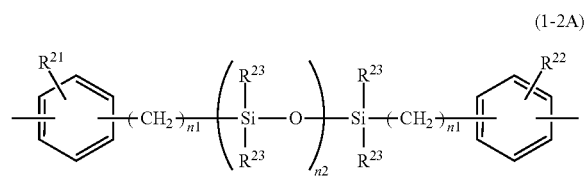

(1-2A)

In the formula (1-2A): $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms; $R^{23}$ independently represents a substituted or unsubstituted alkyl group having 1 to 12 carbon atoms or a substituted or unsubstituted aryl group having 6 to 12 carbon atoms; and n1 is an integer in a range of 2 to 4; and n2 is an integer in a range of 1 to 600.

[Chemical Formula 6]

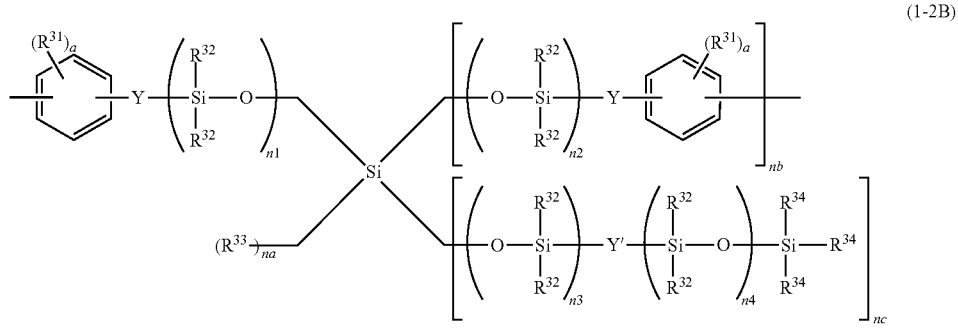

(1-2B)

In the formula (1-2B): $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms; $R^{32}$ independently represents a substituted or unsubstituted alkyl group having 1 to 12 carbon atoms or a substituted or unsubstituted aryl group having 6 to 12 carbon atoms; $R^{33}$ represents a monovalent hydrocarbon group having no aliphatic unsaturated bond, the monovalent hydrocarbon being the same or different; $R^{34}$ represents a monovalent hydrocarbon group having no aliphatic unsaturated bond, the monovalent hydrocarbon being the same or different; Y and Y' are an alkylene group having 2 or more carbon atoms, alkyleneoxyalkylene group or an oxygen atom; na is 0 or 1, nb is 1 or 2, and nc is 1 or 2, provided that na+nb+nc=3; n1 to n4 each are an integer in a range of 0 or more, provided that a sum of n1, n2, n3 and n4 is an integer in a range of 2 to 600 and a sum of n3 and n4 is an integer in a range of 1 or more; and a is an integer in a range of 0 to 4.

[Chemical Formula 7]

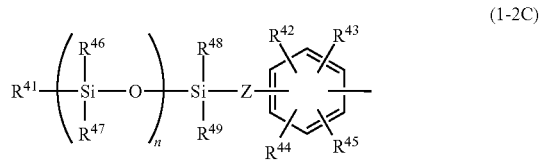

(1-2C)

Z is a hydrocarbon group having 2 to 6 carbon atoms; $R^{41}$ represents an aliphatic hydrocarbon group having 1 to 6 carbon atoms; $R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms; $R^{46}$ to $R^{49}$ independently represent a substituted or unsubstituted alkyl group having 1 to 12 carbon atoms and a substituted or unsubstituted aryl group having 6 to 12 carbon atoms; and n is an integer in a range of 2 to 600 and represents an average repeating unit number in case of molecular weight distribution.

[6] A polycarbonate copolymer according to another aspect of the invention includes a repeating unit represented by a formula (2-1) below and a molar copolymer composition represented by $Ar^2/(Ar^1+Ar^2)$ in a range of 25 mol % to 47 mol %.

[Chemical Formula 8]

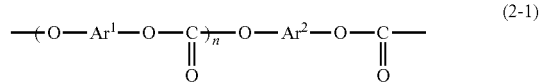

(2-1)

In the formula: $Ar^1$ is a group represented by a formula (2-2) below; $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane; and n represents an average repeating number of an $Ar^1$ block and is a numeral of 1.09 to 3.00.

[Chemical Formula 9]

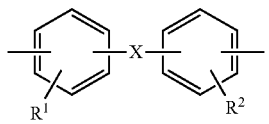

(2-2)

In the formula: $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms; $R^1$ and $R^2$ may be provided as a single aromatic ring with a plurality of groups, in which the plurality of groups may be the same or different; X represents a substituted or unsubstituted cycloalkylidene group having 5 to 20 carbon atoms, a substituted or unsubstituted bicyclo- or tricyclo-hydrocarbon-diyl group having 5 to 20 carbon atoms, or a group represented by a formula (2-3) below.

[Chemical Formula 10]

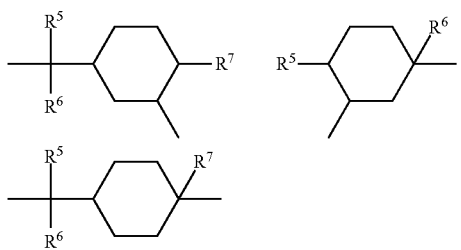

(2-3)

In the formula: $R^5$ to $R^7$ each independently represent a hydrogen atom, an alkyl group having 1 to 12 carbon atoms, a trifluoromethyl group or a substituted or unsubstituted aryl group having 6 to 12 carbon atoms.

[7] A polycarbonate copolymer according to still another aspect of the invention includes a repeating unit represented by a formula (3-1) below and a molar copolymer composition represented by $Ar^2/(Ar^1+Ar^2)$ in a range of 25 mol % to 47 mol %.

[Chemical Formula 11]

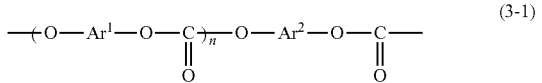

(3-1)

In the formula: $Ar^1$ is a group represented by a formula (3-2) below; $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane; and n representing an average repeating number of an $Ar^1$ block is in a range of 1.09 to 3.0.

[Chemical Formula 12]

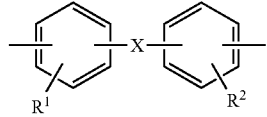

(3-2)

In the formula: $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms; $R^1$ and $R^2$ may be provided as a single aromatic ring with a plurality of groups, in which the plurality of groups may be the same or different; X represents a bonding group represented by $-CR^3R^4-$ in which $R^3$ to $R^4$ each independently represent a hydrogen atom, an alkyl group having 1 to 12 carbon atoms, a trifluoromethyl group or a substituted or unsubstituted aryl group having 6 to 12 carbon atoms, provided that $R^3$ and $R^4$ are not the same.

[8] A polycarbonate copolymer according to a further aspect of the invention includes a repeating unit represented by a formula (4-1) below and a molar copolymer composition represented by $Ar^2/(Ar^1+Ar^2)$ in a range of 25 mol % to 47 mol %.

[Chemical Formula 13]

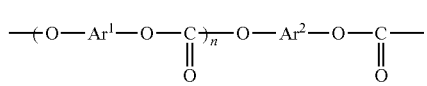

(4-1)

In the formula: $Ar^1$ is a group represented by a formula (4-2) below; $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane; and n representing an average repeating number of an $Ar^1$ block is in a range of 1.09 to 3.00.

[Chemical Formula 14]

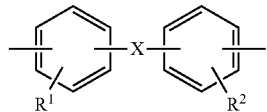

(4-2)

In the formula: $R^1$ and $R^2$ each represent a hydrogen atom, a halogen atom, an alkyl group having 1 to 12 carbon atoms or a substituted or unsubstituted aryl group having 6 to 12 carbon atoms; $R^1$ and $R^2$ may be provided as a single aromatic ring with a plurality of groups, in which the plurality of groups may be the same or different, provided that not all of $R^1$ and $R^2$ are hydrogen atoms; and X is $-CR^3R^4-$ (in which $R^3$ and $R^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a 1,8-menthanediyl group, a 2,8-menthanediyl group, a substituted or unsubstituted α,ω-alkylene group having 2 to 12 carbon atoms.

[9] The polycarbonate copolymer according to the above aspect of the invention further includes a divalent organic siloxane modified phenylene group for $Ar^2$.

[10] In the polycarbonate copolymer according to the above aspect of the invention, the divalent organic siloxane modified phenylene group is a group represented by a formula (2-2A) or (2-2B) below.

[Chemical Formula 15]

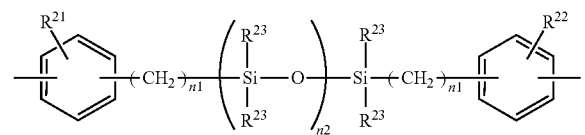

(2-2A)

In the formula (2-2A): $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms; $R^{23}$ independently represents a substituted or unsubstituted alkyl group having 1 to 12 carbon atoms or a substituted or unsubstituted aryl group having 6 to 12 carbon atoms; and n1 is an integer in a range of 2 to 4 and n2 is an integer in a range of 1 to 600.

[Chemical Formula 16]

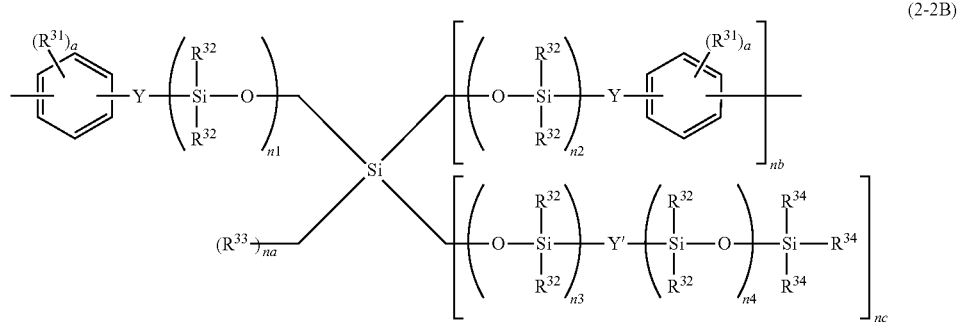

(2-2B)

In the formula (2-2B): $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms; $R^{32}$ independently represents a substituted or unsubstituted alkyl group having 1 to 12 carbon atoms or a substituted or unsubstituted aryl group having 6 to 12 carbon atoms; $R^{33}$ represents a monovalent hydrocarbon group having no aliphatic unsaturated bond, the monovalent hydrocarbon being the same or different; $R^{34}$ represents a monovalent hydrocarbon group having no aliphatic unsaturated bond, the monovalent hydrocarbon being the same or different; Y and Y' are an alkylene group having 2 or more carbon atoms, alkyleneoxyalkylene group or an oxygen atom; na is 0 or 1, nb is 1 or 2, and nc is 1 or 2, provided that na+nb+nc=3; n1 to n4 each are an integer in a range of 0 or more, provided that a sum of n1, n2, n3 and n4 is an integer in a range of 2 to 600 and a sum of n3 and n4 is an integer in a range of 1 or more; and a is an integer in a range of 0 to 4.

[11] In the polycarbonate copolymer according to the above aspect of the invention, a chain end is terminated by a monovalent aromatic group or a monovalent fluorine-containing aliphatic group.

[12] In the polycarbonate copolymer according to the above aspect of the invention, the monovalent aromatic group at the chain end is preferably a monovalent organic siloxane modified phenyl group.

[13] In the polycarbonate copolymer according to the above aspect of the invention, the monovalent organic siloxane modified phenyl group is a group represented by a formula (2-2C) below.

[Chemical Formula 17]

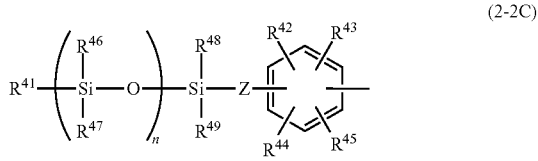

(2-2C)

Z is a hydrocarbon group having 2 to 6 carbon atoms; $R^{41}$ represents an aliphatic hydrocarbon group having 1 to 6 carbon atoms; $R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms; $R^{46}$ to $R^{49}$ independently represent a substituted or unsubstituted alkyl group having 1 to 12 carbon atoms and a substituted or unsubstituted aryl group having 6 to 12 carbon atoms; n is an integer in a range of 2 to 600 and represents an average repeating unit number in case of molecular weight distribution.

[14] In the polycarbonate copolymer according to the above aspect of the invention, an ingredient for the polycarbonate polymer is a bischloroformate oligomer represented by a formula (1-5) below and the bischloroformate oligomer has an average number of repeating units (n') in a range of 1.0 to 1.99.

[Chemical Formula 18]

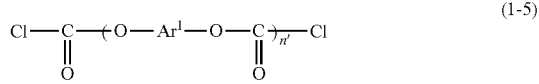
(1-5)

[15] In the polycarbonate copolymer according to the above aspect of the invention, $Ar^1$ represented by the formula (2-2) is a divalent group induced from a group selected from 1,1-bis(4-hydroxyphenyl)cyclohexane, 1,1-bis(4-hydroxyphenyl)cyclopentane, 1,1-bis(4-hydroxyphenyl)cyclododecane, 2,2-bis(4-hydroxyphenyl)adamantane, 1,3-bis(4-hydroxyphenyl)adamantane, 1,1-bis(4-hydroxyphenyl)-3,3,5-trimethylcyclohexane, and the group represented by the formula (2-3).

[16] In the polycarbonate copolymer according to the above aspect of the invention, $Ar^1$ represented by the formula (3-2) is a divalent group induced from a compound selected from selected from 1,1-bis(3-methyl-4-hydroxyphenyl)ethane, 1,1-bis(4-hydroxyphenyl)ethane, 2,2-bis(3-methyl-4-hydroxyphenyl)butane, 2,2-bis(4-hydroxyphenyl)butane, 1,1-bis(4-hydroxyphenyl)-1-phenylethane, and 1,1-bis(4-hydroxyphenyl)-1-phenylmethane.

[17] In the polycarbonate copolymer according to the above aspect of the invention, $Ar^1$ represented by the formula (4-2) is a divalent group induced from a compound selected from 1,1-bis(3-methyl-4-hydroxyphenyl)ethane, 2,2-bis(3-methyl-4-hydroxyphenyl)butane, 2,2-bis(3-methyl-4-hydroxyphenyl)propane, 2,2-bis(3-phenyl-4-hydroxyphenyl)propane, 1,1-bis(3-methyl-4-hydroxyphenyl)cyclohexane, and 1,1-bis(3-methyl-4-hydroxyphenyl)cyclopentane.

[18] In the polycarbonate copolymer according to the above aspect of the invention, when an amido compound is contained in the ingredient including bischloroformate oligomer represented by the formula (1-5), a content of the amido compound is determined based on a mass of nitrogen atoms contained in the ingredient comprising the bischloroformate oligomer and is 700 mass ppm or less based on a total mass of the ingredient comprising the bischloroformate oligomer except for a solvent.

[19] In the polycarbonate copolymer according to the above aspect of the invention, when the polycarbonate copolymer includes dialkylcarbamate chloride, a content of dialkylcarbamate chloride is 100 mass ppm or less based on a total mass of the polycarbonate copolymer.

[20] A coating liquid according to a still further aspect of the invention contains the polycarbonate copolymer according to the above aspect of the invention and an organic solvent.

[21] An electrophotographic photoreceptor according to a still further aspect of the invention includes a conductive substrate and a photosensitive layer on the conductive substrate, the photosensitive layer including the polycarbonate copolymer according to the above aspect of the invention as an ingredient.

With this arrangement, the polycarbonate copolymer includes, as a repeating unit, a unit induced from an oligomer having a small number of repeating units of a divalent phenol compound and a unit induced from a monomer of a divalent phenol compound having a different skeleton from the above divalent phenol compound, and has a molar copolymer composition represented by $Ar^2/(Ar^1+Ar^2)$ in a range of 25 mol % to 50 mol %. With this arrangement, the polycarobonate polymer has different characteristics of $Ar^1$ and $Ar^2$. Particularly, the polycarobonate polymer can prevent disadvantages (e.g. decrease in solubility in accordance with increase in crystallinity) caused by the presence of the repeating units of a plurality of $Ar^2$, thereby obtaining uniform characteristics.

For instance, the polycarbonate copolymer, which includes as a repeating unit a unit induced from an oligomer having a small number of repeating units of a divalent phenol compound having a skeleton contributing to a high solubility and a unit induced from a monomer of a divalent phenol compound, keeps a high solubility and stability to an organic solvent. Accordingly, a coating liquid using the polycarbonate copolymer is not whitened but is transparent. When the polycarbonate copolymer is used as a binder resin of a photosensitive layer of an electrophotographic photoreceptor, the electrophotographic photoreceptor is excellent in wear resistance.

With this arrangement, the polycarbonate copolymer includes, as a repeating unit, a unit induced from an oligomer having a small number of repeating units of a bisphenol compound having an alicyclic group in a main skeleton and a unit induced from a divalent phenol monomer having a specific structure of high crystallinity in a form of homopolymer, and has a molar copolymer composition represented by $Ar^2/(Ar^1+Ar^2)$ in a range of 25 mol % to 47 mol %. With this arrangement, the polycarbonate copolymer simultaneously exhibits a favorable solubility induced from an $Ar^1$ unit and a high wear resistance induced from an $Ar^2$ unit. Particularly, decrease in solubility caused by the presence of a repeating unit including a plurality of $Ar^2$ is prevented, thereby exhibiting a high solubility to the organic solvent of $Ar^1$ and a high wear resistance of $Ar^2$.

With this arrangement, the polycarbonate copolymer includes, as a repeating unit, a unit induced from an oligomer having a small number of repeating units of a bisphenol compound in which a bonding group for two phenylene groups is a methylene group having a substituent and the two substituents are not the same, and a unit induced from a divalent phenol monomer having a specific structure of high crystallinity in a form of homopolymer, and has a molar copolymer composition represented by $Ar^2/(Ar^1+Ar^2)$ in a range of 25 mol % to 47 mol %. With this arrangement, the polycarbonate copolymer exhibits different characteristics of $Ar^1$ and $Ar^2$. Particularly, decrease in solubility caused by presence of a repeating unit including a plurality of $Ar^2$ is prevented, thereby exhibiting a high solubility to the organic solvent of $Ar^1$ and a high wear resistance of $Ar^2$.

With this arrangement, the polycarbonate copolymer includes, as a repeating unit, a unit induced from an oligomer having a small number of repeating units of a bisphenol compound in which a bonding group for two phenylene groups has a specific structure and the phenylene groups have specific substituents, and a unit induced from a divalent phenol monomer having a specific structure of high crystallinity in a form of homopolymer, and has a molar copolymer composition represented by $Ar^2/(Ar^1+Ar^2)$ in a range of 25 mol % to 47 mol %. With this arrangement, the polycarbonate copolymer simultaneously exhibits a favorable solubility induced from an $Ar^1$ unit and a high wear resistance induced from an $Ar^2$ unit. Particularly, decrease in solubility caused by presence of a repeating unit including a plurality of $Ar^2$ is prevented, thereby exhibiting a high solubility to the organic solvent of $Ar^1$ and a high wear resistance of $Ar^2$.

Further, a chain end of the polycarbonate copolymer according to the above aspect of the invention is terminated. With this arrangement, when the polycarbonate copolymer is used as, for instance, a binder resin for an electrophotographic photoreceptor, the electrophotographic photoreceptor exhibits excellent electrical characteristics.

DESCRIPTION OF EXEMPLARY EMBODIMENTS

A polycarbonate copolymer (hereinafter, simply referred to as a "PC copolymer") according to the following exemplary embodiments, a coating liquid using the PC copolymer, and an electrophotographic photoreceptor using the coating liquid will be described in detail below.

First Exemplary Embodiment

A first exemplary embodiment of the invention will be described in detail below.

Structure of PC Copolymer

A PC copolymer according to this exemplary embodiment is a polycarbonate copolymer having a repeating unit represented by a formula (1-1) below and a molar copolymer composition represented by $Ar^2/(Ar^1+Ar^2)$ in a range of 25 mol % to 50 mol %.

[Chemical Formula 19]

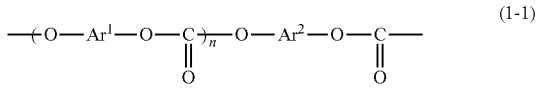

(1-1)

In the formula (1-1), $Ar^1$ and $Ar^2$ represent a divalent aromatic group. A chain end is terminated by a monovalent aromatic group or a monovalent fluorine-containing aliphatic group. n, which represents an average repeating number of an $Ar^1$ block, is a numeral of 1.0 to 3.0, provided that $Ar^1$ and $Ar^2$ are not the same.

The PC copolymer according to this exemplary embodiment is typically manufactured by forming an $Ar^1$ block and then reacting the $Ar^1$ block with a monomer having $Ar^2$ and a monovalent aromatic group or a monovalent fluorine-containing aliphatic group. Accordingly, n does not become a numeral of 1.0 or less. On the other hand, when n exceeds 3.0, the $Ar^1$ block becomes long, whereby a ratio of $Ar^2$ in the PC copolymer is decreased. When $Ar^2$ is a component that contributes to wear resistance, wear resistance is unfavorably decreased. n is favorably a numeral of 1.0 to 2.5.

In the PC copolymer according to this exemplary embodiment, the content of $Ar^2$ per monomer unit is automatically determined after the average number of repeating units of the $Ar^1$ block is determined. The average number of repeating units of the $Ar^1$ block is in a range of 1.0 to 3.0. The content of $Ar^2$ is in a range of 25 mol % to 50 mol %, preferably of 30 mol % to 48 mol %, more preferably 32 mol % to 47 mol %, particularly preferably 38 mol % to 45 mol %.

When $Ar^2$ exceeds 50 mol %, the OH group is liable to remain at the chain end of the manufactured PC copolymer. Accordingly, the resin may unfavorably be colored and cause decrease in charging volume and sensitivity in use as the binder resin for the electrophotographic photoreceptor.

When $Ar^2$ is less than 25 mol %, a ratio of one of the components forming the PC copolymer becomes extremely smaller than that of the other thereof. Accordingly, it becomes difficult to provide a copolymer having two different characteristics of respective $Ar^1$ and $Ar^2$. The aforementioned mol % is a value obtained when the molar copolymer composition represented by $Ar^2/(Ar^1+Ar^2)$ is represented by percentage.

As one way to provide the content of $Ar^2$ in the same range of 25 mol % to 50 mol % as described above, a block copolymer structured to have a single block for each of $Ar^1$ and $Ar^2$ has been known. Such a block copolymer can be obtained, for instance, by chemically bonding a polycarbonate block portion including $Ar^1$ to a polycarbonate block portion including $Ar^2$. However, as it can be recognized from an observation that the polymer thus obtained has peaks of glass transition temperature respectively corresponding to a value derived from the polycarbonate including $Ar^1$ and a value derived from the polycarbonate including $Ar^2$, it has been known that a copolymer having uniform characteristics cannot be obtained. For instance, when a unit contributing to expression of high crystallinity is used as $Ar^2$, the unit unfavorably causes whitening of the obtained PC copolymer in use as a coating liquid. In contrast, the PC copolymer according to this exemplary embodiment is excellent in capability of exhibiting uniform characteristics without substantially eminently exhibiting characteristics of $Ar^1$ homopolymer polycarbonate and $Ar^2$ homopolymer polycarbonate. For instance, in the PC copolymer according to this exemplary embodiment, the glass transition temperature derived from each monomer component is not observed, or, even when the glass transition temperature is observed, a peak thereof is very small. Thus, it is recognized that the PC copolymer according to this exemplary embodiment has uniform characteristics.

In the formula (1-1), $Ar^1$ represents a divalent aromatic group. $Ar^1$ may be formed only by the divalent aromatic group, or may include a group (e.g. an alkyl group) in addition to the aromatic group in a main chain. Examples of $Ar^1$ are a substituted or unsubstituted phenylene group and a substituted or unsubstituted naphthylene group. When $Ar^1$ is a phenylene group, the phenylene group is bonded to an oxygen atom of the formula (1-1) at one of 1,2-position, 1,3-position and 1-4-position. When $Ar^1$ is a naphthylene group, the naphthylene group is bondable to an oxygen atom of the formula (1-1) at one of 1 to 8-positions. Preferably, the naphthylene group is bonded at 2,7-position, 2,6-position, 1,4-position or 1,5-position.

When the phenylene group and the naphthylene group have a substituent, for instance, the substituent may be an alkyl group having 1 to 6 carbon atoms.

$Ar^1$ may also be a divalent group represented by a formula (1-2).

[Chemical Formula 20]

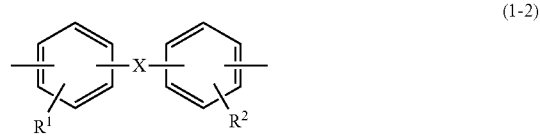

(1-2)

In the formula, $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms. $R^1$ and $R^2$ may be a plurality of groups for a single aromatic ring. In this case, the plurality of groups may be the same or different. X represents a single bond, —O—, —CO—, —S—, —SO—, —SO$_2$—, —CR$^3$R$^4$— (in which $R^3$ and $R^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted arylene group having 6 to 12 carbon atoms and a divalent group represented by a formula (1-3) below.

[Chemical Formula 21]

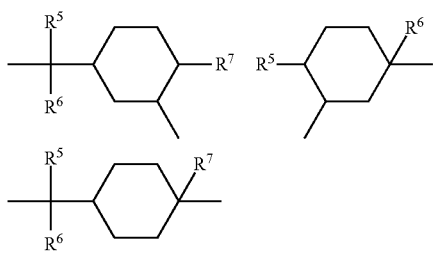

(1-3)

In the formula, $R^5$ to $R^7$ each represent the same groups for $R^1$ and $R^2$. Alternatively, $R^5$ to $R^7$ each represent a group selected from an alkylidene arylene alkylidene group having 8 to 16 carbon atoms represented by a formula (1-4) below.

[Chemical Formula 22]

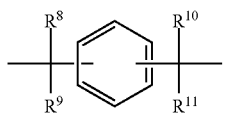

(1-4)

In the formula, $R^8$ to $R^{11}$ each represent the same groups for $R^1$ and $R^2$.

$R^1$ and $R^2$ are preferably a hydrogen atom and an alkyl group having 1 to 12 carbon atoms. These groups enable to provide more favorable wear resistance and electrical characteristics to the PC copolymer according to this exemplary embodiment.

X is preferably a single bond, —$CR^3R^4$— (in which $R^3$ and $R^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a substituted or unsubstituted 9,9-fluorenylidene group, a 1,8-menthanediyl group, a 2,8-menthanediyl group, a substituted or unsubstituted arylene group having 6 to 12 carbon atoms and the group represented by the formula (1-3). These groups enable to provide more favorable wear resistance and electrical characteristics to the PC copolymer according to this exemplary embodiment.

$R^3$ and $R^4$ are preferably a hydrogen atom, an alkyl group having 1 to 12 carbon atoms or a substituted or unsubstituted aryl group having 6 to 12 carbon atoms. These groups enable to provide more favorable wear resistance and electrical characteristics to the PC copolymer according to this exemplary embodiment.

Examples of the halogen atom forming $R^1$ and $R^2$ are a fluorine atom, a chlorine atom and a bromine atom.

The alkyl group having 1 to 12 carbon atoms which forms $R^1$, $R^2$, $R^3$ and $R^4$ is exemplified by a linear or branched alkyl group. Examples of the alkyl group are a methyl group, an ethyl group, propyl groups, butyl groups, pentyl groups and hexyl groups. Also, the alkyl group may be a cyclic alkyl group such as a cyclohexyl group. Further, a part or an entirety of the hydrogen atom in the alkyl group may be substituted by a halogen atom. Examples of substituents other than the halogen atom are a trifluoromethyl group, an aryl group having 6 to 12 carbon atoms, an alkoxy group having 1 to 12 carbon atoms and an aryloxy group having 6 to 12 carbon atoms. Examples of the alkyl group forming the substituents are the same groups as the above. Examples of the aryl group forming the substituents are the following groups.

The aryl group having 6 to 12 carbon atoms which forms $R^1$, $R^2$, $R^3$ and $R^4$ is exemplified by a phenyl group.

The above groups are examples for the alkoxy group having 1 to 12 carbon atoms which forms $R^1$ and $R^2$ and for the alkyl group and the aryl group which form the aryloxy group having 6 to 12 carbon atoms.

When the aryl group and the aryloxy group have a substituent in the above groups, for instance, the substituent may be an alkyl group having 1 to 6 carbon atoms. Examples of other substituents are a halogen atom and a trifluoromethyl group.

All of $R^1$ and $R^2$ may be a hydrogen atom. When a plurality of groups other than the hydrogen atom are present for $R^1$ and $R^2$, the plurality of groups may be the same or different.

Examples of the substituted or unsubstituted cycloalkylidene group having 5 to 20 carbon atoms or the substituted or unsubstituted bicyclo- or tricyclo-hydrocarbon-diyl group having 5 to 20 carbon atoms, which form X, are groups derived from cyclopentane, cyclohexane, cycloheptane, cyclooctane, cyclononane, cyclodecane, tricyclodecane, adamantane and dicyclopentadiene. A substituent for the cycloalkylidene group or the bicyclo- or tricyclo-hydrocarbon-diyl group is exemplified by an alkyl group having 1 to 6 carbon atoms. Not only a single substituent but a plurality of different substituents may be used.

The substituted or unsubstituted α,ω-alkylene group having 2 to 12 carbon atoms which forms X is exemplified by a linear or branched alkylene group. Examples of the alkylene group are a divalent group derived from ethane, propane and butane. Examples of a substituent for the α,ω-alkylene group include an aryl group having 6 to 12 carbon atoms and an aryl group having 6 to 12 carbon atoms.

The substituted or unsubstituted 9,9-fluorenylidene group, the 1,8-menthanediyl group and the 2,8-menthanediyl group, which form X, may be substituted by a substituent, examples of which includes an alkyl group having 1 to 6 carbon atoms and an aryl group having 6 to 12 carbon atoms.

The substituted or unsubstituted arylene group having 6 to 12 carbon atoms which forms X is exemplified by a phenylene group. Examples of a substituent for the arylene group include an alkyl group having 1 to 6 carbon atoms and an aryl group having 6 to 12 carbon atoms.

Examples of the alkyl group having 1 to 6 carbon atoms and the aryl group having 6 to 12 carbon atoms, which are the substituents in the above description for $R^1$, $R^2$, $R^3$ and $R^4$ and X, are the same as the groups for $R^1$, $R^2$, $R^3$ and $R^4$.

$Ar^2$ only needs to be a divalent aromatic group different from $Ar^1$. Accordingly, the same description for $Ar^1$ is applicable to $Ar^2$. $Ar^1$ and $Ar^2$ may be similar groups. However, when $Ar^1$ and $Ar^2$ are different in the fundamental structure, the PC copolymer may preferably exhibit synergistic effects derived from the respective groups.

When the PC copolymer according to this exemplary embodiment is used for the electrophotographic photoreceptor, preferable examples of $Ar^2$ are a substituted or unsubstituted phenylene group and a substituted or unsubstituted naphthylene group. A bonding position of $Ar^2$ with the substituent and an oxygen atom is the same as that in the description for $Ar^1$.

More preferably, the examples of the divalent aromatic group as $Ar^2$ further include a divalent organic siloxane modified phenylene group.

The divalent organic siloxane modified phenylene group is exemplified by a group represented by a formula (1-2A) below.

[Chemical Formula 23]

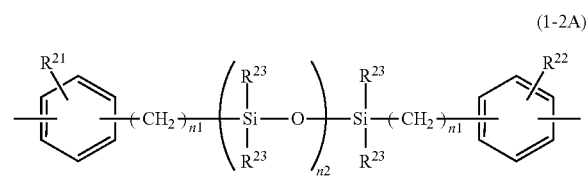

(1-2A)

In the formula (1-2A), $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms.

A chlorine atom is preferable as the halogen atom. Examples of the substituted or unsubstituted alkyl group having 1 to 12 carbon atoms, the substituted or unsubstituted alkoxy group having 1 to 12 carbon atoms and the substituted or unsubstituted aryl group having 6 to 12 carbon atoms are the same groups in the description for $R^1$ and $R^2$.

$R^{21}$ and $R^{22}$ are preferably a hydrogen atom or an alkoxy group having 1 to 3 carbon atoms. More preferably, $R^{21}$ and $R^{22}$ have the following specific structure.

$R^{23}$ is a substituted or unsubstituted alkyl group having 1 to 12 carbon atoms or a substituted or unsubstituted aryl group having 6 to 12 carbon atoms.

Examples of the substituted or unsubstituted alkyl group having 1 to 12 carbon atoms and the substituted or unsubstituted aryl group having 6 to 12 carbon atoms are the same groups in the description for $R^1$ and $R^2$. A phenyl group and a methyl group are preferable among the examples. n1 is an integer in a range of 2 to 4; and n2 is an integer in a range of 1 to 600.

The divalent organic siloxane modified phenylene group may be a group represented by a formula (1-2B) below.

In the formula (1-2B), $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms.

A chlorine atom is preferable as the halogen atom. Examples of the substituted or unsubstituted alkyl group having 1 to 12 carbon atoms, the substituted or unsubstituted alkoxy group having 1 to 12 carbon atoms and the substituted or unsubstituted aryl group having 6 to 12 carbon atoms are the same groups in the description for $R^1$ and $R^2$.

$R^{32}$ independently represents a substituted or unsubstituted alkyl group having 1 to 12 carbon atoms or a substituted or unsubstituted aryl group having 6 to 12 carbon atoms.

Examples of the substituted or unsubstituted alkyl group having 1 to 12 carbon atoms and the substituted or unsubstituted aryl group having 6 to 12 carbon atoms are the same groups in the description for $R^1$ and $R^2$. A phenyl group and a methyl group are preferable among the examples.

$R^{33}$ is a monovalent hydrocarbon group having no aliphatic unsaturated bond, the monovalent hydrocarbon group being the same or different.

Examples of the monovalent hydrocarbon group are a substituted or unsubstituted alkyl group having 1 to 12 carbon atoms and a substituted or unsubstituted aryl group having 6 to 12 carbon atoms. Among these, the alkyl group having 1 to 12 carbon atoms is preferable and the methyl group is particularly preferable.

$R^{34}$ is a monovalent hydrocarbon group having no aliphatic unsaturated bond, the monovalent hydrocarbon group being the same or different.

Examples of the monovalent hydrocarbon group are a substituted or unsubstituted alkyl group having 1 to 12 carbon atoms and a substituted or unsubstituted aryl group having 6 to 12 carbon atoms. Among these, the monovalent hydrocarbon group is preferably the alkyl group having 1 to 12 carbon atoms, particularly preferably, the methyl group.

Y and Y' are an alkylene group having 2 or more carbon atoms, alkyleneoxyalkylene group or an oxygen atom. Y and Y' are preferably an alkylene group having 2 to 10 carbon atoms, more preferably, a methylene group having 2 to 4 repeating units.

na is 0 or 1; nb is 1 or 2; and nc is 1 or 2, provided that na+nb+nc=3.

n1 to n4 each are an integer in a range of 0 or more, provided that a sum of n1, n2, n3 and n4 is an integer in a range of 2 to 600 and a sum of n3 and n4 is an integer in a range of 1 or more.

a is an integer in a range of 0 to 4. Preferably, a is 0 or 1.

[Chemical Formula 24]

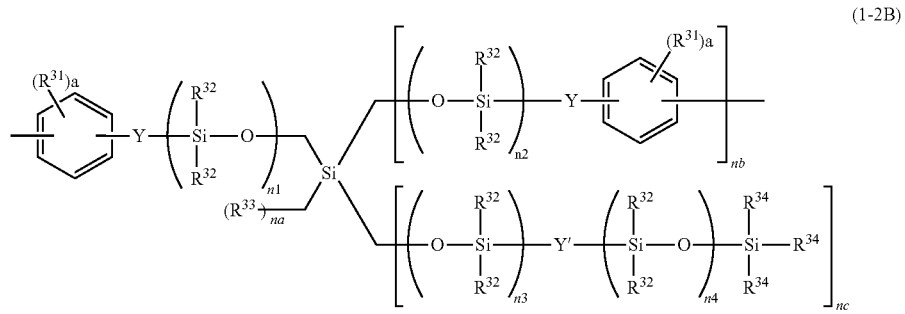

(1-2B)

In the electrophotographic photoreceptor by using the PC copolymer as a binder resin, surface energy is reduced by further including the divalent organic siloxane modified phenylene group as $Ar^2$, thereby reducing adherability of foreign substances. Specifically, foreign substances such as toner are prevented from adhering to the electrophotographic photoreceptor.

Specific examples of the divalent organic siloxane modified phenylene group are enumerated below.

[Chemical Formula 25]

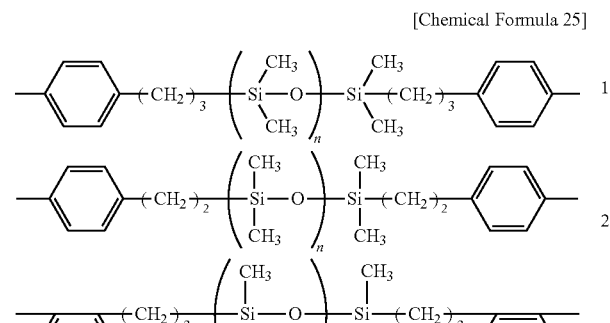

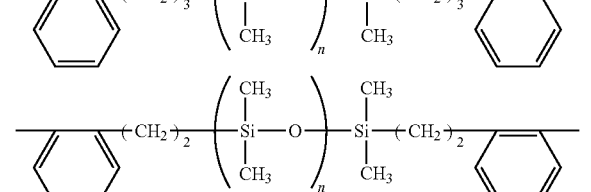

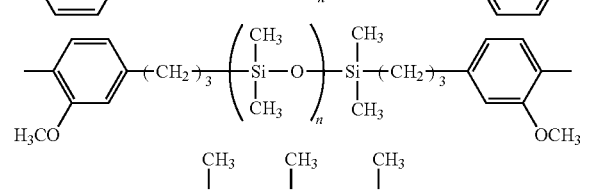

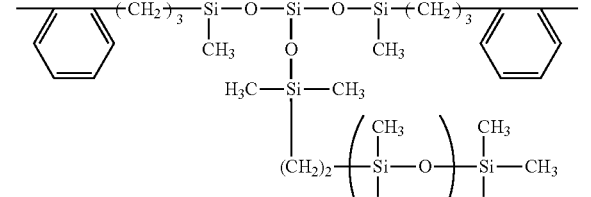

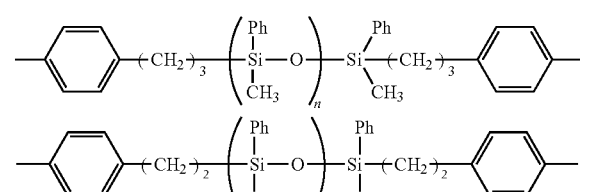

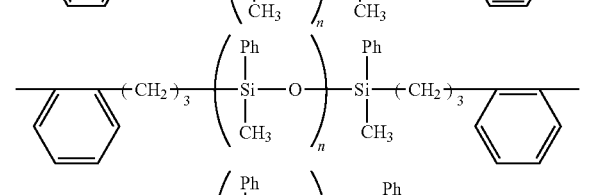

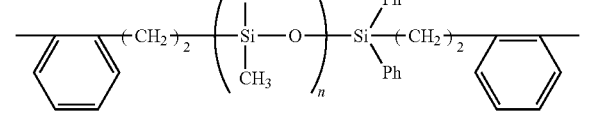

[Chemical Formula 26]

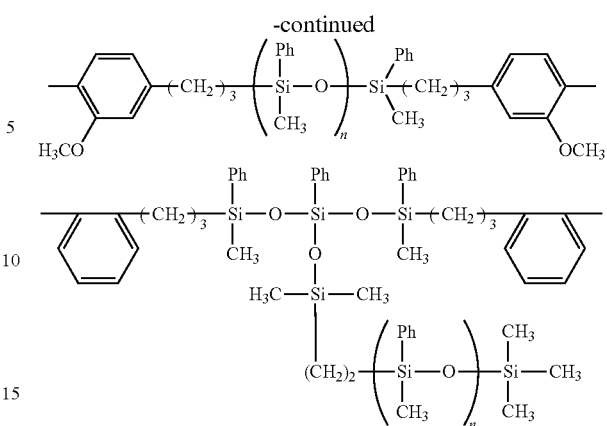

-continued

In the above formulae, the number (n) of the repeating units of an organic siloxylene group is preferably in a range of 1 to 600, more preferably in a range of 10 to 300, particularly preferably in a range of 20 to 200, most preferably in a range of 30 to 150.

When n is 600 or less, compatibility with the PC copolymer becomes favorable to complete the reaction in polymerization step. Accordingly, an unreacted organic siloxane modified phenol compound is prevented from remaining in the final PC copolymer, whereby the resin is not whitened to restrain increase in residual potential of the electrophotographic photoreceptor in use as a binder resin.

On the other hand, when n is 1 or more, surface energy is sufficiently given to the electrophotographic photoreceptor, which favorably prevents adhesion of foreign substances.

A ratio of the divalent organic siloxane modified phenylene group in the PC copolymer is in a range of 0.01 mass % to 50 mass %, preferably in a range of 0.1 mass % to 20 mass %, more preferably in a range of 0.5 mass % to 10 mass %, most preferably in a range of 1 mass % to 6 mass %.

In the ratio of 0.1 mass % or more, adhesion of foreign substances can be more favorably prevented. On the other hand, in the ratio of 50 mass % or less, the PC copolymer exhibits excellent wear resistance and sufficient mechanical strength and is favorably used as the electrophotographic photoreceptor.

A monovalent aromatic group or a monovalent fluorine-containing aliphatic group is at a chain end of the PC copolymer. The monovalent aromatic group may be a group containing an aromatic group. The monovalent fluorine-containing aliphatic group may be a group containing an aromatic group.

The aromatic group at the chain end is preferably an aryl group having 6 to 12 carbon atoms. Examples of the aryl group are a phenyl group and a biphenyl group. Examples of a substituent for the aromatic group and the alkyl group for the aromatic group are halogen atoms such as a fluorine atom, a chlorine atom and a bromine atom. A substituent for the aromatic group is exemplified by the alkyl group having 1 to 20 carbon atoms. This alkyl group may be a group substituted by a halogen atom as described above and a group substituted by an aryl group.

The monovalent fluorine-containing aliphatic group at the chain end is exemplified by a fluorine-containing alkyl group having 1 to 20 carbon atoms.

When the monovalent aromatic group is at the chain end, the monovalent aromatic group may be a monovalent organic siloxane modified phenyl group.

The monovalent organic siloxane modified phenyl group is exemplified by a group represented by a formula (1-2C) below.

[Chemical Formula 27]

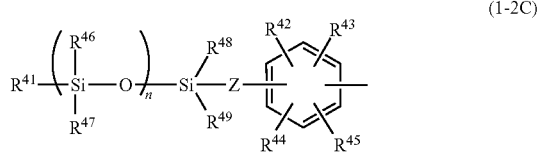

(1-2C)

Z is a hydrocarbon group having 2 to 6 carbon atoms. Z is preferably an alkylene group, more preferably, a methylene group having 2 to 4 repeating units.

$R^{41}$ is an aliphatic hydrocarbon group having 1 to 6 carbon atoms. $R^{41}$ is preferably an alkyl group having 1 to 6 carbon atoms.

$R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms.

$R^{46}$ to $R^{49}$ independently represent a substituted or unsubstituted alkyl group having 1 to 12 carbon atoms and a substituted or unsubstituted aryl group having 6 to 12 carbon atoms.

Examples of the substituted or unsubstituted alkyl group having 1 to 12 carbon atoms and the substituted or unsubstituted aryl group having 6 to 12 carbon atoms are the same groups in the description for $R^1$ and $R^2$. A phenyl group and a methyl group are preferable among the examples.

n is an integer in a range of 2 to 600 and represents an average number of repeating units in case of molecular weight distribution.

Examples of the monovalent organic siloxane modified phenyl group are enumerated below.

[Chemical Formula 28]

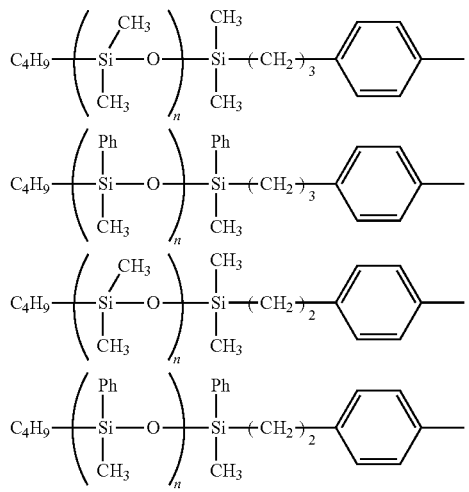

In the electrophotographic photoreceptor using the PC copolymer having the monovalent organic siloxane modified phenyl group as a binder resin, adhesion of foreign substances such as toner can be reduced.

A ratio of the monovalent organic siloxane modified phenyl group, the ratio being required for expressing the above effects, is in a range of 0.01 mass % to 50 mass % relative to the entire PC copolymer. The ratio of the monovalent organic siloxane modified phenyl group is more preferably in a range of 0.1 mass % to 20 mass %, particularly preferably in a range of 0.5 mass % to 10 mass %.

In the PC copolymer containing a unit derived from the divalent organic siloxane modified phenylene group in the main chain in addition to the monovalent organic siloxane modified phenyl group, this unit is added up together.

In a solution in which the PC copolymer according to this exemplary embodiment is dissolved in a solvent of methylene chloride at a concentration of 0.5 g/dl, the PC copolymer preferably exhibits reduced viscosity [$\eta_{SP}/C$] at 20 degrees C. in a range of 0.1 dl/g to 5 dl/g, more preferably 0.2 dl/g to 3 dl/g, particularly preferably 0.3 dl/g to 2.5 dl/g. When the reduced viscosity [$\eta_{sp}/C$] is less than 0.1 dl/g, wear resistance of the PC copolymer may be insufficient in use for the electrophotographic photoreceptor. When the reduced viscosity [$\eta_{sp}/C$] is more than 5 dl/g, coating viscosity of the PC copolymer may become too high for manufacturing a molded product (the electrophotographic photoreceptor and the like) from a coating liquid, so that productivity of the electrophotographic photoreceptor may be unfavorably lowered.

Manufacturing Method of PC Copolymer

The PC copolymer according to this exemplary embodiment is preferably a PC copolymer obtained by reacting a divalent phenol compound (a comonomer represented by a formula (1-6) below) and a monovalent phenol compound (a terminal terminator) in the presence of a base with a bischloroformate oligomer having a small number of repeating units represented by a formula (1-5) below. The PC copolymer having the average number of repeating units of the $Ar^1$ block in a range of 1.0 to 3.0 can be easily manufactured by using such oligomers.

[Chemical Formula 29]

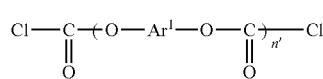

(1-5)

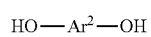

(1-6)

n' representing the average number of repeating units of the bischloroformate oligomer is different from n in the formula (1-1). In comparison between n and n', n is larger than n' as shown in Examples below. This is because, when the manufactured bischloroformate oligomer in which the $Ar^1$ block is formed reacts with a monomer including $Ar^2$ and chain ends, the bischloroformate group at the end of the $Ar^1$ oligomer may react with a base present in the reaction system to form a hydroxyl group, resulting in polycondensation of the hydroxyl group with another $Ar^1$ oligomer having chlorine at its end.

The average number of repeating units n' of the bischloroformate oligomer in the formula (1-5) is in a range of 1.0 to 1.99. The PC copolymer according to this exemplary embodiment is easily manufactured by using the bischloroformate oligomer having the average number of repeating units in a range of 1.0 to 1.99. A method for calculating the average number of repeating units is exemplified by a method described later in Examples.

The ingredient including the bischloroformate oligomer represented by the formula (1-5) may contain an amide compound as impurities. A content of the amide compound is calculated based on a mass of nitrogen atoms contained in the ingredient including the bischloroformate oligomer. When the solvent is removed from the solution including the ingredient to obtain solids, the content of the amide compound (the mass of nitrogen derived from the amide compound) is 700 mass ppm or less, preferably 400 mass ppm or less, more preferably 150 mass ppm or less, particularly preferably 80 mass ppm or less, most preferably 20 mass ppm or less based on the total mass of the ingredient including the bischloroformate oligomer.

When the content of the amide compound is 700 mass ppm or less, increase in residual potential of the electrophotographic photoreceptor can be restrained when the PC copolymer is used as a binder resin for the electrophotographic photoreceptor. The bischloroformate oligomer may be liquid as well as solids.

Examples of the amide compound are N,N,N',N'-tetraalkyl urea, N,N-dialkylcarbamate chloride such as N,N-diethylcarbamate chloride, N,N-dialkylcarbamate, a polymer of bisphenol-monochloroformate-monoalkylcarbamate and bisphenol-bisdialkylcarbamate.

When a large amount of an amine compound such as triethylamine is used for manufacturing the bischloroformate oligomer, the amine compound and the bischloroformate compound react with each other to occasionally form the amide compound as impurities.

However, as described above, the content of the amide compound can be decreased by increasing the number of times for cleaning the bischloroformate oligomer.

In addition to water-cleaning, distillation, an adsorbent and column fractionation are applied for reducing the content of the amide compound.

The PC copolymer obtained using the ingredient including the bischloroformate oligomer may also contain dialkylcarbamate chloride such as diethylcarbamate chloride as impurities. In this case, the content of dialkylcarbamate chloride is 100 mass ppm or less, preferably 50 mass ppm or less, more preferably 40 mass ppm or less based on the total mass of the PC copolymer.

When the content of dialkylcarbamate chloride is 100 mass ppm or less, increase in residual potential is restrained to provide an electrophotographic photoreceptor having a favorable sensitivity.

A manufacturing method of the PC copolymer according to this exemplary embodiment is exemplified by polycondensation of the bischloroformate oligomer induced from the divalent phenol compound represented by a formula (1-7) below and a divalent phenol compound represented by a formula (1-8) below, the divalent phenol compound having a skeleton different from that of the above divalent phenol compound, in the presence of a phenolic compound or fluorine-containing alcohol compound for terminating the chain end group.

HO—Ar¹—OH (1-7)

HO—Ar²—OH (1-8)

Examples of the monomer (the divalent phenol compound) represented by the formulae (1-7) and (1-8) are a biphenol compound and a bisphenol compound. Examples of the biphenol compound are 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphenol and 3,3'-dibutyl-4,4'-biphenol. Among the above, 4,4'-biphenol is preferable in that less colored PC copolymer is provided. In addition, when the biphenol is applied to the PC copolymer for the electrophotographic photoreceptor, wear resistance the PC copolymer is enhanced. One of the above may be singularly used, or two or more of the above may be used together.

Examples of the bisphenol compound are 1,1-bis(3-methyl-4-hydroxyphenyl)ethane, 9,9-bis(3-phenyl-4-hydroxyphenyl) fluorene, bis(4-hydroxyphenyl)methane, 1,1-bis(4-hydroxyphenyl)ethane, 1,2-bis(4-hydroxyphenyl)ethane, 2,2-bis(4-hydroxyphenyl) propane, 2,2-bis(3-methyl-4-hydroxyphenyl) butane, 2,2-bis(4-hydroxyphenyl) butane, 2,2-bis(4-hydroxyphenyl) octane, 4,4-bis(4-hydroxyphenyl) heptane, 1,1-bis(4-hydroxyphenyl)-1,1-diphenyl methane, 1,1-bis(4-hydroxyphenyl)-1-phenyl ethane, 1,1-bis(4-hydroxyphenyl)-1-phenyl methane, bis(4-hydroxyphenyl) ether, bis(4-hydroxyphenyl)sulfide, bis(4-hydroxyphenyl) sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 1,1-bis(4-hydroxyphenyl) cyclododecane, 2,2-bis(3-methyl-4-hydroxyphenyl) propane, 2,2-bis(3-phenyl-4-hydroxyphenyl)propane, 2,2-bis(4-hydroxyphenyl)adamantane, 2,2-bis(3-methyl-4-hydroxyphenyl)adamantane, 1,3-bis(4-hydroxyphenyl) adamantane, 1,3-bis(3-methyl-4-hydroxyphenyl) adamantane, 2-(3-methyl-4-hydroxyphenyl)-2-(4-hydroxyphenyl)-1-phenyl ethane, bis(3-methyl-4-hydroxyphenyl) sulfide, bis(3-methyl-4-hydroxyphenyl) sulfone, bis(3-methyl-4-hydroxyphenyl)methane, 1,1-bis(3-methyl-4-hydroxyphenyl)cyclohexane, resorcin, 2,7-naphthalenediol, 2,6-naphthalenediol, 1,4-naphthalenediol, 1,5-naphthalenediol, 2,2-bis(2-methyl-4-hydroxyphenyl) propane, 1,1-bis(2-butyl-4-hydroxy-5-methylphenyl) butane, 1,1-bis(2-tert-butyl-4-hydroxy-3-methylphenyl) ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl) isobutane, 1,1-bis(2-tert-butyl-4-hydroxy-5-methylphenyl) heptane, 1,1-bis(2-tert-butyl-4-hydroxy-5-methylphenyl)-1-phenyl methane, 1,1-bis(2-tert-amyl-4-hydroxy-5-methylphenyl)butane, bis(3-chloro-4-hydroxyphenyl) methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 3,3'-difluoro-4,4'-dihydroxy biphenyl, 1,1-bis(3-cyclohexyl-4-hydroxyphenyl)cyclohexane, 2,2-bis(4-hydroxyphenyl) hexafluoro propane, 1,1-bis(3-phenyl-4-hydroxyphenyl)cyclohexane, bis(3-phenyl-4-hydroxyphenyl)sulfone, 4,4'-(3,3,5-trimethylcyclohexylidene)diphenol, 4,4'-[1,4-phenylene bis(1-methylethylidene)]bisphenol, 4,4'-[1,3-phenylene bis (1-methylethylidene)]bisphenol, 9,9-bis(4-hydroxyphenyl) fluorene, 9,9-bis(4-hydroxy-3-methylphenyl)fluorene, and α,α'-bis(4-hydroxyphenyl)-1,3-diisopropyl benzene. One of the above bisphenol compounds may be singularly used, or two or more of them may be mixed for use.

Among the above bisphenol compounds, 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1,1-diphenyl methane, 1,1-bis(4-hydroxyphenyl)-1-phenyl ethane, 1,1-bis(4-hydroxyphenyl)cyclohexane, 2,2-bis(3- methyl-4-hydroxyphenyl)propane, 1,1-bis(3-methyl-4-hydroxyphenyl)cyclohexane, 1,1-bis(4-hydroxyphenyl)-3,3,5-trimethylcyclohexane, 1,1-bis(4-hydroxyphenyl)cyclododecane, 1,1-bis(3-methyl-4-hydroxyphenyl)cyclopentane, 2,2-bis(3-phenyl-4-hydroxyphenyl)propane, 2,2-bis(4-hydroxyphenyl)adamantane, resorcin, 2,7-naphthalene diol, 4,4'-[1,4-phenylene bis(1-methylethylidene)]bisphenol, 4,4'-[1,3-phenylene bis(1-methylethylidene)]bisphenol, 9,9-bis(4-hydroxyphenyl)fluorene, 9,9-bis(4-hydroxy-3-methylphenyl)fluorene are preferable.

More preferable examples are 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1-phenyl ethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)-3,3,5-trimethylcyclohexane, 1,1-bis(4-hydroxyphenyl)cyclododecane, 2,2-bis(4-hydroxyphenyl)adamantane, resorcin, 2,7-naphthalene diol, and 9,9-bis(4-hydroxy-3-methylphenyl)fluorene.

The PC copolymer according to this exemplary embodiment can be easily obtained by conducting interfacial polycondensation with use of the bischloroformate oligomer obtained from the monomer represented by the formula (1-7) and the monomer represented by the formula (1-8). When an interfacial polycondensation is conducted under the presence of an acid-binding agent with use of various carbonyl dihalides such as phosgene, diphosgene and triphosgene, carbonate ester bonding can be favorably formed. The above reaction(s) is conducted under the presence of a terminal terminator and/or a branching agent as needed. Moreover, in manufacturing the PC copolymer according to this exemplary embodiment, two or more kinds of monomers derived from $Ar^2$ may be used to provide a multicomponent copolymer.

As the terminal terminator for terminating the chain end, monovalent carboxylic acid and derivatives thereof, and monovalent phenol are usable. For instance, p-tert-butyl-phenol, p-phenylphenol, p-cumylphenol, p-perfluoro nonylphenol, p-(perfluoro nonyl phenyl)phenol, p-(perfluorohexyl)phenol, p-tert-perfluorobutyl phenol, perfluorooctyl phenol, perfluorohexyl phenol, 1-(p-hydroxybenzyl)perfluorodecane, p-[2-(1H,1H-perfluorotridodecyloxy)-1,1,1,3,3,3-hexafluoro propyl]phenol, 3,5-bis(perfluoro hexyloxy carbonyl)phenol, p-hydroxy perfluoro dodecyl benzoate, p-(1H,1H-perfluoro octyloxy)phenol, 2H,2H,9H-perfluoro nonane acid, 1,1,1,3,3,3-tetraphloro-2-propanol, or alcohols represented by the following formulae (1-10) and (1-11) are preferably used.

(1-10)

(n represents an integer in a range of 1 to 12.)

(1-11)

(m represents an integer in a range of 1 to 12.)

A ratio at which the terminal terminator is added is in a range of 0.05 mol % to 30 mol % per the copolymer composition, more preferably in a range of 0.1 mol % to 10 mol %. When the ratio is more than 30 mol %, mechanical strength may be deteriorated. When the content is less than 0.05 mol %, moldability may be deteriorated.

Examples of the branching agent are phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl) methane, tetrakis[4-(4-hydroxyphenyl isopropyl)phenoxy] methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin and 5-bromoisatin.

An additive amount of the branching agent is preferably 30 mol % or less per the copolymer composition, more preferably 5 mol % or less. When the additive amount is more than 30 mol %, moldability may be deteriorated.

Examples of the acid-binding agent usable in interfacial polycondensation are: alkaline metal hydroxides such as sodium hydroxide, potassium hydroxides, lithium hydroxides and cesium hydroxide; alkaline earth metal hydroxides such as magnesium hydroxide and calcium hydroxide; carbonates such as sodium carbonate, potassium carbonate, calcium carbonate and magnesium carbonate; and organic bases such as trialkylamines (triethylamine, trimethylamine and tripropylamine), N-methyl morpholine, tetramethylethylenediamine, triethylenediamine, diazabicycloundecene, dimethylaniline, diethylaniline, dipropylaniline and pyridine. Among these, alkaline metal hydroxides such as sodium hydroxide, potassium hydroxides and alkaline earth metal hydroxides such as calcium hydroxide, and amine compounds such as triethylamine, dimethylaniline and diethylaniline are preferable. These acid-binding agents can be used in a mixture. Use ratio of the acid-binding agent may be also suitably adjusted in consideration of stoichiometric proportion (equivalent amount) in the reaction. Specifically, per 1 mol of a hydroxyl group of the divalent phenol (ingredient), 1 equivalent or more, preferably 1 to 10 equivalent of the acid-binding agent may be used.

As the solvent used herein, a solvent in which the obtained PC copolymer is soluble at a predetermined level or higher is sufficient. Preferable examples of the solvent are: aromatic hydrocarbon such as toluene and xylene; halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2,-tetrachloroethane, pentachloroethane and chlorobenzene; ketones such as cyclohexaneone, acetone and acetophenone; and ethers such as tetrahydrofuran and 1,4-dioxane. One of the above solvents may be singularly used, or two or more of the above may be used together. With use of two solvents that are not miscible with each other, interfacial polycondensation may be conducted.

Preferable examples of a catalyst are: tertiary amines such as trimethylamine, triethylamine, tributylamine, N,N-dimethylcyclohexyl amine, pyridine, N,N-diethyl aniline and N,N-dimethyl aniline; quaternary ammonium salts such as trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide; and quaternary phosphonium salts such as tetrabutyl phosphonium chloride and tetrabutyl phosphonium bromide.

Further, a small amount of an antioxidant such as sodium sulfite and hydrosulfite salt may be added to the reaction system as needed.

The manufacturing method of the PC copolymer according to this exemplary embodiment is specifically applicable to various embodiments. For instance, the bischloroformate oligomer having a small number of repeating units is manufactured by reacting at least one of the bisphenol compound having a small number of repeating units and the biphenol compound represented by the formula (1-7) with phosgene, and then the bischloroformate oligomer is reacted with the monomer represented by the formula (1-8) under the presence of a mixture of the above solvent and an alkali aqueous solution (the above acid-binding agent). This method is preferable in that n in the formula (1-1) is adjustable to a preferable range.

The following manufacturing method of the bischloroformate is preferable in that cleaning process in manufacturing the polycarbonate copolymer can be simplified.

A manufacturing method of the bischloroformate oligomer having n' in the formula (1-5) in a range of 1.0 to 1.99 is exemplified by the following manufacturing method. Firstly, the bisphenol compound of the formula (1-7) is suspended in a hydrophobic solvent such as methylene chloride and then added with phosgene to form a mixed solution. On the other hand, a tertiary amine such as triethylamine is dissolved in a hydrophobic solvent such as methylene chloride to form a solution. The solution is dropped into the above mixed solution for reaction at the room temperature or less. To a residual solution of the obtained reaction mixture, hydrochloric acid and deionized water are added for cleaning to obtain an organic layer including a polycarbonate oligomer having a small number of repeating units.

A reaction temperature is typically in a range of 0 to 70 degrees C. under cooling, preferably in a range of 5 to 65 degrees C. Both dropping time and reaction time are in a range of 15 minutes to 4 hours, preferably 30 minutes to about 3 hours. An average number (n') of monomers of the polycarbonate oligomer thus obtained is preferably in a range of 1.00 to 1.99, more preferably in a range of 1.00 to 1.60.

To an organic phase containing the bischloroformate oligomer thus obtained having a small number of repeating units, the divalent phenol monomer having a different skeleton and being represented by the formula (1-8) is added for reaction. The reaction temperature is 0 to 150 degrees C., preferably 5 to 40 degrees C., particularly preferably 10 to 25 degrees C.

A reaction pressure may be any one of reduced pressure, normal pressure and added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to about 3 hours.

In the reaction, the divalent phenol monomer of the formula (1-8) is preferably added in a form of an aqueous solution or an organic-solvent solution. The order of the addition is not specifically limited. In the above manufacturing method, the catalyst, the terminal terminator, the branching agent and the like may be added as needed at the time of manufacturing a bischloroformate oligomer or at the time of subsequent polymerization reaction, or both at the time of manufacturing the bischloroformate oligomer and at the time of subsequent polymerization reaction.

The PC copolymer thus obtained is formed by a repeating unit(s) represented by a formula (1-12) below and a repeating unit(s) represented by a formula (1-13) below. Ends of the PC copolymer are terminated.

As long as an object of the invention is not hampered, the PC copolymer may contain a polycarbonate unit having a structure unit other than $Ar^1$ and $Ar^2$, or a unit having a polyester structure or a polyether structure.

[Chemical Formula 30]

(1-12)

(1-13)

For controlling the reduced viscosity $[\eta_{sp}/C]$ of the obtained PC copolymer to be within the above-described range, various methods, such as a method of selecting the reaction conditions and a method of adjusting the use amount of the branching agent and the terminal terminator, are available. In addition, if necessary, the PC copolymer may be subjected to a physical treatment such as mixing and cutoff and/or a chemical treatment such as polymer reaction, cross linking or partial degradation), so that the PC copolymer having a predetermined reduced viscosity $[\eta_{sp}/C]$ may be obtained.

The obtained reaction product (crude product) may be subjected to various aftertreatments such as known separation and refinement, so that the PC copolymer having desirable purity (desirable refining degree) may be obtained.

Structure of Coating Liquid

A coating liquid according to this exemplary embodiment at least contains the PC copolymer according to this exemplary embodiment and a solvent capable of dissolving or dispersing the PC copolymer. Moreover, in addition to the above, the coating liquid may contain a low molecular compound, a colorant such as a dye and a pigment, a functional compound such as a charge transporting material, an electron transporting material, a hole transporting material and a charge generating material, a filler such as an inorganic or organic filler, fiber and particles, and an additive such as an antioxidant, a UV absorbent and an acid scavenger. Materials that may be contained besides the resin are exemplified by materials contained in the components for the electrophotographic photoreceptor described later. The coating liquid may contain other resins as long as the advantages of this exemplary embodiment are not hampered. The coating liquid is exemplified by the following components of the electrophotographic photoreceptor. As the solvent usable in this exemplary embodiment, a single solvent may be used or a plurality of solvents may be used by mixture, considering solubility, dispersibility, viscosity, evaporation speed, chemical stability and stability against physical changes of the PC copolymer according to this exemplary embodiment and other material. The solvent is exemplified by the components of the electrophotographic photoreceptor described later.

The concentration of the copolymer component in the coating liquid is sufficient when the coating liquid can exhibit a viscosity suitable for usage. The concentration is preferably in a range of 0.1 mass % to 40 mass %, more preferably in a range of 1 mass % to 35 mass %, most preferably in a range of 5 mass % to 30 mass %. When the concentration exceeds 40 mass %, coating performance is deteriorated due to excessively high viscosity. When the viscosity is less than 0.1 mass %, the coating liquid may flow away due to excessively low viscosity, so that a uniform film cannot be obtained. For drying the obtained film, long time may be required due to excessively low concentration of the coating liquid, so that a desired thickness of the film may not be obtained.

The PC copolymer according to this exemplary embodiment has a good compatibility with the charge transporting material and is not whitened or gelled even when dissolved in the solvent. Accordingly, the coating liquid according to this exemplary embodiment containing the copolymer, the charge transporting material and the solvent can be stably stored without whitening or gelation of the polymer components over a long period of time. When a photosensitive layer of the electrophotographic photoreceptor is formed with use of the coating liquid, an excellent electrophotographic photoreceptor having no defect on an image without crystallization of the photosensitive layer is obtainable.

A ratio of the PC copolymer to the charge transporting material in the coating liquid is typically 20:80 to 80:20 by mass, preferably 30:70 to 70:30 by mass.

In the coating liquid according to this exemplary embodiment, one of the above may be singularly used, or two or more of the above may be used together.

The coating liquid according to this exemplary embodiment is preferably used for forming the charge transporting layer of a laminated electrophotographic photoreceptor in which a sensitive layer at least includes the charge generating layer and the charge transporting layer. When the coating liquid further contains the charge generating material, the coating liquid is also usable for forming a sensitive layer of a single-layer electrophotographic photoreceptor.

Structure of Electrophotographic Photoreceptor

As long as the above-described PC copolymer is used in the photosensitive layer, the electrophotographic photoreceptor according to this exemplary embodiment may be any electrophotographic photoreceptor (e.g. one of known various electrophotographic photoreceptors). However, the electrophotographic photoreceptor is preferably a laminated electrophotographic photoreceptor including at least one charge generating layer and at least one charge transporting layer, or alternatively a single-layer electrophotographic photoreceptor including both a charge generating material and a charge transporting material.

While the PC copolymer may be used in any portion of the photosensitive layer, in order for the invention to sufficiently provide advantages, the PC copolymer is desirably used as the binder resin of the charge transporting material in the charge transporting layer, as the binder resin of the single photosensitive layer or as a surface protecting layer. When the electrophotographic photoreceptor has double charge transporting layers (i.e., multilayer electrophotographic photoreceptor), the PC copolymer is preferably used in either one of the charge transporting layers.

In the electrophotographic photoreceptor according to this exemplary embodiment, one type of the PC copolymer according to this exemplary embodiment may be singularly used, or two or more types thereof may be used together. Further, as long as an object of the invention is not hampered, a binder-resin component such as another polycarbonate may be contained as desired. In addition, an additive such as an antioxidant may be contained.

The electrophotographic photoreceptor according to this exemplary embodiment includes a conductive substrate and a photosensitive layer on the conductive substrate. When the photosensitive layer has the charge generating layer and the charge transporting layer, the charge transporting layer may be laminated on the charge generating layer, or the charge generating layer may be laminated on the charge transporting layer. Further alternatively, a single layer of the electrophotographic photoreceptor may contain both the charge generating material and the charge transporting material. When necessary, a surface layer of the electrophotographic photoreceptor may be provided with a conductive or insulating protective film. The electrophotographic photoreceptor may be further provided with an intermediate layer(s) such as adhesive layer for enhancing adhesion between layers and blocking layer for blocking charges.

Various conductive substrate materials (e.g., known materials) are usable for forming the electrophotographic photoreceptor according to this exemplary embodiment. Examples of such conductive substrate materials are: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer contains at least the charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. While various methods (e.g., known methods) are usable for forming the charge generating layer with use of a binder resin, the charge generating layer is preferably obtained as a wet molding typically formed by applying, for instance, a coating agent in which both the charge generating material and the binder resin are dispersed or dissolved in a suitable solvent onto a predetermined underlying substrate and drying the applied coating agent.

Various known materials are usable as the charge generating material in the charge generating layer. Examples of compounds are: elementary selenium such as amorphous selenium and trigonal selenium; selenium alloy such as selenium-tellurium; selenium compound or selenium-containing composition such as $As_2Se_3$; inorganic material formed of 12 group element and 16 group element in the periodic system such as zinc oxide and CdS—Se; oxide-base semiconductor such as titanium oxide; silicon-base material such as amorphous silicon; metal-free phthalocyanine pigment such as τ-metal-free phthalocyanine and χ-metal-free phthalocyanine; metal phthalocyanine pigment such as α-copper phthalocyanine, β-copper phthalocyanine, γ-copper phthalocyanine, ε-copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2θ has its diffraction peak at 27.3±0.2 degrees in a X-ray diffraction diagram, and gallium phthalocyanine; cyanine dye; anthracene pigment; bisazo pigment; pyrene pigment; polycyclic quinone pigment; quinacridone pigment; indigo pigment; perylene pigment; pyrylium pigment; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be singularly used, or two or more of them may be mixed for use as the charge generating material.

Among the above charge generating materials, a compound disclosed in JP-A-11-172003 is preferable.

The charge transporting layer can be obtained as a wet molding by forming a layer in which the charge transporting material is bound onto the underlying substrate by a binder resin.

The binder resin for the charge generating layer and the charge transporting layer is not specifically limited. Various known resins are usable. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be singularly used, or two or more of them may be mixed for use. The binder resin used in the charge generating layer and the charge transporting layer is preferably the PC copolymer according to this exemplary embodiment.

While various known methods are usable for forming the charge transporting layer, the charge transporting layer is preferably obtained as a wet molding formed by applying a coating liquid in which both the charge transporting material and the PC copolymer according to this exemplary embodiment are dispersed or dissolved in a suitable solvent onto a predetermined underlying substrate and drying the applied coating liquid. For forming the charge transporting layer, the charge transporting material and the PC copolymer are mixed together preferably by a mass ratio of 20:80 to 80:20, more preferably 30:70 to 70:30.

In the charge transporting layer, one type of the PC copolymer according to this exemplary embodiment may be singularly used, or two or more types thereof may be used together. As long as an object of the invention is not hampered, the charge transporting layer may also contain another binder resin in addition to the PC copolymer according to this exemplary embodiment.

The thickness of the charge transporting layer is typically approximately 5 µm to 100 µm, preferably 10 µm to 30 µm. When the thickness is less than 5 µm, the initial potential may be lowered. When the thickness is more than 10 µm, electrophotographic characteristics may be deteriorated.

Various known compounds are usable as the charge transporting material that is usable together with the PC copolymer according to this exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be singularly used, or two or more of the above may be used together.

Among the above charge transporting materials, a compound disclosed in JP-A-11-172003 is particularly preferably usable.

In the electrophotographic photoreceptor according to this exemplary embodiment, the PC copolymer according to this exemplary embodiment is preferably used as the binder resin in at least either one of the charge generating layer and the charge transporting layer.

The electrophotographic photoreceptor according to this exemplary embodiment may be provided with a typically-used undercoat layer between the conductive substrate and the photosensitive layer. Examples of the undercoat layer are particles such as titanium oxide, aluminum oxide, zirconia, titanic acid, zirconic acid, lanthanum lead, titanium black, silica, lead titanate, barium titanate, tin oxide, indium oxide and silicon oxide, and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the PC copolymer according to this exemplary embodiment. One of the above particles and the resins may be singularly used or a variety thereof may be mixed together in use. When a mixture thereof is used, a combination of inorganic particles and a resin is preferable because a flat and smooth film can be made.

The thickness of the undercoat layer is typically approximately 0.01 µm to 10 µm, preferably 0.1 µm to 7 µm. When the thickness is less than 0.01 µm, it is difficult to form an even undercoat layer. On the other hand, when the thickness is more than 10 µm, electrophotographic characteristics may be deteriorated. The electrophotographic photoreceptor according to this exemplary embodiment may be provided with a typically-used known blocking layer between the conductive substrate and the photosensitive layer. The blocking layer may be made of the same resin as the binder resin. Alternatively, the blocking layer may be made of the polycarbonate resin according to this exemplary embodiment. The thickness of the undercoat layer is typically approximately 0.01 µm to 10 µm, preferably 0.1 µm to 10 µm. When the thickness is less than 0.01 µm, it is difficult to form an even blocking layer. On the other hand, when the thickness is more than 20 µm, electrophotographic characteristics may be deteriorated.

The electrophotographic photoreceptor according to this exemplary embodiment may be further provided with a protective layer laminated on the photosensitive layer. The protective layer may be made of the same resin as the binder resin. Alternatively, the protective layer may be made of the polycarbonate copolymer according to this exemplary embodiment. The thickness of the protective layer is 0.01 µm to 20 µm, preferably 0.1 µm to 10 µm. The protective layer may contain a conductive material such as the charge generating material, the charge transporting material, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration of sensitivity, various chemical substances and additives such as antioxidant, surfactant, curl inhibitor and leveling agent may be added.

Examples of the binders are silicone resin, polyamide resin, polyurethane resin, polyester resin, epoxy resin, polyketone resin, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, a heat and/or light-curable resin is also usable. The binder is not specifically limited to the above, as long as the binder is an electric-insulating resin from which a film is formable under normal conditions, and as long as advantages of the invention are not hampered.

Examples of the plasticizer are biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst are methanesulfonic acid, dodecylbenzenesulfonic acid and dinonylnaphthalene disulfonic acid. Examples of the fluidity adder are Modaflow™ and Acronal 4F™. Examples of the pinhole controller are benzoin and dimethyl phthalate. The above plasticizer, curing catalyst, fluidity adder and pinhole controller are preferably contained at a content of 5 mass % or less of the charge transporting material.

When a sensitizer dye is used as a spectral-sensitivity sensitizer, suitable examples of the sensitizer dye are triphenylmethane-base dye such as methyl violet, crystal violet, night blue and Victria blue, acridine dye such as erythrosine, Rhodamine B, Rhodamine 3R, acridine orange and frapeosine, thiazine dye such as methylene blue and methylene green, oxazine dye such as capri blue and meldra blue, cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting material. Examples of the electron-accepting material are preferably compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4'-dinitrobenzophenone, 4-nitrobenzal malonodinitrile, α-cyano-β-(p-cyanophenyl)ethyl acrylate, 9-anthracenyl methyl malonodinitrile, 1-cyano-(p-nitrophenyl)-2-(p-chlorophenyl)ethylene, 2,7-dinitro fluorenone, 2,4,7-trinitro fluorenone, 2,4,5,7-tetranitro fluorenone, 9-fluorenylidene-(dicyano methylene malononitrile), polynitro-9-fluorenylidene-(dicyano methylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds is in a range of 0.01 to 200 parts by mass per 100 parts by mass of the charge generating material or the charge transporting material, preferably in a range of 0.1 to 50 parts by mass.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is in a range of 0.1 mass % to 60 mass % of the binder resin, preferably in a range of 5 mass % to 40 mass %. When the additive ratio is less than 0.1 mass %, surface modification such as enhancement of surface durability and reduction in surface energy may not be sufficient. When the additive ratio is more than 60 mass %, the electrophotographic characteristics may be deteriorated.

Examples of the antioxidant are preferably a hindered phenol-base antioxidant, aromatic amine-base antioxidant, hindered amine-base antioxidant, sulfide-base antioxidant and organophosphate-base antioxidant. An additive ratio of such surface modifiers is in a range of 0.01 mass % to 10 mass % of the charge transporting material, preferably in a range of 0.1 mass % to 2 mass %.

Preferable examples of such antioxidants are compounds represented by chemical formulae disclosed in the Specification of JP-A-11-172003 ([Chemical Formula 94] to [Chemical Formula 101]).

One of the above antioxidants may be singularly used, or two or more of them may be mixed in use. In addition to the photosensitive layer, the above antioxidant may be added to the surface protecting layer, the undercoat layer and the blocking layer.

Examples of the solvent usable in forming the charge generating layer and the charge transporting layer are aromatic solvent such as benzene, toluene, xylene and chlorobenzene, ketone such as acetone, methyl ethyl ketone and cyclohexaneone, alcohol such as methanol, ethanol and isopropanol, ester such as acetic ether and ethyl cellosolve, halogenated hydrocarbon such as carbon tetrachloride, carbon tetrabromide, chloroform, dichloromethane and tetrachloroethane, ether such as tetrahydrofuran, dioxolane and dioxane, dimethylformamide, dimethylsulfoxide, and diethyl formamide. One of the above solvents may be singularly used, or two or more of them may be used together as a mixture solvent.

The photosensitive layer of a single-layer electrophotographic photoreceptor can be easily formed by applying the binder resin (PC copolymer) according to this exemplary embodiment with use of the charge generating material, the charge transporting material and the additive. The charge transporting material is preferably added with the above-described hole-transport material and/or an electron-transport material. Compounds disclosed in JP-A-2005-139339 can be preferably applied as the electron-transport material.

Various coating applicators (e.g., known applicators) can perform application of each layer. Examples of such a coating applicator are an applicator, a spray coater, a bar coater, a chip coater, a roll coater, a dip coater, a ring coater and a doctor blade.

The thickness of the photosensitive layer of the electrophotographic photoreceptor is 5 μm to 100 μm, preferably 8 μm to 50 μm, more preferably 10 μm to 30 μm. When the thickness is less than 5 μm, the initial potential tends to be low. When the thickness is more than 100 μm, electrophotographic characteristics may be deteriorated. In the electrophotographic photoreceptor, a ratio of the charge generating material to the binder resin is 1:99 to 30:70 by mass, more preferably 3:97 to 15:85 by mass. On the other hand, a ratio of the charge transporting material to the binder resin is 10:90 to 80:20 by mass, more preferably 30:70 to 70:30 by mass.

Since the electrophotographic photoreceptor according to this exemplary embodiment uses the PC copolymer according to this exemplary embodiment, a coating liquid is not whitened (gelled) in manufacturing the photosensitive layer. In addition, since containing a molding (binder resin) molded of the PC copolymer according to this exemplary embodiment in its photosensitive layer, the electrophotographic photoreceptor according to this exemplary embodiment has excellent durability (wear resistance) and electrification characteristics. Thus, the photoreceptor according to this exemplary embodiment can maintain its excellent electrophotographic characteristics for a long time. Accordingly, the photoreceptor according to this exemplary embodiment is favorably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

The electrophotographic photoreceptor according to this exemplary embodiment is electrified in use by corona discharge (corotron, scorotron), contact charging (charge roll, charge brush) or the like. Examples of the charge roll are a charge roll by DC electrification and a charge roll by AC and DC superimposed electrification. For exposure, a halogen lamp, a fluorescent lamp, laser (semiconductor, He—Ne), LED or a photoreceptor internal exposure system may be used. For image development, dry developing such as cascade developing, two-component magnetic brush developing, one-magnetic component developing, one-non-magnetic component developing, one-component insulating toner developing and one-component conductive toner developing, and wet developing may be used. For transfer, electrostatic transfer such as corona transfer, roller transfer and belt transfer, pressure transfer and adhesive transfer may be used. For fixing, heat roller fixing, radiant flash fixing, open fixing, pressure fixing and the like may be used. For cleaning and neutralizing, brush cleaner, magnetic brush cleaner, electrostatic brush cleaner, magnetic roller cleaner, blade cleaner and those in which cleaner is omitted may be used. Examples of a resin for toner are styrene-base resin, styrene-acrylic base copolymer resin, polyester, epoxy resin and cyclic hydrocarbon polymer. The toner may be spherical or amorphous. The toner may also be controlled to have a certain shape (such as spheroidal shape and potato shape). The toner may be pulverized toner, suspension-polymerized toner, dissolution-suspension-pelltized toner, dissolution-emulsion-pelltized toner, emulsion-polymerized toner, chemically-pelletized toner, or ester-elongation toner.

Examples of First Exemplary Embodiment

Next, examples and comparatives of the first exemplary embodiment will be described in detail. However, the first exemplary embodiment is not limited to the examples but may include various modifications and applications as long as such modifications and applications do not depart from a technical idea of the invention.

MANUFACTURING EXAMPLE

Preparation of Oligomer

Manufacturing Example 1: Synthesis of Bisphenol A Oligomer (Bischloroformate)

80.2 g (0.352 mol) of 2,2-bis(4-hydroxyphenyl)propane (bisphenol A) was suspended in 450 mL of methylene chloride, to which 70.4 g (0.702 mol) of triethylamine was added for dissolution. The obtained solution was dropped into a solution, which was prepared by dissolving 69.8 g (0.631 mol) of phosgene in 250 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol A oligomer having a chloroformate group at its molecular terminal was obtained. The obtained solution had a chloroformate concentration of 0.88 mol/L, a solid concentration of 0.21 kg/L and an average number of repeating units of 1.49. A content of an amide compound contained in the obtained bisphenol A oligomer equals to a value obtained by subtracting a mass of nitrogen derived from triethylamine from a total mass of nitrogen in the bisphenol A oligomer. The content of the amide compound was found to be 150 mass ppm based on the mass of the bisphenol A oligomer. The mass of nitrogen derived from triethylamine was 0.3 mass ppm. The total mass of nitrogen in the bisphenol A oligomer was determined by the chemiluminescence method according to JIS (Japanese Industrial Standard) K2609 The total mass of nitrogen in the bisphenol A was analyzed by Gas chromatography to determine an amount of triethylamine. The amount of triethylamine was converted to the mass of nitrogen. By subtracting this mass of nitrogen from the total mass of nitrogen, the mass of nitrogen derived from the amide compound was obtained. This obtained ingredient will be referred to as "A-CF" hereinafter.

The total mass of nitrogen was determined with TS-100 manufactured by Mitsubishi Chemical Analytech Co., Ltd. according to JIS K2609 (chemiluminescence method). Measuring methods on liquid are described in JIS. Solid samples were measured using the same instruments as those for liquid.

The methylene chloride solution of the bischloroformate compound was dried and hardened at 50 degrees C. under reduced pressure to obtain methylene chloride. The obtained solid content was used for measurement. By comparing the result of the measurement with calibration curve separately obtained based on pyridine as the reference material, the mass of nitrogen was determined. The obtained result was converted to a concentration of the bischloroformate compound in the methylene chloride solution, whereby the total mass of nitrogen in the bischloroformate compound was calculated.

A 0.5N—NaOH aqueous solution was added to the solid content of the bischloroformate compound obtained by the above method so that the obtained solution has 8 or more pH. To this solution, chloroform was added. Triethylamine was extracted as extraction component by chloroform extraction method and was analyzed by Gas chromatography. The amount of triethylamine was determined by the absolute calibration method.

Conditions for Gas chromatography analysis were as follows.
Product model: 7890A manufactured by Agilent Technologies
Column: CP-VOLAMINE (manufactured by Varian) with 60 m×0.32 mm (inner diameter)
Inlet temperature: 150 degrees C.
Column temperature: heating a column at 50 degrees C. per minute when the column temperature was from 40 degrees C. to 150 degrees C., keeping the column temperature at 150 degrees C. for ten minutes, and heating the column at 50 degrees C. per minute until the column temperature reached 250 degrees C.
Carrier gas: helium with a constant speed of 40 cm per second
Injected amount: 2 µl
Injection method: splitless injection
Detector: FID
FID temperature: 260 degrees C.

The average number of repeating units (n') was calculated according to the following formula.

The average number of repeating units $(n')=1+(M_{av}-M1)/M2$ (Formula 1) In the formula 1, $M_{av}$ represents $(2\times1000/\text{CF value})$, M2 represents (M1−98.92), and M1 represents a molecular weight of the bischloroformate compound when n'=1 in the formula (1-5). The CF value (N/kg) represents (CF value/concentration). The CF value (N) represents the number of chlorine molecule in the bischloroformate compound represented by the formula (1-5) contained in 1 L of the reaction solution. The concentration (kg/L) represents an amount of the solid content obtained by concentrating the 1-L reaction solution. Herein, 98.92 is a total atom weight of two chlorine atoms, one oxygen atom and one carbon atom which are desorbed at polycondensation of the bischloroformate compounds.

Manufacturing Example 2: Synthesis of Bisphenol Z Oligomer (Bischloroformate)

73.0 g (0.272 mol) of 1,1-bis(4-hydroxyphenyl)cyclohexane (bisphenol Z) was suspended in 410 mL of methylene chloride, to which 55.3 g (0.546 mol) of triethylamine was added for dissolution. The obtained solution was dropped into a solution, which was prepared by dissolving 54.5 g (0.551 mol) of phosgene in 225 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol Z oligomer having a chloroformate group at its molecular terminal was obtained. The obtained solution had a chloroformate concentration of 0.91 mol/L, a solid concentration of 0.22 kg/L and an average number of repeating units of 1.31. A content of an amide compound in the obtained bisphenol Z oligomer was found to be 90 mass ppm. A mass of nitrogen derived from triethylamine was 0.3 mass ppm. This obtained ingredient will be referred to as "Z-CF" hereinafter.

Manufacturing Example 3: Synthesis of Bisphenol E Oligomer (Bischloroformate)

73.0 g (0.341 mol) of 1,1-bis(4-hydroxyphenyl)ethane (bisphenol E) was suspended in 410 mL of methylene chloride, to which 68.7 g (0.682 mol) of triethylamine was added for dissolution. The obtained solution was dropped into a solution, which was prepared by dissolving 65.0 g (0.689 mol) of phosgene in 245 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol E oligomer having a chloroformate group at its molecular terminal was obtained. The obtained solution had a chloroformate concentration of 0.98 mol/L, a solid concentration of 0.21 kg/L and an average number of repeating units of 1.37. A content of an amide compound in the obtained bisphenol E oligomer was found to be 90 mass ppm. A mass of nitrogen derived from triethylamine was 0.3 mass ppm. This obtained ingredient will be referred to as "E-CF" hereinafter.

Manufacturing Example 4: Synthesis of Bisphenol C Oligomer (Bischloroformate)

230 g (0.897 mol) of 2,2-bis(3-methyl-4-hydroxyphenyl)propane (bisphenol C), 1058 ml of methylene chloride and 187 g (1.89 mol) of phosgene were mixed into a solution. To the mixed solution, a solution prepared by diluting 199.4 g (1.97 mol) of triethylamine in 460 ml of methylene chloride was dropped at 13 to 16 degrees C. for three hours and six minutes. The reactant mixture was stirred at 14 to 16 degrees C. for one hour and 38 minutes. 5.0 ml of concentrated hydrochloric acid and 200 ml of deionized water were added to the reactant mixture for cleaning. Subsequently, water cleaning was repeated until an aqueous layer became neutral. The resultant methylene chloride solution was a bischloroformate-compound-containing solution (1848.4 g).

The solution had a chloroformate concentration of 1.16 mol/L, a solid concentration of 0.24 kg/L and an average number of repeating units of 1.12. A content of an amide compound in the obtained bisphenol C oligomer was found to be 280 mass ppm. A mass of nitrogen derived from triethylamine was 0.3 mass ppm. This obtained ingredient will be referred to as "C-CF" hereinafter.

Manufacturing Example 5: Synthesis of 1,1-bis(4-hydroxyphenyl)-cyclododecane Oligomer (Bischloroformate)

43.6 g (0.124 mol) of 1,1-bis(4-hydroxyphenyl)-cyclododecane was suspended in 410 mL of methylene chloride, to which 25.0 g (0.248 mol) of triethylamine was added for dissolution. The obtained solution was dropped into a solution, which was prepared by dissolving 24.8 g (0.250 mol) of phosgene in 225 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a 1,1-bis(4-hydroxyphenyl)-cyclododecane oligomer having a chloroformate group at its molecular terminal was obtained. The solution had a chloroformate concentration of 0.92 mol/L, a solid concentration of 0.23 kg/L and an average number of repeating units of 1.06. A content of an amide compound in the obtained 1,1-bis(4-hydroxyphenyl)-cyclododecane oligomer was found to be 210 mass ppm. A mass of nitrogen derived from triethylamine was 0.3 mass ppm. This obtained ingredient will be referred to as "CDE-CF" hereinafter.

Manufacturing Example 6: Synthesis of 4,4'-biphenol Oligomer (Bischloroformate)

50.0 g (0.269 mol) of 4,4'-biphenol, 500 ml of methylene chloride and 80.0 g (0.809 mol) of phosgene were mixed into a solution. To the mixed solution, a solution prepared by diluting 59.8 g (0.591 mol) of triethylamine in 100 ml of methylene chloride was dropped. Except this treatment, synthesis of a 4,4'-biphenol oligomer was performed in the same manner as that in Manufacturing Example 4. The resultant methylene chloride solution was a bischloroformate compound-containing solution (897.5 g).

The solution had a chloroformate concentration of 0.77 mol/L, a solid concentration of 0.12 kg/L and an average number of repeating units of 1.00. A content of an amide compound in the obtained 4,4'-biphenol oligomer was found to be 380 mass ppm. A mass of nitrogen derived from triethylamine was 0.3 mass ppm. This obtained ingredient will be referred to as "BP-CF" hereinafter.

Manufacturing Example 7: Synthesis of 2,2-bis(4-hydroxyphenyl)-adamantane oligomer (Bischloroformate)

33.0 g (0.103 mol) of 2,2-bis(4-hydroxyphenyl)-adamantane, 330 ml of methylene chloride and 30.6 g (0.309 mol) of phosgene were mixed into a solution. To the mixed solution, a solution prepared by mixing 23.2 g (0.229 mol) of triethylamine in 66 ml of methylene chloride was dropped. Except this treatment, synthesis of a 2,2-bis(4-hydroxyphenyl)-adamantane oligomer was performed in the same manner as that in Manufacturing Example 4. 288.2 g of a bischloroformate-containing solution was obtained.

The obtained solution had a chloroformate concentration of 0.87 mol/L, a solid concentration of 0.21 kg/L and an average number of repeating units of 1.11. A content of an amide compound in the obtained 2,2-bis(4-hydroxyphenyl)-adamantane oligomer was found to be 410 mass ppm. A mass of nitrogen derived from triethylamine was 0.3 mass ppm. This obtained ingredient will be referred to as "22Ad-CF" hereinafter.

Manufacturing Example 8 : Synthesis of biscresolfluorene Oligomer (Bischloroformate)

250 g (0.661 mol) of 9,9-bis(3-methyl-4-hydroxyphenyl) fluorene, 1,175 ml of methylene chloride and 148 g (1.50 mol) of phosgene were mixed into a solution. To the mixed solution, a solution prepared by mixing 146.8 g (1.45 mol) of triethylamine in 500 ml of methylene chloride was dropped. Except this treatment, synthesis of a biscresolfluorene oligomer was performed in the same manner as that in Manufacturing Example 4. 2,944.5 g of a bischloroformate-containing solution was obtained.

The obtained solution had a chloroformate concentration of 0.55 mol/L, a solid concentration of 0.15 kg/L and an average number of repeating units of 1.11. A content of an amide compound in the obtained biscresolfluorene oligomer was found to be 400 mass ppm. A mass of nitrogen derived from triethylamine was 0.3 mass ppm. This obtained ingredient will be referred to as "BCF-CF" hereinafter.

Manufacturing Example 9 : Synthesis of Bisphenol Z Oligomer (Bischloroformate)

56.6 kg (224 mol) of 1,1-bis(4-hydroxyphenyl)cyclohexane (bisphenol Z) was suspended in 1080 L of methylene chloride, to which 66.0 kg (667 mol) of phosgene was added for dissolution. To the obtained solution, a solution prepared by dissolving 44.0 kg (435 mol) of triethylamine in 120 L of methylene chloride was dropped at 2.2 to 17.8 degrees C. for 2 hours and 50 minutes. After stirring at 17.9 to 19.6 degrees C. for 30 minutes, 900 L of methylene chloride was distilled away at 14 to 20 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a bisphenol Z oligomer having a chloroformate group at its molecular terminal was obtained. The obtained solution had a chloroformate concentration of 1.14 mol/L, a solid concentration of 0.22 kg/L and an average number of repeating units of 1.02. A content of an amide compound in the obtained bisphenol Z oligomer was found to be 20 mass ppm. A mass of nitrogen derived from triethylamine was 0.3 mass ppm. This obtained ingredient will be referred to as "C-CF2" hereinafter.

Manufacturing Example 10: Synthesis of Bisphenol Z Oligomer (Bischloroformate)

Synthesis of bisphenol Z oligomer was performed in the same manner as that in Manufacturing Example 2 except that the number of times for cleaning with deionized water after synthesis of the bisphenol Z oligomer was decreased from four times in Manufacturing Example 2 to two times in Manufacturing Example 10.

A content of an amide compound in the obtained bisphenol Z oligomer was calculated based on a nitrogen mass of the bisphenol Z oligomer. The content of the amide compound was found to be 720 mass ppm based on a total mass of the bisphenol Z oligomer.

Manufacturing Example 11: Synthesis of DHDE Bischloroformate 45.2 g (224 mol) of bis(4-hydroxyphenyl)ether (DHDE) was suspended in 1080 mL of methylene chloride, to which 66.0 g (667 mol) of phosgene was added for dissolution. To the obtained solution, a solution prepared by dissolving 44.0 g (435 mil mol) of triethylamine in 120 mL of methylene chloride was dropped at 2.2 to 17.8 degrees C. for 2 hours and 50 minutes. After stirring at 17.9 to 19.6 degrees C. for 30 minutes, 900 mL of methylene chloride was distilled away at 14 to 20 degrees C. 210 mL of deionized water, 1.2 g of concentrated hydrochloric acid and 450 mg of hydrosulphite were added to the residual solution for cleaning. Subsequently, cleaning with 210 mL of deionized water was repeated five times. A methylene chloride solution of DHDE bischloroformate having a chloroformate group at its molecular terminal was obtained. The obtained solution had a chloroformate concentration of 1.14 mol/L, a solid concentration of 0.19 kg/L and an average number of repeating units of 1.03. A content of an amide compound in the obtained DHDE bischloroformate was found to be 90 mass ppm. A mass of nitrogen derived from triethylamine was 0.3 mass ppm. This obtained ingredient will be referred to as "DHDE-CF" hereinafter.

Example 1

Manufacturing of PC Copolymer

A-CF (17 mL) of Manufacturing Example 1 and methylene chloride (43 mL) were injected to a reactor with a mechanical stirrer, stirring vane and baffle plate. To the reactor, p-tert-butylphenol (hereinafter referred to as PTBP) (0.045 g) as a terminal terminator was added and stirred for sufficient mixing. A biphenol monomer solution was prepared by a monomer-solution preparation method including: preparing 10 mL of 2N aqueous sodium hydroxide; cooling the solution at the room temperature or less; adding 0.1 g of hydrosulphite and 1.4 g of 4,4'-biphenol as an antioxidant; and completely dissolving the mixed solution. All amount of the biphenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03 N hydrochloric acid one time, and with 0.1 L of water three times in this order. The obtained methylene chloride solution was dropped into methanol with stirring. The obtained redeposit was filtered and dried to prepare a PC copolymer (PC-1) with the following structure.

Identification of PC Copolymer

The polycarbonate copolymer (PC-1) thus obtained was dissolved in methylene chloride to prepare a solution having a concentration of 0.5 g/dl. When reduced viscosity $[\eta_{sp}/C]$ thereof at 20 degrees C. was measured, the result was 1.13 dl/g. A structure and a composition of the obtained PC-1 were analyzed by $^1$H-NMR spectrum method and $^{13}$C-NMR spectrum method. The obtained PC-1 was identified as a PC copolymer having a repeating unit, the number of the repeating unit and a composition as follows. A content of diethyl carbamic acid chloride in the PC copolymer was 15 mass ppm.

[Chemical Formula 31]

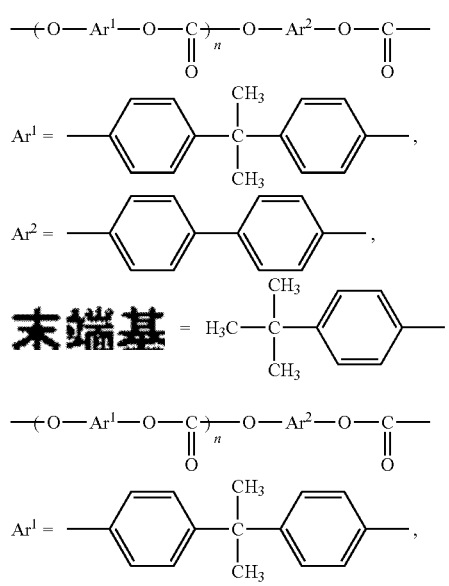

$n=2.30$, $Ar^2/(Ar^1+Ar^2)=0.30$

A structure of the PC copolymer in the formula (1-1) was identified according to the following procedure. Firstly, it was confirmed by $^{13}$C-NMR spectrum method that $Ar^2$ was not bonded to another $Ar^2$. Next, a polymerization ratio of each of $Ar^1$ and $Ar^2$ was calculated by $^1$H-NMR spectrum method. Subsequently, n was calculated according to the following formula 2.

$$Ar^2/(Ar^1+Ar^2)=1/(n+1) \quad \text{(Formula 2)}$$

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. 0.5 parts by mass of oxotitanium phthalocyanine was used as a charge generating material while 0.5 parts by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 µm.

Next, for use as a charge transporting material, 0.5 g of a compound (CTM-1) represented by the following formula (1-14) and 0.5 g of the obtained polycarbonate copolymer (PC-1) were dispersed in 10 ml of tetrahydrofuran to prepare a coating liquid. The coating liquid was applied onto the charge generating layer with an applicator and dried, thereby providing a charge transporting layer having a film thickness of approximately 20 µm.

[Chemical Formula 32]

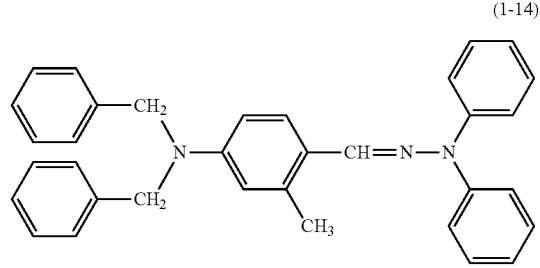

(1-14)

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as 0, a case where the PC copolymer was partially undissolved was marked as x, and a case where the PC copolymer was whitened was marked as "whitened."

Wear resistance of the PC copolymer and the electrophotographic photoreceptor was evaluated as follows.

(1) Manufacturing a sample for evaluation on wear resistance of the copolymer: PC-1 (2 g) was dissolved in methylene chloride (12 mL) and the obtained solution was cast into a film on a commercially available PET film using an applicator. This film was heated under reduced pressure and a solvent was removed to obtain a film sample having a thickness of about 30 μm.

(2) Manufacturing a sample for evaluation on wear resistance of the photoreceptor: PC-1 (1 g) and CTM-1 (1 g) were dissolved in methylene chloride (10 mL) and the obtained solution was cast into a film on a commercially available PET film using an applicator. This film was heated under reduced pressure and a solvent was removed to obtain a film sample having a thickness of about 30 μm.

(3) Evaluation: wear resistance of cast surfaces of the films manufactured at (1) and (2) process was evaluated with a Suga abrasion tester NUS-ISO-3 model (manufactured by Suga Test Instruments Co., Ltd.). Testing conditions: An abrasion paper having an alumina particle with a particle size of 3 μm was given a 4.9-N load. The sample was put into reciprocating motion 2000 times on the abrasion paper in contact with a surface of a photosensitive layer. A mass reduction of the sample was measured.

(4) Measurement of a content of impurities (diethyl carbamic acid chloride) contained in the PC copolymer: diethyl carbamic acid chloride was measured by the absolute calibration method using Gas chromatography.

Measuring conditions were as follows.
Sample: 0.5 g of the PC copolymer was dissolved in 13.3 g of methylene chloride and defined as a measuring sample.
Product model: 7890A manufactured by Agilent Technologies
Column: HP-1 with 30 m×0.25 mm (inner diameter) (a film thickness: 0.25 μm)
Column temperature: heating a column at 10 degrees C. per minute when the column temperature was from 40 degrees C. to 300 degrees C., and keeping the column temperature at 300 degrees C. for 30 minutes
Inlet temperature: 300 degrees C. at split
Detector: 310 degrees C. (FID)
Carrier gas: helium with a speed of 40 cm per second
Injected amount: 1 μl Next, electrophotographic characteristics of the obtained electrophotographic photoreceptor were measured by an electrostatic charge tester EPA-8100 (manufactured by Kawaguchi Electric Works Co., Ltd.). Specifically, corona discharge of −6 kV was conducted in the static mode. Then, the initial surface potential ($V_o$), residual potential (initial residual potential ($V_R$)) after five seconds of light irradiation (10 Lux), and half-life exposure amount ($E_{1/2}$) were measured. Further, a commercially available printer (FS-600, manufactured by KYOCERA Corporation) was modified so as to measure the surface potential of the photoreceptor. Then, the photoreceptor was mounted on a drum and evaluated in terms of electrification characteristics (repeating residual-potential increase ($V_R$ increase) before and after 24-hour-consecutive operation under conditions of high temperature and high humidity (35 degrees C., 85%) without use of a toner and a paper.

The results are shown in Table 1. The following Examples 2 to 10D and Comparative Examples 1 to 4 were evaluated in the same manner. The results are also shown in Table 1.

Example 2

In Example 1, A-CF (17 mL) was replaced by Z-CF (17 mL) of Manufacturing Example 2. The amount of methylene chloride was changed to 43 mL and the amount of PBTP was changed to 0.02 g. Biphenol was replaced by 1.1 g of 2,7-dihydroxynaphthalene. The aqueous sodium hydroxide was replaced by 12 mL of 2N aqueous potassium hydroxide. Except for the above, a PC copolymer (PC-2) was manufactured in the same manner as that in Example 1.

The PC copolymer (PC-2) was identified as a PC copolymer having 1.13 dl/g of a reduced viscosity [$\eta_{SP}/C$] and a structure with the following repeating unit and composition in the formula (1-1). A content of diethyl carbamic acid chloride in the PC copolymer was 10 mass ppm.

[Chemical Formula 33]

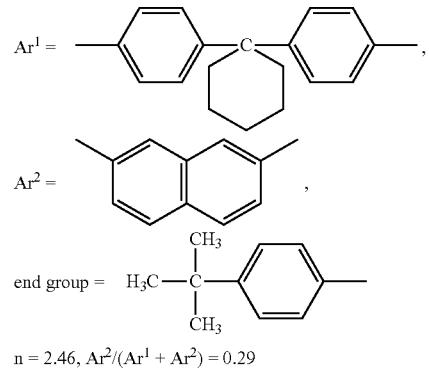

n = 2.46, $Ar^2/(Ar^1 + Ar^2)$ = 0.29

Example 3

In Example 1, A-CF (17 mL) was replaced by E-CF (17 mL) of Manufacturing Example 3. The amount of methylene chloride was changed to 43 mL and the amount of PTBP was changed to 0.05 g. The amount of biphenol was changed to 1.6 g. The amount of aqueous sodium hydroxide was changed to 14 mL. Except for the above, a PC copolymer (PC-3) was manufactured in the same manner as that in Example 1.

The PC copolymer (PC-3) was identified as a PC copolymer having 1.24 dl/g of a reduced viscosity [$\eta_{SP}/C$] and a structure with the following repeating unit and composition in the formula (1-1). A content of diethyl carbamic acid chloride in the PC copolymer was 10 mass ppm.

[Chemical Formula 34]

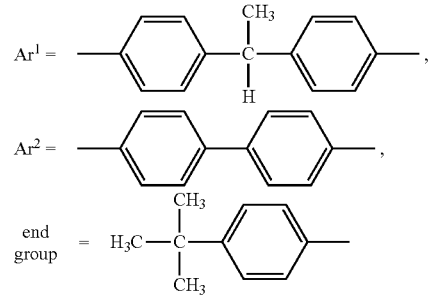

n = 2.28, $Ar^2/(Ar^1 + Ar^2)$ = 0.31

Example 4

In Example 1, A-CF (17 mL) was replaced by C-CF (30 mL) of Manufacturing Example 4. The amount of methylene chloride was changed to 30 mL and the amount of PTBP was changed to 0.05 g. Biphenol was replaced by 5.0 g of 1,1-bis(4-hydroxyphenyl)-1-phenylethane. The amount of aqueous sodium hydroxide was replaced by 29 mL of 2N aqueous potassium hydroxide. The reaction time was changed to three hours. Except for the above, a PC copolymer (PC-4) was manufactured in the same manner as that in Example 1.

The PC copolymer (PC-4) was identified as a PC copolymer having 0.51 dl/g of a reduced viscosity [$\eta_{SP}/C$] and a structure with the following repeating unit and composition in the formula (1-1). A content of diethyl carbamic acid chloride in the PC copolymer was 30 mass ppm.

[Chemical Formula 35]

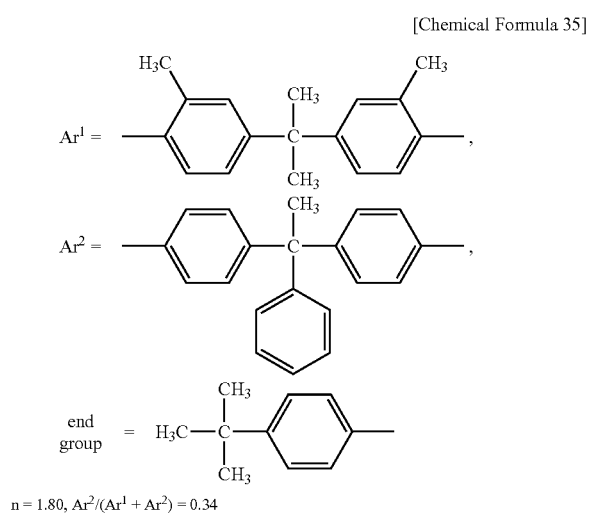

$n = 1.80, Ar^2/(Ar^1 + Ar^2) = 0.34$

Example 5

In Example 1, A-CF (17 mL) was replaced by CDE-CF (16 mL) of Manufacturing Example 5. The amount of methylene chloride was changed to 44 mL and the amount of PTBP was changed to 0.02 g. Biphenol was replaced by 0.8 g of resorcin. The aqueous sodium hydroxide was replaced by 12 mL of 2N aqueous potassium hydroxide. Except for the above, a PC copolymer (PC-5) was manufactured in the same manner as that in Example 1.

The PC copolymer (PC-5) was identified as a PC copolymer having 1.11 dl/g of a reduced viscosity [$\eta_{SP}/C$] and a structure with the following repeating unit and composition in the formula (1-1). A content of diethyl carbamic acid chloride in the PC copolymer was 20 mass ppm.

[Chemical Formula 36]

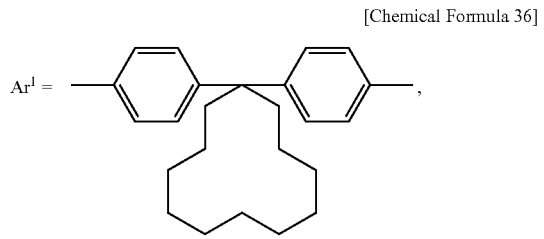

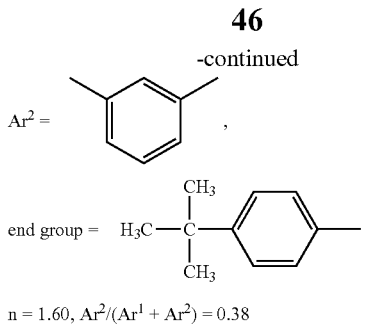

$n = 1.60, Ar^2/(Ar^1 + Ar^2) = 0.38$

Example 6

In Example 1, A-CF (17 mL) was replaced by BP-CF (60 mL) of Manufacturing Example 6. No methylene chloride was added. The amount of PTBP was changed to 0.03 g. Biphenol was replaced by 2.8 g of 2,2-bis(4-hydroxyphenyl)butane. The aqueous sodium hydroxide was replaced by 28 mL of 2N aqueous potassium hydroxide. Except for the above, a PC copolymer (PC-6) was manufactured in the same manner as that in Example 1.

The PC copolymer (PC-6) was identified as a PC copolymer having 0.50 dl/g of a reduced viscosity [$\eta_{SP}/C$] and a structure with the following repeating unit and composition in the formula (1-1). A content of diethyl carbamic acid chloride in the PC copolymer was 35 mass ppm.

[Chemical Formula 37]

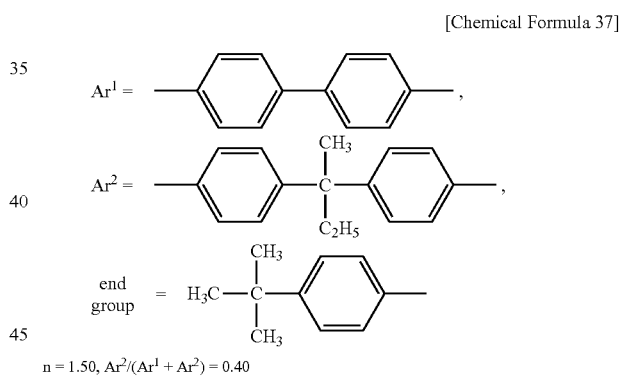

$n = 1.50, Ar^2/(Ar^1 + Ar^2) = 0.40$

Example 7

In Example 1, A-CF (17 mL) was replaced by 22Ad-CF (18 mL) of Manufacturing Example 7. The amount of methylene chloride was changed to 42 mL and the amount of PTBP was changed to 0.03 g. Biphenol was replaced by 2.1 g of α,α'-bis(4-hydroxyphenyl)1,3-diisopropylbenzene. The aqueous sodium hydroxide was replaced by 13 mL of 2N aqueous potassium hydroxide. Except for the above, a PC copolymer (PC-7) was manufactured in the same manner as that in Example 1.

The PC copolymer (PC-7) was identified as a PC copolymer having 1.13 dl/g of a reduced viscosity [$\eta_{SP}/C$] and a structure with the following repeating unit and composition in the formula (1-1). A content of diethyl carbamic acid chloride in the PC copolymer was 35 mass ppm.

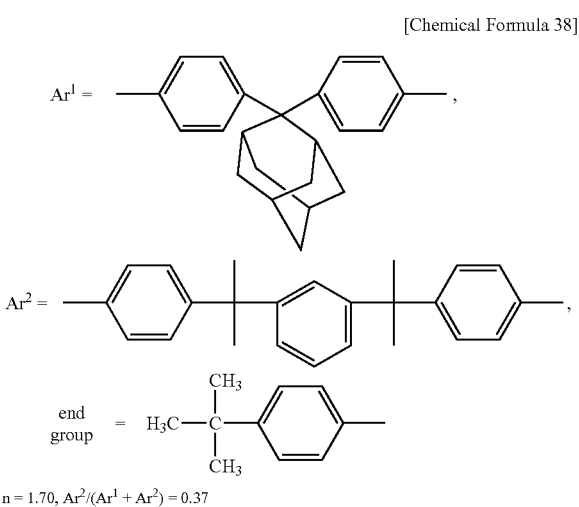

n = 1.70, Ar²/(Ar¹ + Ar²) = 0.37

Example 8

In Example 1, A-CF (17 mL) was replaced by BCF-CF (19 mL) of Manufacturing Example 8. The amount of methylene chloride was changed to 41 mL and the amount of PTBP was changed to 0.01 g. Biphenol was replaced by 2.1 g of 1,1-bis (4-hydroxyphenyl)-3,3,5-trimethylcyclohexane. The aqueous sodium hydroxide was replaced by 11 mL of 2N aqueous potassium hydroxide. Except for the above, a PC copolymer (PC-8) was manufactured in the same manner as that in Example 1.

The PC copolymer (PC-8) was identified as a PC copolymer having 0.50 dl/g of a reduced viscosity [$\eta_{SP}$/C] and a structure with the following repeating unit and composition in the formula (1-1). A content of diethyl carbamic acid chloride in the PC copolymer was 35 mass ppm.

[Chemical Formula 39]

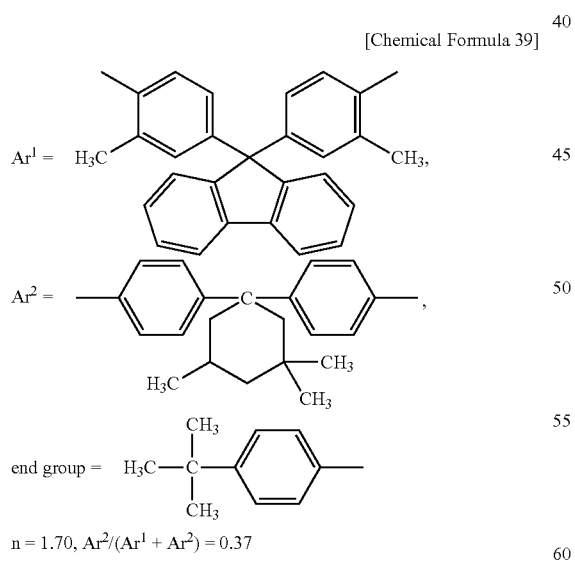

n = 1.70, Ar²/(Ar¹ + Ar²) = 0.37

Example 9

A PC copolymer (PC-9) was manufactured in the same manner as that in Example 1 except that the amount of PTBP was changed to 0.100 g.

The PC copolymer (PC-9) was identified as a PC copolymer having 0.52 dl/g of a reduced viscosity [$\eta_{SP}$/C] and a structure with the following repeating unit and composition in the formula (1-1). A content of diethyl carbamic acid chloride in the PC copolymer was 20 mass ppm.

[Chemical Formula 40]

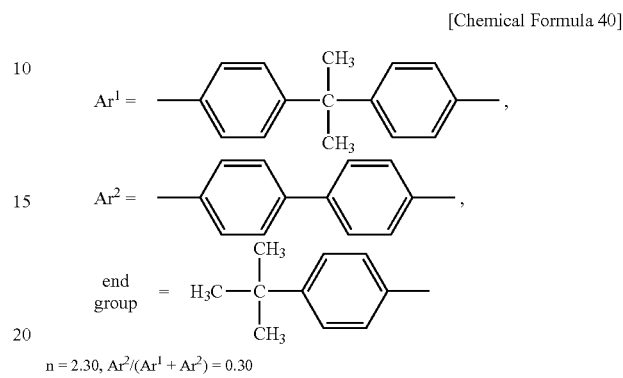

n = 2.30, Ar²/(Ar¹ + Ar²) = 0.30

Example 10

A PC copolymer (PC-10) was manufactured in the same manner as that in Example 2 except that 1.1 g of 2,7-dihydroxynaphthalene was replaced by 1.8 g of 4,4'-biphenol.

The PC copolymer (PC-10) was identified as a PC copolymer having 1.16 dl/g of a reduced viscosity [$\eta_{SP}$/C] and a structure with the following repeating unit and composition in the formula (1-1). A content of diethyl carbamic acid chloride in the PC copolymer was 15 mass ppm.

[Chemical Formula 41]

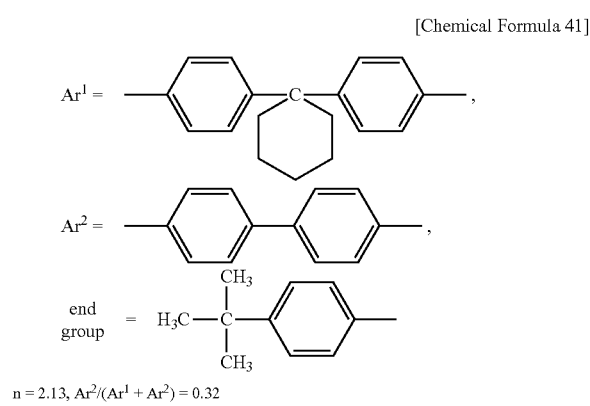

n = 2.13, Ar²/(Ar¹ + Ar²) = 0.32

Example 10A

C-CF2 (24 mL) of Manufacturing Example 9 and methylene chloride (36 mL) were injected to a reactor with a mechanical stirrer, stirring vane and baffle plate. To this solution, PTBP (0.04 g) as a terminal terminator and 0.1 g of an organic siloxane modified phenol compound represented by the following formula 1-10A were added and stirred for sufficient mixing.

A biphenol monomer solution was prepared by a monomer-solution preparation method including: preparing 10 mL of 2N aqueous sodium hydroxide; cooling the solution at the room temperature or less; adding 0.1 g of hydrosulphite and 2.6 g of 4,4'-biphenol as an antioxidant; and completely dissolving the mixed solution. All amount of the biphenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03 N hydrochloric acid one time, and with 0.1 L of water five times in this order. The obtained methylene chloride solution was dropped into warm water with stirring. While evaporating methylene chloride, a solid content of a resin was obtained. The obtained deposit was filtered and dried to prepare a PC copolymer (PC-10A) with the following structure. A mass ratio of an organic siloxane modified phenylene group in the PC copolymer (PC-10A) is 3 mass % based on a total mass of the PC copolymer. n=39 is given in the following formula 1-10A. A content of diethyl carbamic acid chloride in the PC copolymer was 5 mass ppm.

[Chemical Formula 42]

(1-10A)

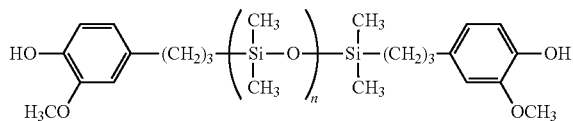

The PC copolymer (PC-10) was identified as a PC copolymer having 1.16 dl/g of a reduced viscosity $[\eta_{SP}/C]$ and a structure with the following repeating unit and composition in the formula (1-1).

Example 10B

A PC copolymer (PC-10B) was manufactured in the same manner as that in Example 10 except that 1.8 g of 4,4'-biphenol was replaced by a mixture of 1.8 g of 4,4'-biphenol and 0.2 g of an organic siloxane modified phenol compound represented by the following formula 1-10B. A mass ratio of an organic siloxane modified phenylene group in the PC copolymer (PC-10B) is 3 mass % based on a total mass of the PC copolymer. n=90 is given in the following formula 1-10B.

[Chemical Formula 44]

(1-10B)

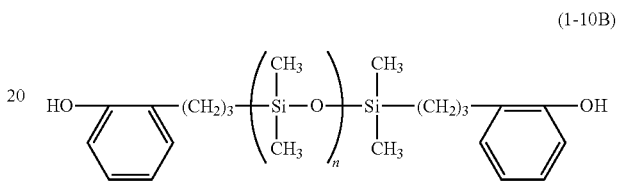

The PC copolymer (PC-10B) was identified as a PC copolymer having 1.16 dl/g of a reduced viscosity $[\eta_{SP}/C]$ and a structure with the following repeating unit and composition in the formula (1-1). A content of diethyl carbamic acid chloride in the PC copolymer was 5 mass ppm.

[Chemical Formula 45]

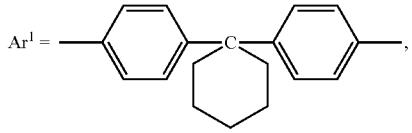

[Chemical Formula 43]

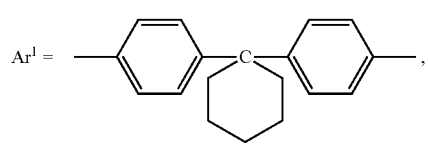

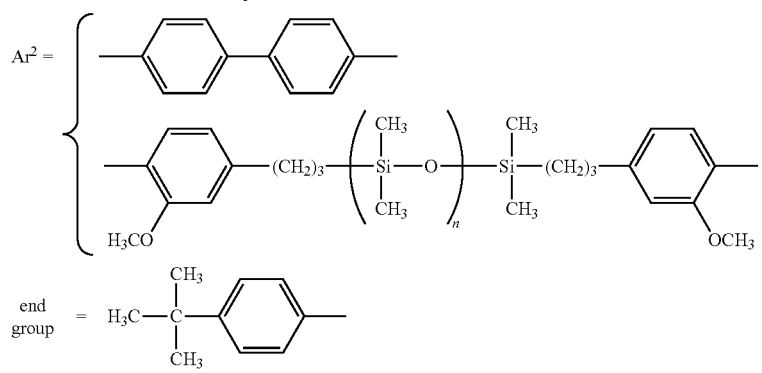

n = 1.38, $Ar^2/(Ar^1 + Ar^2) = 0.42$

-continued

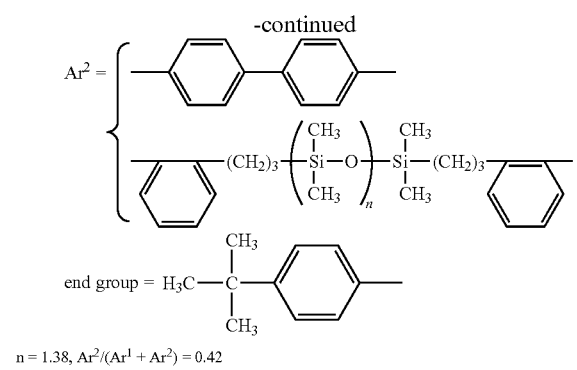

n = 1.38, $Ar^2/(Ar^1 + Ar^2) = 0.42$

Example 10C

A PC copolymer (PC-10C) was manufactured in the same manner as that in Example 10 except that 1.8 g of 4,4'-biphenol was replaced by a mixture of 1.8 g of 4,4'-biphenol and 0.2 g of an organic siloxane modified phenol compound represented by the following formula 1-10C. A mass ratio of an organic siloxane modified phenylene group in the PC copolymer (PC-10C) is 3 mass % based on a total mass of the PC copolymer. n=150 is given in the following formula 1-10C.

[Chemical Formula 46]

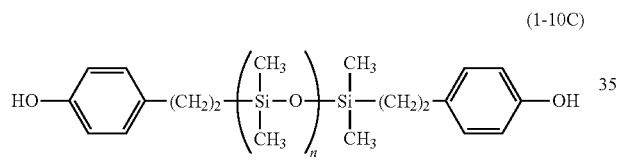
(1-10C)

The PC copolymer (PC-10C) was identified as a PC copolymer having 1.12 dl/g of a reduced viscosity [$\eta_{SP}/C$] and a structure with the following repeating unit and composition in the formula (1-1). A content of diethyl carbamic acid chloride in the PC copolymer was 5 mass ppm.

[Chemical Formula 47]

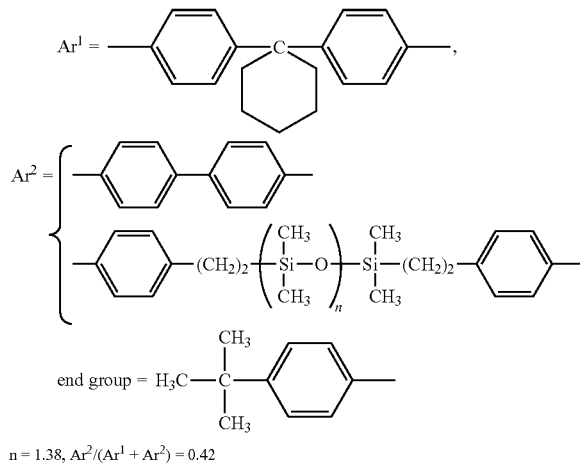

n = 1.38, $Ar^2/(Ar^1 + Ar^2) = 0.42$

Example 10D

A PC copolymer (PC-10D) was manufactured in the same manner as that in Example 10 except that 1.8 g of 4,4'-biphenol was replaced by a mixture of 1.8 g of 4,4'-biphenol and 0.2 g of an organic siloxane modified phenol compound represented by the following formula 1-10D. A mass ratio of an organic siloxane modified phenyl group in the PC copolymer (PC-10D) is 3 mass % based on a total mass of the PC copolymer. n=60 is given in the following formula 1-10D. A content of diethyl carbamic acid chloride in the PC copolymer was 5 mass ppm.

[Chemical Formula 48]

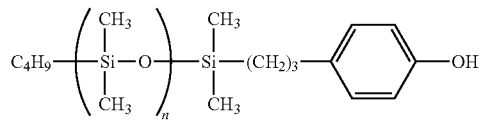
(1-10D)

[Chemical Formula 49]

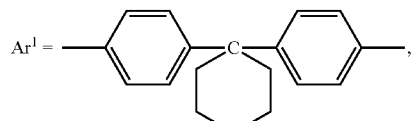

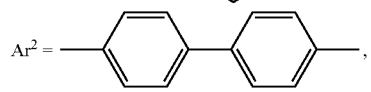

end group = 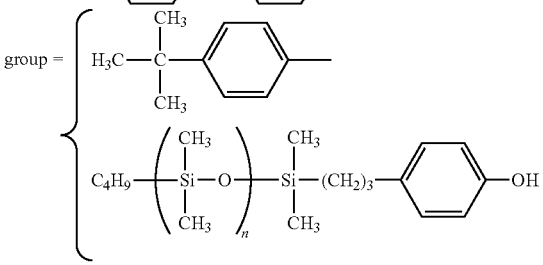

n = 1.38, $Ar^2/(Ar^1 + Ar^2) = 0.42$

Example 11

DHDE-CF (24 mL) of Manufacturing Example 10 and methylene chloride (36 mL) were injected to a reactor with a mechanical stirrer, stirring vane and baffle plate. To the reactor, p-tert-butylphenol (hereinafter referred to as PTBP) (0.04 g) as a terminal terminator was added and stirred for sufficient mixing.

A biphenol monomer solution was prepared by a monomer-solution preparation method including: preparing 10 mL of 2N aqueous sodium hydroxide; cooling the solution at the room temperature or less; adding 0.1 g of hydrosulphite and 2.6 g of 4,4'-biphenol as an antioxidant; and completely dissolving the mixed solution. All amount of the biphenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03 N hydrochloric acid one time, and with 0.1 L of water five times in this order. The obtained methylene chloride solution was dropped into warm water with stirring. While evaporating methylene chloride, a solid content of a resin was obtained. The obtained deposit was filtered and dried to prepare a polycarbonate copolymer (PC-101) with the following structure.

The PC copolymer (PC-101) was identified as a PC copolymer having 1.05 dl/g of a reduced viscosity [$\eta_{SP}$/C] and a structure with the following repeating unit and composition in the formula (1-1). A content of diethyl carbamic acid chloride in the PC copolymer was 10 mass ppm.

[Chemical Formula 50]

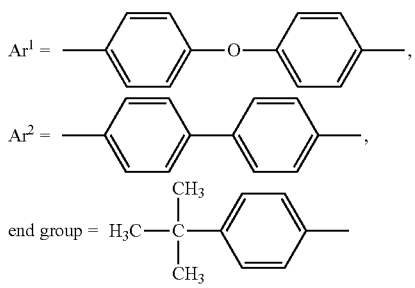

n = 1.38, $Ar^2/(Ar^1 + Ar^2)$ = 0.42

The PC copolymers obtained in Examples 10 to 10D were further evaluated in terms of a contact angle with water and toner adherability as follows.

Evaluation of Contact Angle with Water

A film was manufactured only by the PC copolymer. A contact angle with ultra-pure water was measured using the film.

DM700 (manufactured by Kyowa Interface Science Co., Ltd) was used as a measuring instrument for measurement of the contact angle.

Evaluation of Toner Adhesiveness

As described above, the electrophotographic photoreceptor was manufactured by using the PC copolymer and evaluated with a commercially available printer (FS-600, manufactured by KYOCERA Corporation.

Specifically, the printer, in which the electrophotographic photoreceptor was mounted on a drum, was repeatedly operated for one hour under ambient temperature and normal humidity (23 degrees C., 50%).

A state where toner was adhered to the electrophotographic photoreceptor in a predetermined central area (a square of 2 cm×2 cm) was visually observed. Evaluation criteria were as follows.

Evaluation Criteria

⊚: no adhesion of toner in the evaluated area of the electrophotographic photoreceptor
○: slight adhesion of toner, which was removable by blowing air.
x: adhesion of toner, which was not removable by blowing air.

Comparative Example 1

According to Example 2 of JP-A-5-70582, a PC copolymer (PC-11) having a mass average molecular weight of 60,000 in terms of GPC polystyrene was manufactured as follows.

625 mL of methylene chloride was added to a reactor with a stirrer and a thermometer, to which 35.3 g of bisphenol A bischloroformate was added with stirring for dissolution. 125 mL of ion-exchange water was further added to this solution. Subsequently, a solution obtained by dissolving 18.6 g of biphenol in 228.6 g of 3.5%-aqueous sodium hydroxide was dropped into the above solution at 20 to 25 degrees C. for one hour. After completion of dropping, stirring was continued at the same temperature for four hours. 14.3 g of 28%-aqueous sodium hydroxide was further added and stirring was continued for five hours. When the molecular weight was 60,000 (GPC in terms of polystyrene), stirring was stopped and left still.

The obtained reactant solution was injected into ice water. Deposited crystals obtained by filtration were cleaned with water and dried, followed by recrystallization with acetone, whereby PC-11 was obtained.

A reduced viscosity [$\eta_{sp}$/C] of this PC copolymer was 0.53 dl/g.

Comparative Example 2

A solution prepared by dissolving 1,1-bis(4-hydroxyphenyl)cyclohexane (bisphenol Z) (0.17 kg) and 4,4'-biphenol (0.03 kg) in 1.5 L of 2N aqueous potassium hydroxide was mixed with 1.0 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (36 mL) was added to the above oligomer (26 mL). To this solution, PTBP (0.065 g) was added as a terminal terminator and stirred for sufficient mixing. A biphenol monomer solution was prepared by a monomer-solution preparation method including: preparing 15 mL of 2N aqueous sodium hydroxide; cooling the solution at the room temperature or less; adding 0.02 g of hydrosulphite and 1.2 g of 4,4'-biphenol; and completely dissolving the mixed solution. All amount of the biphenol monomer solution separately prepared as described above was added to the above PTBP solution. 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.01 N hydrochloric acid one time, and with 0.1 L of water three times in this order. The obtained methylene chloride solution was dropped into methanol with stirring. The obtained redeposit was filtered and dried to prepare a PC resin (PC-12) with the following structure.

A reduced viscosity [$\eta_{sp}$/C] of PC-12 was 1.10 dl/g.

[Chemical Formula 51]

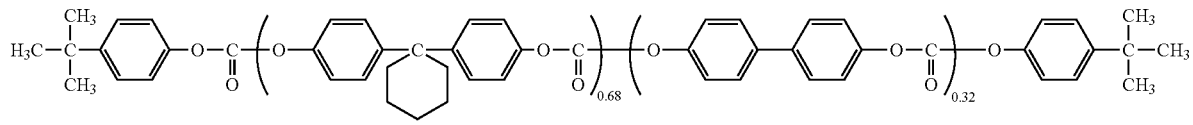

Comparative Example 3

A solution prepared by dissolving 0.2 kg of 1,1-bis(4-hydroxyphenyl)cyclohexane (bisphenol Z) in 1.2 kg of 16 mass %-aqueous potassium hydroxide was mixed with 1.3 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (190 mL) was added to the above oligomer (260 mL). To this solution, p-tert-butylphenol (0.89 g) was added as a terminal terminator and stirred for sufficient mixing. After 30 mL of 2N aqueous potassium hydroxide separately prepared was added in this solution, 1 mL of triethylamine solution (7 vol %) was added with stirring for ten minutes. A biphenol monomer solution was prepared by a monomer-solution preparation method including: preparing 120 mL of 2N aqueous potassium hydroxide; cooling the solution at the room temperature or less; adding 0.1 g of hydrosulphite and 17.3 g of 1,1-bis(4-hydroxyphenyl)cyclohexane; and completely dissolving the mixed solution. All amount of the biphenol monomer solution separately prepared as described above was added to the above PTBP solution and kept on stirring for one hour.

The obtained reaction mixture was diluted with 2 L of methylene chloride and 1 L of water and cleaned. A lower layer was separated from the reaction mixture. Then, the reaction mixture was cleaned with 1 L of water one time, with 1 L of 0.01 N hydrochloric acid one time, and with 1 L of water three times in this order. The obtained methylene chloride solution was dropped into methanol with stirring. The obtained redeposit was filtered and dried to provide a PC copolymer of bisphenol Z (PC-13) with chain ends terminated by p-tert-butyl phenyl groups.

A reduced viscosity [$\eta_{sp}/C$] of PC-13 was 0.50 dl/g.

Comparative Example 4

A PC copolymer (PC-14) was manufactured in the same manner as that in Example 10 except that the bisphenol Z oligomer used in Example 10 was replaced by the bisphenol Z oligomer manufactured in Manufacturing Example 10. The PC copolymer (PC-14) had the same structure and the reduced viscosity as the PC copolymer of Example 10. A content of diethyl carbamic acid chloride in the PC copolymer was 110 mass ppm.

Evaluation Result

Table 1 shows evaluation results of Examples 1 to 10D and Comparative Examples 1 to 4. Comparing Examples 1 to 10D with Comparative Examples 1 to 4, the PC copolymers of Examples 1 to 10D were found to have an excellent wear resistance since solubility of the PC copolymers was kept stable in the organic solvent and a mass reduction of the PC copolymers in wear resistance evaluation was small. Moreover, because of a small value of the initial residual potential ($V_R$) and the repeating residual potential (increase in $V_R$), the electrophotographic photoreceptors of Examples 1 to 10D were found to have excellent wear resistance, electrical characteristics and electrification characteristics.

On the other hand, in Comparative Examples 1 and 2, the PC copolymers were found to have poor solubility. The electrophotographic photoreceptors were found to have poor electrical characteristics and electrification characteristics because the initial residual potential and the repeating residual potential both were large or immeasurable.

The PC copolymer and the electrophotographic photoreceptor of Comparative Example 3 were found to have poor wear resistance because of large mass reduction showing wear resistance.

In Examples 1 to 10D, since the number of cleaning times of bischloroformate was increased, almost no impurity remained in the PC copolymer, resulting in favorable initial residual potential and repeating residual potential. However, in Comparative Example 4, because of a small number of cleaning times of bischloroformate, a lot of impurities remained in the PC copolymer, resulting in poor initial residual potential and repeating residual potential.

Further, as shown in Table 2, since the divalent organic siloxane modified phenylene group was contained in each PC copolymer in Examples 10A to 10C and the monovalent organic siloxane modified phenyl group was contained in the PC copolymer in Example 10D, the contact angle with water and toner adherability were found to be enhanced in Examples 10A to 10D as compared with those in Example 10 having no organic siloxane modified phenylene group or phenyl group.

In Table 1, * represents the content of diethyl carbamic acid chloride.

TABLE 1

|  | PC copolymer | | | | Electrophotographic Photoreceptor | | |
| --- | --- | --- | --- | --- | --- | --- | --- |
|  | Reduced Viscosity (dl/g) | Wear Resistance (mg) | Solubility | *Impurity content (mass ppm) | Wear Resistance (mg) | Initial Residual Potential ($V_R$) | Repeating Residual Potential (increase in $V_R$) |
| Example 1 (PC-1) | 1.13 | 0.57 | ○ | 15 | 1.6 | −10 | 20 |
| Example 2 (PC-2) | 1.13 | 0.3 | ○ | 10 | 0.7 | −10 | 10 |
| Example 3 (PC-3) | 1.24 | 0.45 | ○ | 10 | 0.8 | −10 | 10 |
| Example 4 (PC-4) | 0.51 | 0.74 | ○ | 30 | 2.6 | −10 | 30 |
| Example 5 (PC-5) | 1.11 | 0.44 | ○ | 20 | 0.8 | −10 | 20 |
| Example 6 (PC-6) | 0.5 | 0.65 | ○ | 35 | 2.2 | −10 | 30 |
| Example 7 (PC-7) | 1.13 | 0.48 | ○ | 35 | 0.8 | −10 | 30 |
| Example 8 (PC-8) | 0.5 | 0.75 | ○ | 35 | 2.6 | −10 | 30 |
| Example 9 (PC-9) | 0.52 | 0.84 | ○ | 20 | 3.1 | −10 | 20 |
| Example 10 (PC-10) | 1.16 | 0.33 | ○ | 15 | 0.6 | −10 | 20 |
| Example 11 (PC-101) | 1.05 | 0.59 | ○ | 10 | 1.6 | −10 | 10 |
| Example 10A (PC-10A) | 1.16 | 0.33 | ○ | 5 | 0.4 | −10 | 0 |
| Example 10B (PC-10B) | 1.16 | 0.33 | ○ | 5 | 0.4 | −10 | 0 |

TABLE 1-continued

| | PC copolymer | | | | Electrophotographic Photoreceptor | | |
|---|---|---|---|---|---|---|---|
| | Reduced Viscosity (dl/g) | Wear Resistance (mg) | Solubility | *Impurity content (mass ppm) | Wear Resistance (mg) | Initial Residual Potential ($V_R$) | Repeating Residual Potential (increase in $V_R$) |
| Example 10C (PC-10C) | 1.16 | 0.33 | ○ | 5 | 0.4 | −10 | 0 |
| Example 10D (PC-10D) | 1.16 | 0.33 | ○ | 5 | 0.4 | −10 | 0 |
| Comparative Example 1 (PC-11) | 1.53 | immeasurable | x | — | immeasurable | immeasurable | immeasurable |
| Comparative Example 2 (PC-12) | 1.1 | 0.33 | whitened | — | 0.9 | −100 | 200 |
| Comparative Example 3 (PC-13) | 0.5 | 0.92 | ○ | — | 3.5 | −10 | 20 |
| Comparative Example 4 (PC-14) | 1.16 | 0.33 | ○ | 110 | 0.6 | −50 | 100 |

TABLE 2

| | Film of PC copolymer Contact Angle with Water (degree) | Electrophotograhic Photoreceptor Toner Adherability |
|---|---|---|
| Example 10 (PC-10) | 91 | ○ |
| Example 10A (PC-10A) | 104 | ◉ |
| Example 10B (PC-10B) | 104 | ◉ |
| Example 10C (PC-10C) | 104 | ◉ |
| Example 10D (PC-10D) | 104 | ◉ |

Second Exemplary Embodiment

A second exemplary embodiment of the invention will be described in detail below.

In describing this exemplary embodiment, what has been described in the above first exemplary embodiment will be omitted or simplified.

Structure of PC Copolymer

A PC copolymer according to this exemplary embodiment is a polycarbonate copolymer having a repeating unit represented by a formula (2-1) below and a molar copolymer composition represented by $Ar^2/(Ar^1+Ar^2)$ is in a range of 25 mol % to 47 mol %.

[Chemical Formula 52]

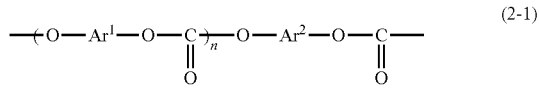

(2-1)

In the formula, $Ar^1$ is a group represented by a formula (2-2) below. $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane. n, which is an average repeating number of an $Ar^1$ block, represents a numeral of 1.09 to 3.00.

The PC copolymer according to this exemplary embodiment is typically manufactured by forming $Ar^1$ block and reacting the $Ar^1$ block with a monomer having $Ar^2$. Accordingly, n is not a numeral of 1.0 or less. n is preferably in a range of 1.09 to 3.00, more preferably in a range of 1.09 to 2.50. When n is less than 1.09, regularity of the repeating unit becomes so high that characteristics of crystalline monomer may be excessively exhibited, thereby deteriorating solubility of the PC copolymer. When n is more than 3.00, it is difficult to sufficiently increase the content of crystalline components contained in the PC copolymer, so that improvement in wear resistance may become insufficient.

In the PC copolymer according to this exemplary embodiment, the content of the monomer unit of $Ar^2$ is in a range of 25 mol % to 47 mol %, preferably in a range of 29 mol % to 47 mol %, more preferably in a range of 32 mol % to 47 mol %, particularly preferably in a range of 38 mol % to 45 mol %.

When $Ar^2$ is more than 47 mol %, the PC copolymer becomes a copolymer having a highly regular structure, which is analogous to an alternate copolymer. Accordingly, when the PC copolymer is formed by wet process, solubility of the PC copolymer in the organic solvent is decreased. When $Ar^2$ is less than 25 mol %, improvement in wear resistance of the PC copolymer becomes insufficient. The aforementioned mol % is a value obtained when the molar copolymer composition represented by $Ar^2/(Ar^1+Ar^2)$ is represented by percentage.

In a block copolymer to have a single block for each of $Ar^1$ and $Ar^2$, solubility of the block component of $Ar^2$ is low. Accordingly, a polymer solution obtained by dissolving the block copolymer in an organic solvent may be whitened. Such a polymer solution is not favorable as a coating liquid.

In the formula (2-1), $Ar^1$ is represented by the following formula (2-2).

[Chemical Formula 53]

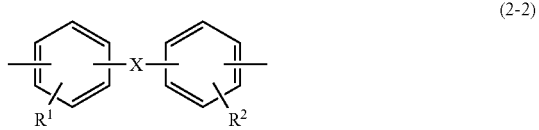

(2-2)

In the formula, $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms. $R^1$ and $R^2$ may be a plurality of groups for a single aromatic ring. In this case, the plurality of groups may be the same or different. X represents a substituted or unsubstituted cycloalkylidene group having 5 to 20 carbon atoms, a substituted or unsubstituted bicyclo- or tricyclo-hydrocarbon-diyl group having 5 to 20 carbon atoms, or a group represented by a formula (2-3) below.

[Chemical Formula 54]

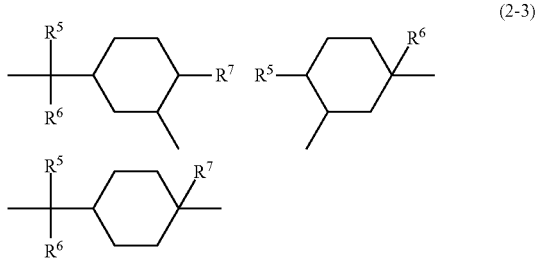

(2-3)

In the formula, $R^5$ to $R^7$ each independently represent a hydrogen atom, an alkyl group having 1 to 12 carbon atoms, a trifluoromethyl group or a substituted or unsubstituted aryl group having 6 to 12 carbon atoms.

A structure of the formula (2-2) is preferably a structure of a formula (2-2') in terms of availability and solubility of ingredients. $R^1$, $R^2$, $R^5$, $R^6$ and $R^7$ are preferably a hydrogen atom and an alkyl group having 1 to 12 carbon atoms or a substituted or unsubstituted aryl group having 6 to 12 carbon atoms in terms of availability and solubility of ingredients.

[Chemical Formula 55]

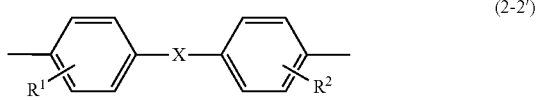

(2-2')

Examples of a halogen atom forming $R^1$ and $R^2$ are a fluorine atom, a chlorine atom and a bromine atom.

Examples of the alkyl group having 1 to 12 carbon atoms which forms $R^1$, $R^2$, $R^5$, $R^6$ and $R^7$ are a linear or branched alkyl group. Examples thereof are a methyl group, an ethyl group, propyl groups, butyl groups, pentyl groups and hexyl groups. Also, the alkyl group may be a cyclic alkyl group such as a cyclohexyl group. Further, a part or an entirety of the hydrogen atom in the alkyl group may be substituted by a halogen atom. Examples of other substituents are a trifluoromethyl group, an aryl group having 6 to 12 carbon atoms, an alkoxy group having 1 to 12 carbon atoms and an aryloxy group having 6 to 12 carbon atoms. Examples of the alkyl group forming the substituents are the same groups as the above. Examples of the aryl group forming the substituents are the following groups.

Examples of the aryl group having 6 to 12 carbon atoms which forms $R^1$, $R^2$, $R^5$, $R^6$ and $R^7$ are a phenyl group.

The above groups are examples for the alkyl group and the aryl group which form the alkoxy group having 1 to 12 carbon atoms and the aryloxy group having 6 to 12 carbon atoms, the alkoxy group and the aryloxy group forming $R^1$ and $R^2$.

When the aryl group and the aryloxy group have a substituent in the above groups, for instance, the substituent may be an alkyl group having 1 to 6 carbon atoms. Examples of the alkyl group having 1 to 6 carbon atoms are the groups exemplified in the above description for $R^1$ and $R^2$. Examples of other substituents are a halogen atom and a trifluoromethyl group.

All of $R^1$, $R^2$, $R^5$, $R^6$ and $R^7$ may be a hydrogen atom. When a plurality of groups other than the hydrogen atom are present for $R^1$, $R^2$, $R^5$, $R^6$ and $R^7$, the plurality of groups may be the same or different.

The substituted or unsubstituted cycloalkylidene group having 5 to 20 carbon atoms which forms X is exemplified by a cycloalkylidene group derived from cyclopentane, cyclohexane, cycloheptane, cyclooctane, cyclononane and cyclodecane. Further, the cycloalkylidene group derived from adamantane, tricyclodecane, dicyclopentadiene and norbornene. The substituent for the cycloalkylidene group is exemplified by an alkyl group having 1 to 6 carbon atoms. Examples of the alkyl group having 1 to 6 carbon atoms are the groups exemplified in the above description for $R^1$ and $R^2$. Not only a single substituent but a plurality of different substituents may be added. The substituted or unsubstituted bicyclo- or tricyclo-hydrocarbon-diyl group having 5 to 20 carbon atoms which forms X is exemplified by a group derived from adamantine. A substituent for the bicyclo- or tricyclo-hydrocarbon-diyl group is exemplified by the same groups as the substituents for the cycloalkylidene group.

$Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane.

When $Ar^2$ is a biphenol derivative, the biphenol derivative is preferably bonded to oxygen at 4,4'-position in terms of improvement in mechanical properties and wear resistance. When $Ar^2$ is a naphthalene derivative, the naphthalene derivative is bonded to an oxygen atom at one of 1 to 8-positions. The naphthalene derivative is preferably bonded to an oxygen atom at 2,7-position, 2,6-position, 1,4-position or 1,5-position in terms of improvement in mechanical properties and wear resistance. A bonding position of $Ar^2$ with other substituents and oxygen atoms is the same as those in the description for $Ar^1$.

In this exemplary embodiment, it is preferable that the examples of $Ar^2$ further include a divalent organic siloxane modified phenylene group in the same manner as that in the first exemplary embodiment.

In the same manner as in the first exemplary embodiment, in a solution where the PC copolymer according to this exemplary embodiment is dissolved in a solvent of methylene chloride at a concentration of 0.5 g/dl, the PC copolymer preferably exhibits reduced viscosity $[\eta_{SP}/C]$ at 20 degrees C. in a range of 0.1 dl/g to 5 dl/g, more preferably 0.2 dl/g to 3 dl/g, particularly preferably 0.3 dl/g to 2.5 dl/g. When the reduced viscosity $[\eta_{sp}/C]$ is less than 0.1 dl/g, wear resistance of the PC copolymer may be insufficient in use for the electrophotographic photoreceptor. When the reduced viscosity $[\eta_{sp}/C]$ is more than 5 dl/g, coating viscosity of the PC copolymer may become too high for manufacturing a molded product (the electrophotographic photoreceptor and the like) from a coating liquid, so that productivity of the electrophotographic photoreceptor may be unfavorably lowered.

In this exemplary embodiment, the PC copolymer of the formula (2-1) is preferably a polycarbonate copolymer having a chain end terminated by a monovalent aromatic group or a monovalent fluorine-containing aliphatic group in terms of improvement in electrical properties.

The PC copolymer with improved electric properties has a monovalent aromatic group or a monovalent fluorine-containing aliphatic group as an end group. The monovalent aromatic group may be a group containing an aliphatic group such as an alkyl group. The monovalent fluorine-containing aliphatic group may be a group containing an aromatic group.

The monovalent aromatic group for the end group is preferably an aryl group having 6 to 12 carbon atoms. Examples of the aryl group are a phenyl group and a biphenyl group. Examples of the substituent for the aromatic group and the aliphatic group such as the alkyl group for the aromatic group are halogen atoms such as a fluorine atom, a chlorine atom and a bromine atom. The substituent for the aromatic group is exemplified by an alkyl group having 1 to 20 carbon atoms. This alkyl group may be a group substituted by a halogen atom as described above and a group substituted by an aryl group.

The monovalent fluorine-containing aliphatic group for the end group is exemplified by a fluorine-containing alkyl group having 1 to 20 carbon atoms.

When the monovalent aromatic group is at the chain end, the monovalent aromatic group may be an organic siloxane modified phenyl group in the same manner as that in the first exemplary embodiment.

Manufacturing Method of PC Copolymer

The PC copolymer according to this exemplary embodiment is exemplarily obtainable by reacting a divalent phenol compound (a comonomer represented by a formula (2-5) below) in the presence of a base with a bischloroformate oligomer having a small number of repeating units represented by a formula (2-4) below. The PC copolymer having an average repeating number of an $Ar^1$ block in a range of 1.09 to 3.0 can be manufactured by using such oligomers.

[Chemical Formula 56]

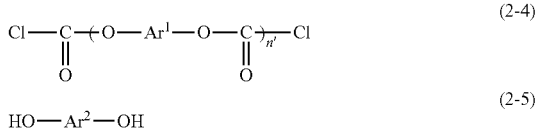

(2-4)

(2-5)

n' representing the average quantity of bischloroformate oligomer is different from n in the formula (2-1). n and n' are approximately the same, but n is larger than n'. This is because, when the manufactured $Ar^1$ oligomer reacts with a monomer including $Ar^2$, the bischloroformate group at the end of the $Ar^1$ oligomer may react with a base present in the reaction system to form a hydroxyl group, resulting in polycondensation of the hydroxyl group with another $Ar^1$ oligomer having chlorine at its end.

In the bischloroformate oligomer of the formula (2-4), the average number of repeating units n' is in a range of 1.0 to 1.99. The PC copolymer according to this exemplary embodiment is easily manufactured by using the bischloroformate oligomer having the average number of repeating units in a range of 1.0 to 1.99. A method for calculating the average number of repeating units n' is exemplified by a method described later in Examples.

In this exemplary embodiment, $Ar^1$ represented by the formula (2-2) is preferably a divalent group induced from a group selected from 1,1-bis(4-hydroxyphenyl)cyclohexane, 1,1-bis(4-hydroxyphenyl)cyclopentane, 1,1-bis(4-hydroxyphenyl)cyclododecane, 2,2-bis(4-hydroxyphenyl)adamantane, 1,3-bis(4-hydroxyphenyl)adamantane, 1,1-bis(4-hydroxyphenyl)-3,3,5-trimethylcyclohexane, 1,1-bis(3-methyl-4-hydroxyphenyl)cyclohexane, 1,1-bis(3-methyl-4-hydroxyphenyl)cyclopentane or the group represented by the formula (2-3), in terms of improvement in solubility in the organic solvent.

The oligomer represented by the formula (2-4) may contain an amido compound as impurities in the same manner as that in the first exemplary embodiment.

The manufacturing method of the PC copolymer according to this exemplary embodiment is exemplified by polycondensation of the bischloroformate oligomer induced from the divalent phenol compound represented by a formula (2-6) below and a divalent phenol compound represented by a formula (2-7) below, the divalent phenol compound induced from biphenol, dihydroxynaphthalene, hydroquinone, resorcin, catechol, 9,9-bis(hydroxyphenyl)fluorene or 4,4'-dihydroxydiphenylmethane.

(2-6)

(2-7)

Examples of the monomer represented by the formula (2-6) are 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 2,2-bis(4-hydroxyphenyl)adamantane, 2,2-bis(3-methyl-4-hydroxyphenyl)adamantane, 1,3-bis(4-hydroxyphenyl)adamantane, 1,3-bis(3-methyl-4-hydroxyphenyl)adamantane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1-1-bis(4-hydroxyphenyl)cycloheptane, 1,1-bis(3-methyl-4-hydroxyphenyl)cycloheptane, 1,1-bis(4-hydroxyphenyl)cyclooctane, 1,1-bis(3-methyl-4-hydroxyphenyl)cyclooctane, 1,1-bis(4-hydroxyphenyl)cyclononane, 1,1-bis(3-methyl-4-hydroxyphenyl)cyclononane, 1,1-bis(4-hydroxyphenyl)cyclodecane, 1,1-bis(3-methyl-4-hydroxyphenyl)cyclodecane, 1,1-bis(4-hydroxyphenyl)cycloundecane, 1,1-bis(3-methyl-4-hydroxyphenyl)cycloundecane, 1,1-bis(4-hydroxyphenyl)cyclododecane, 1,1-bis(3-methyl-4-hydroxyphenyl)cyclododecane and compounds represented by the following formulae.

[Chemical Formula 57]

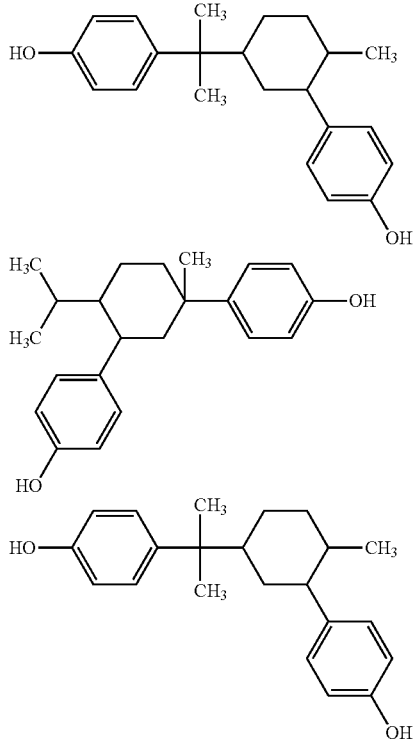

Among the above, 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 2,2-bis(4-hydroxyphenyl) adamantane, 2,2-bis(3-methyl-4-hydroxyphenyl) adamantane, 1,3-bis(4-hydroxyphenyl)adamantane, 1,3-bis (3-methyl-4-hydroxyphenyl)adamantane, 1,1-bis(3-methyl-4-hydroxyphenyl)cyclohexane, 1,1-bis(4-hydroxyphenyl) cyclododecane, and 1,1-bis(3-methyl-4-hydroxyphenyl) cyclododecane, which provide excellent solubility to the PC copolymer, are preferable.

Particularly preferable examples are 1,1-bis(4-hydroxyphenyl)cyclohexane, 1,1-bis(4-hydroxyphenyl)cyclopentane, 1,1-bis(4-hydroxyphenyl)cyclododecane, 2,2-bis(4-hydroxyphenyl)adamantane, 1,3-bis(4-hydroxyphenyl) adamantane, and 1,1-bis(4-hydroxyphenyl)-3,3,5-trimethylcyclohexane.

In addition, when the PC copolymer is applied for electrophotographic Photoreceptors, the PC copolymer is preferable since the PC copolymer provides a favorable coating liquid. One of the above may be singularly used, or two or more of the above may be used together.

Next, a monomer represented by the formula (2-7) will be described. Examples of a monomer as an ingredient for $Ar^2$ (the other component unit of the PC copolymer of this exemplary embodiment) are a biphenol monomer and a bisphenol monomer in terms of wear resistance. The biphenol monomer and the bisphenol monomer have 2 mass % or less of solubility to methylene chloride (homopolymer) or are substantially incapable of synthesizing a homopolymer having a number average molecular weight of 10000 or more because of crystallization of polymers formed during a polycarbonate synthesis reaction by the interfacial polycondensation method.

Whether the solubility to methylene chloride is 2 mass % or less is checked by whether decrease in mass of the homopolymer is 0.04 mass parts or more. Such decrease in mass of the homopolymer is calculated by immersing 2 mass parts of the solid homopolymer in 98 mass parts of methylene chloride at the room temperature for 24 hours, the homopolymer having an organic solvent content of 500 mass ppm or less and a viscosity average molecular weight in a range of 15000 to 30000; separating solids from liquid; and drying the solids.

Examples of the monomer are a biphenol compound such as 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphenol and 3,3'-dibutyl-4,4'-biphenol, hydroquinone, resorcin, 2,7-naphthalenediol, 2,6-naphthalenediol, 1,4-naphthalenediol, 1,5-naphthalenediol, 9,9-bis(3-phenyl-4-hydroxyphenyl) fluorene, 9,9-bis(4-hydroxyphenyl)fluorene, 9,9-bis(3-methyl-4-hydroxyphenyl)fluorene, bis(4-hydroxyphenyl)methane and bis(3-methyl-4-hydroxyphenyl)methane. One of the above bisphenol compounds may be singularly used, or two or more of them may be mixed for use.

Among the above, 4,4'-biphenol, hydroquinone, resorcin, 2,7-naphthalenediol, 9,9-bis(3-methyl-4-hydroxyphenyl) fluorene and bis(3-methyl-4-hydroxyphenyl)methane, which provide resins exhibiting excellent wear resistance, are preferable.

The PC copolymer according to this exemplary embodiment is obtainable by polymerizing the monomer represented by the formula (2-7) in which $Ar^2$ is a divalent organic siloxane modified phenylene group. Here, examples of the divalent organic siloxane modified phenylene group are enumerated above.

The PC copolymer according to this exemplary embodiment is obtainable by conducting interfacial polycondensation using the bischloroformate oligomer obtained from the monomer represented by the formula (2-6) and the monomer represented by the formula (2-7). For instance, by conducting interfacial polycondensation under the presence of an acid-binding agent with use of various carbonyl dihalides such as phosgene, carbonate ester bonding can be favorably formed. The above reaction(s) is conducted under the presence of a terminal terminator and/or a branching agent as needed in the same manner as that in the first exemplary embodiment. Since the terminal terminator and the branching agent are the same as those in the first exemplary embodiment, description thereof will be omitted here. Moreover, in manufacturing the PC copolymer according to this exemplary embodiment, two or more kinds of monomers derived from $Ar^2$ may be used to provide a multicomponent copolymer.

A compound having the monovalent organic siloxane modified phenyl group is preferably usable as a monovalent phenol.

Examples of the acid-binding agent usable in interfacial polycondensation are: alkaline metal hydroxides such as sodium hydroxide, potassium hydroxide, lithium hydroxide and cesium hydroxide; alkaline earth metal hydroxides such as magnesium hydroxide and calcium hydroxide; alkali metal weak acid salts/alkali earth metal weak acid salts such as sodium carbonate, potassium carbonate and calcium acetate; and an organic base such as pyridine. Preferable examples are alkaline metal hydroxides/alkaline earth metal hydroxides such as sodium hydroxide, potassium hydroxide and calcium hydroxide. These acid-binding agents can be used in mixture. Use ratio of the acid-binding agent may be also suitably adjusted in consideration of stoichiometric proportion (equivalent amount) in the reaction. Specifically, per 1 mol of a hydroxyl group of the divalent phenol (ingredient), 1 equivalent or more, preferably 1 to 10 equivalent of the acid-binding agent may be used.

Since the solvent, catalyst and additives used here are the same as those in the first exemplary embodiment, description thereof will be omitted here.

The manufacturing method of the PC copolymer according to this exemplary embodiment is specifically applicable in various embodiments. For instance, the bischloroformate oligomer having a small number of repeating units is manufactured by reacting the bisphenol compound represented by the formula (2-6) with phosgene, and then the bischloroformate oligomer is reacted with the monomer represented by the formula (2-7) under the presence of a mixture of the above solvent and an alkali aqueous solution of the above acid-binding agent. This method is preferable in that n in the formula (2-1) is adjustable to a preferable range.

When the bischloroformate oligomer is manufactured by the following method, the method is preferable in that cleaning process in manufacturing the polycarbonate copolymer can be simplified.

A manufacturing method of the bischloroformate oligomer having n' of the formula (2-4) in a range of 1.0 to 1.99 is exemplified by the following. Firstly, the bisphenol compound of the formula (2-6) is suspended in a hydrophobic solvent such as methylene chloride and is added with phosgene to provide a mixed solution. On the other hand, a tertiary amine such as triethylamine is dissolved in a hydrophobic solvent such as methylene chloride to form a solution. The solution is dropped into the above mixed solution at the room temperature or less for reaction. Hydrochloric acid and deionized water are added to a residual solution of the obtained reactant mixture for cleaning. An organic layer including a polycarbonate oligomer having a small number of repeating units is obtained.

A dropping temperature and a reaction temperature are typically in a range of 0 to 70 degrees C., preferably in a range of 5 to 65 degrees C. Reaction time is in a range of 15 minutes to 4 hours, preferably 30 minutes to 3 hours. The polycarbonate oligomer thus obtained preferably has an average number of repeating units (n') in a range of 1.00 to 1.99, more preferably in a range of 1.00 to 1.60.

An organic phase containing the bischloroformate oligomer thus obtained having a small number of repeating units is added with the divalent phenol monomer having a different skeleton represented by the formula (2-7) for reaction. The reaction temperature is 0 to 150 degrees C., preferably 5 to 40 degrees C., particularly preferably 10 to 25 degrees C.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 2 hours.

In the reaction, the divalent phenol monomer represented by the formula (2-7) is desirably added in a form of an aqueous solution or an organic-solvent solution. The order of the addition is not specifically limited. In the above manufacturing method, the catalyst, the terminal terminator, the branching agent and the like may be added as needed at the time of manufacturing bischloroformate or at the time of subsequent polymerization reaction, or both at the time of manufacturing bischloroformate oligomer and at the time of subsequent polymerization reaction.

The PC copolymer thus obtained is a copolymer formed of a repeating unit(s) represented by a formula (2-10) below and a repeating unit(s) represented by a formula (2-11) below.

As long as an object of the invention is not hampered, the PC copolymer may contain a polycarbonate unit having a structure unit other than those of the formulae $Ar^1$ and $Ar^2$, or a unit having a polyester structure or a polyether structure.

[Chemical Formula 58]

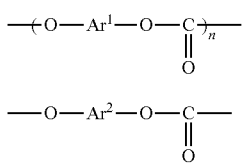

(2-10)

(2-11)

Structure of Coating Liquid

A coating liquid according to this exemplary embodiment at least contains the PC copolymer according to this exemplary embodiment and a solvent capable of dissolving or dispersing the PC copolymer according to this exemplary embodiment. Since the structure and the contents of the coating liquid are the same as those of the first exemplary embodiment except that the PC copolymer according to this exemplary embodiment is used, description thereof will be omitted here.

Structure of Electrophotographic Photoreceptor

As long as the above-described PC copolymer is used in a photosensitive layer, the electrophotographic photoreceptor according to this exemplary embodiment may be any electrophotographic photoreceptor (e.g. one of known various electrophotographic photoreceptors). However, the photosensitive layer of the electrophotographic photoreceptor is preferably a layered electrophotographic photoreceptor including at least one charge generating layer and at least one charge transporting layer, or alternatively the photosensitive layer of the electrophotographic photoreceptor is preferably a single-layer electrophotographic photoreceptor including both a charge generating material and a charge transporting material. Since the structure and the contents of the electrophotographic photoreceptor are the same as those of the first exemplary embodiment except that the PC copolymer according to this exemplary embodiment is used, description thereof will be omitted here.

Examples of Second Exemplary Embodiment

Next, examples and comparatives of a second exemplary embodiment will be described in detail. However, the second exemplary embodiment is not limited to the examples but may include various modifications and applications as long as such modifications and applications do not depart from a technical idea of the invention.

MANUFACTURING EXAMPLE

Preparation of Oligomer

Manufacturing Example 1: Synthesis of Bisphenol Z Oligomer (Bischloroformate)

73.0 g (0.272 mol) of 1,1-bis(4-hydroxyphenyl)cyclohexane (bisphenol Z) was suspended in 410 mL of methylene chloride, to which 55.3 g (0.546 mol) of triethylamine was added for dissolution. The obtained solution was dropped into a solution, which was prepared by dissolving 54.5 g (0.551 mol) of phosgene in 225 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol Z oligomer having a chloroformate group at its molecular terminal was obtained. The obtained solution had a chloroformate concentration of 0.91 mol/L, a solid concentration of 0.22 kg/L and an average number of repeating units of 1.31. A content of an amide compound contained in the obtained bisphenol Z oligomer equals to a value obtained by subtracting A mass of nitrogen derived from triethylamine from a total mass of nitrogen in the bisphenol Z oligomer. The content of the amide compound was found to be 90 mass ppm based on the mass of the bisphenol Z oligomer. A mass of nitrogen derived from triethylamine was 0.3 mass ppm. The total mass of nitrogen in the bisphenol Z oligomer was determined by the chemiluminescence method according to JIS K2609 The total mass of nitrogen in the bisphenol Z was analyzed by Gas chromatography to determine an amount of triethylamine. The amount of triethylamine was converted to the mass of nitrogen. By subtracting this mass of nitrogen from the total mass of nitrogen, the mass of nitrogen derived from the amide compound was obtained. This obtained ingredient will be referred to as "Z-CF" hereinafter.

The total mass of nitrogen was determined using TS-100 manufactured by Mitsubishi Chemical Analytech Co., Ltd. according to JIS K2609 (chemiluminescence method). Measuring methods on liquid are described in JIS. Solid samples were measured using the same instruments as those for liquid.

The methylene chloride solution of the bischloroformate compound was dried and hardened at 50 degrees C. under a reduced pressure to obtain methylene chloride. The obtained solid content was used for measurement. By comparing the result of the measurement with calibration curve separately obtained based on pyridine as the reference material, the mass of nitrogen was determined. The obtained result was converted to a concentration of the bischloroformate compound in the methylene chloride solution, whereby the total mass of nitrogen in the bischloroformate compound.

0.5N—NaOH aqueous solution was added to the solid content of the bischloroformate compound obtained by the above method so that the obtained solution has 8 or more pH. To this solution, chloroform was added. Triethylamine was extracted as extraction component by chloroform extraction method and was analyzed by Gas chromatography. The amount of triethylamine was determined by the absolute calibration method.

Conditions for Gas chromatography analysis were as follows.

Product model: 7890A manufactured by Agilent Technologies
Column: CP-VOLAMINE (manufactured by Varian) with 60 m×0.32 mm (inner diameter)
Inlet temperature: 150 degrees C.
Column temperature: heating a column at 50 degrees C. per minute when the column temperature is from 40 degrees C. to 150 degrees C., keeping the column temperature at 150 degrees C. for ten minutes, and heating the column at 50 degrees C. per minute until the column temperature reached 250 degrees C.
Carrier gas: helium with a constant speed of 40 cm per second
Injected amount: 2 µl
Injection method: splitless injection
Detector: FID
FID temperature: 260 degrees C.

The average number of repeating units (n') was obtained using the following formula.

The average number of repeating units (n')=1+(Mav−M1)/M2 (Formula 1) In the formula 1, Mav represents (2×1000/(CF value), M2 represents (M1−98.92), and M1 represents a molecular weight of the bischloroformate compound when n'=1 in the formula (2-4). The CF value (N/kg) represents (CF value/concentration). The CF value represents the number of chlorine molecule in the bischloroformate compound represented by the formula (1-4) contained in 1 L of the reaction solution. The concentration (kg/L) represents an amount of the solid content obtained by concentrating the 2-L reaction solution. Herein, 98.92 is a total atom weight of two chlorine atoms, one oxygen atom and one carbon atom which are desorbed at polycondensation of the bischloroformate compounds.

Manufacturing Example 2: Synthesis of 1,1-bis(4-hydroxyphenyl-cyclododecane oligomer (Bischloroformate)

43.6 g (0.124 mol) of 1,1-bis(4-hydroxyphenyl)-cyclododecane was suspended in 410 mL of methylene chloride, to which 25.0 g (0.248 mol) of triethylamine was added for dissolution. The obtained solution was dropped into a solution, which was prepared by dissolving 24.8 g (0.250 mol) of phosgene in 225 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a 1,1-bis(4-hydroxyphenyl)-cyclododecane oligomer having a chloroformate group at its molecular terminal was obtained. The obtained solution had a chloroformate concentration of 0.92 mol/L, a solid concentration of 0.23 kg/L and an average number of repeating units of 1.06. A content of an amide compound in the obtained 1,1-bis(4-hydroxyphenyl)-cyclododecane oligomer was found to be 210 mass ppm. A mass of nitrogen derived from triethylamine was 0.3 mass ppm. This obtained ingredient will be referred to as "CDE-CF" hereinafter.

Manufacturing Example 3: Synthesis of 2,2-bis(4-hydroxyphenyl)-adamantane oligomer (Chloroformate)

33.0 g (0.103 mol) of 2,2-bis(4-hydroxyphenyl)-adamantane, 330 ml of methylene chloride and 30.6 g (0.309 mol) of phosgene were mixed into a solution. To the mixed solution, a solution prepared by mixing 23.2 g (0.229 mol) of triethylamine in 66 ml of methylene chloride was dropped. Except this treatment, synthesis of a 2,2-bis(4-hydroxyphenyl)-adamantane oligomer was performed in the same manner as that in Manufacturing Example 4. 288.2 g of a bischloroformate-containing solution was obtained.

The obtained solution had a chloroformate concentration of 0.87 mol/L, a solid concentration of 0.21 kg/L and an average number of repeating units of 1.11. A content of an amide compound in the obtained 2,2-bis(4-hydroxyphenyl)-adamantane oligomer was found to be 410 mass ppm. A mass of nitrogen derived from triethylamine was 0.3 mass ppm. This obtained ingredient will be referred to as "22Ad-CF" hereinafter.

Manufacturing Example 4: Synthesis of Bisphenol Z Oligomer (Chloroformate)

60.0 kg (224 mol) of 1,1-bis(4-hydroxyphenyl)cyclohexane (bisphenol Z) was suspended in 1080 L of methylene chloride, to which 66.0 kg (667 mol) of phosgene was added for dissolution. To the obtained solution, a solution prepared by dissolving 44.0 kg (435 mol) of triethylamine in 120 L of methylene chloride was dropped at 2.2 to 17.8 degrees C. for 2 hours and 50 minutes. After stirring at 17.9 to 19.6 degrees C. for 30 minutes, 900 L of methylene chloride was distilled away at 14 to 20 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a bisphenol Z oligomer having a chloroformate group at its molecular terminal was obtained. The obtained solution had a chloroformate concentration of 1.14 mol/L, a solid concentration of 0.23 kg/L and an average number of repeating units of 1.02. A content of an amide compound in the obtained bisphenol Z oligomer was found to be 20 mass ppm. A mass of nitrogen derived from triethylamine was 0.3 mass ppm. This obtained ingredient will be referred to as "Z-CF2" hereinafter.

Manufacturing Example 5: Synthesis of Bisphenol Z Oligomer (Chloroformate)

Synthesis of bisphenol Z oligomer was performed in the same manner as that in Manufacturing Example 1 except that the number of times for cleaning with deionized water after synthesis of the bisphenol Z oligomer (Z-CF) was decreased from four times in Manufacturing Example 1 to two times in Manufacturing Example 5.

A content of an amide compound in the obtained bisphenol Z oligomer was found to be 720 mass ppm. This obtained ingredient will be referred to as "Z-CF3" hereinafter.

Example 1

Manufacturing of PC Copolymer

A reactor was attached with a mechanical stirrer, stirring vane and baffle plate. Methylene chloride (51 mL) was added to Z-CF (9 mL) obtained in Manufacturing Example 1. To the reactor, p-tert-butylphenol (hereinafter referred to as PTBP) (0.02 g) as a terminal terminator was added and stirred for sufficient mixing. A monomer solution was prepared by a monomer-solution preparation method including: preparing 12 mL of 2N aqueous potassium hydroxide; cooling the solution at the room temperature or less; adding 0.1 g of hydrosulphite and 1.1 g of 2.7'-dihydroxynaphthalene; and completely dissolving the mixed solution. All amount of the monomer solution separately prepared as described above was added to the above PTBP solution. 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03 N hydrochloric acid one time, and with 0.1 L of water three times in this order. The obtained methylene chloride solution was dropped into methanol with stirring. The obtained redeposit was filtered and dried to prepare a polycarbonate copolymer (PC-1) with the following structure.

Identification of PC Copolymer

Then, the polycarbonate copolymer (PC-1) thus obtained was dissolved in methylene chloride to prepare a solution having a concentration of 0.5 g/dl. When reduced viscosity [$\eta_{sp}/C$] thereof at 20 degrees C. was measured, the result was 1.13 dl/g. A structure and a composition of the obtained PC-1 were analyzed by $^1$H-NMR spectrum method and $^{13}$C-NMR spectrum method. The obtained PC-1 was identified as a polycarbonate copolymer having a repeating unit, the number of the repeating unit and a composition as follows. A residual content of diethyl carbamic acid chloride in the obtained polycarbonate copolymer was found to be 10 mass ppm based on a total mass of the polycarbonate copolymer.

[Chemical Formula 59]

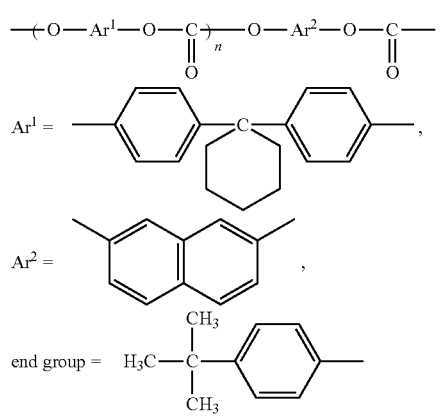

$n = 2.46$, $Ar^2/(Ar^1 + Ar^2) = 0.29$

A structure of the PC copolymer in the formula (2-1) was identified according to the following procedure. Firstly, it was confirmed using $^{13}$C-NMR spectrum method that $Ar^2$ is not bonded to another $Ar^2$. Next, a polymerization ratio of each of $Ar^1$ and $Ar^2$ was calculated using $^1$H-NMR spectrum method. Subsequently, n was calculated according to the following formula 2.

$$Ar^2/(Ar^1+Ar^2)=1/(n+1) \qquad \text{(Formula 2)}$$

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. 0.5 parts by mass of oxotitanium phthalocyanine was used as a charge generating material while 0.5 parts by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting material, 0.5 g of a compound (CTM-1) represented by the following formula (2-12) and 0.5 g of the obtained polycarbonate copolymer (PC-1) were dispersed in 10 ml of tetrahydrofuran to prepare a coating liquid. The coating liquid was applied onto the charge generating layer with an applicator and dried, thereby providing a charge transporting layer having a film thickness of approximately 20 μm.

[Chemical Formula 60]

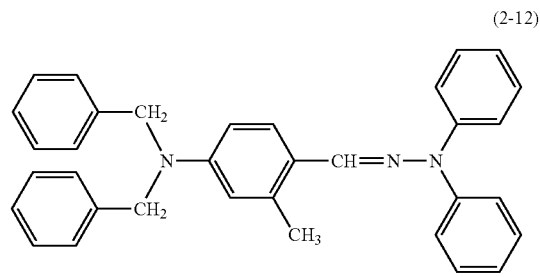

(2-12)

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as 0, a case where the PC copolymer was whitened was marked as "whitened" and a case where the PC copolymer was partially undissolved was marked as x.

Wear resistance of the PC copolymer and the electrophotographic photoreceptor was evaluated as follows.

(1) Sample preparation for evaluation on wear resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

(2) Sample preparation for evaluation on wear resistance of the photoreceptor: PC-1 (1 g) and CTM-1 (1 g) were dissolved in methylene chloride (10 mL) and the obtained solution was cast into film on a commercially available PET film using an applicator. This film was heated under reduced pressure and a solvent was removed to obtain a film sample having a thickness of about 30 μm.

(3) Evaluation: wear resistance of cast surfaces of the films manufactured at (1) and (2) process was evaluated using a Suga wear test instrument NUS-ISO-3 model (manufactured by Suga Test Instruments Co., Ltd.). Testing conditions: An abrasion paper having an alumina particle with a particle size of 3 μm was given a 4.9-N load. The sample was put into reciprocating motion 2000 times on the abrasion paper in contact with a surface of a photosensitive layer. A mass reduction of the sample was measured.

(4) Measurement of a content of impurities (diethyl carbamic acid chloride) contained in the PC copolymer: diethyl carbamic acid chloride was measured by the absolute calibration method using Gas chromatography.

Measuring conditions are as follows.
Sample: 0.5 g of the PC copolymer was dissolved in 13.3 g of methylene chloride and defined as a measuring sample.
Product model: 7890A manufactured by Agilent Technologies
Column: HP-1 with 30m×0.25 mm (inner diameter) (a film thickness: 0.25 μm)
Column temperature: heating a column at 10 degrees C. per minute when the column temperature was from 40 degrees C. to 300 degrees C., and keeping the column temperature at 300 degrees C. for 30 minutes
Inlet temperature: 300 degrees C. at split
Detector: 310 degrees C. (FID)
Carrier gas: helium with a speed of 40 cm per second
Injected amount: 1 μl Next, electrophotographic characteristics of the obtained electrophotographic photoreceptor were measured using an electrostatic charge tester EPA-8100 (manufactured by Kawaguchi Electric Works Co., Ltd.). Specifically, corona discharge of −6 kV was conducted in the static mode. Then, the initial surface potential ($V_0$), residual potential (initial residual potential ($V_R$)) after five seconds of light irradiation (10 Lux), and half-life exposure amount ($E_{1/2}$) were measured. Further, a commercially available printer (FS-600, manufactured by Kyocera Corporation) was modified so as to measure the surface potential of the photoreceptor. Then, the photoreceptor was mounted on a drum and evaluated in terms of electrification characteristics (repeating residual-potential increase ($V_R$ increase) before and after 24-hour-consecutive operation under conditions of high temperature and high humidity (35 degrees C., 85%) without use of a toner and a paper.

The results are shown in Table 3. The following Examples 2 to 4 and Comparative Examples 1 to 3 were evaluated in the same manner. The results are also shown in Table 3.

Example 2

Example 2 was performed in the same manner as Example 1 to obtain PC-2 except that Z-CF was replaced with 18 mL of CDE-CF, the content of methylene chloride was changed to 42 mL, the content of PTBP was changed to 0.02 g and 2,7-dihydroxynaphthalene was replaced with 0.8 g of resorcin.

The PC copolymer (PC-2) was identified as a PC copolymer having 1.11 dl/g of a reduced viscosity [$\eta_{SP}/C$] and a structure with the following repeating unit and composition in the formula (2-1). A residual content of diethyl carbamic acid chloride in the obtained polycarbonate copolymer was found to be 20 mass ppm based on a total mass of the polycarbonate copolymer.

[Chemical Formula 61]

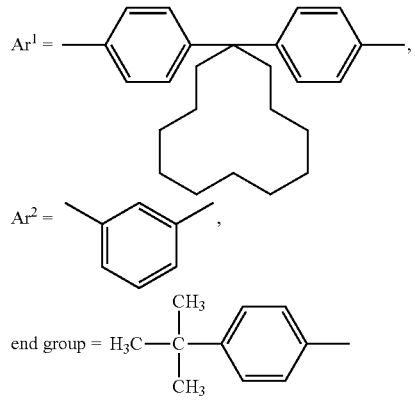

$n = 2.0, Ar^2/(Ar^1 + Ar^2) = 0.33$

Example 3

Example 3 was performed in the same manner as Example 1 to obtain PC-3 except that Z-CF was replaced with 18 mL of 22Ad-CF, the content of methylene chloride was changed to 42 mL, the content of PTBP was changed to 0.03 g, 2,7-dihydroxynaphthalene was replaced by 1.1 g of 4,4'-biphenol and the content of 2N aqueous potassium hydroxide was changed to 13 mL.

The PC copolymer (PC-3) was identified as a PC copolymer having 1.13 dl/g of a reduced viscosity [$\eta_{SP}/C$] and a structure with the following repeating unit and composition in the formula (2-1). A residual content of diethyl carbamic acid chloride in the obtained polycarbonate copolymer was found to be 35 mass ppm based on a total mass of the polycarbonate copolymer.

[Chemical Formula 62]

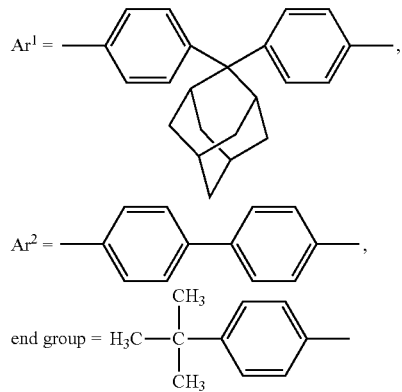

$n = 2.0, Ar^2/(Ar^1 + Ar^2) = 0.33$

Example 4

A PC copolymer (PC-4) was manufactured in the same manner as that in Example 1 except that 1.1 g of 2,7-dihydroxynaphthalene was replaced by 1.8 g of 4,4'-biphenol.

The PC copolymer (PC-4) was identified as a PC copolymer having 1.16 dl/g of a reduced viscosity [$\eta_{SP}/C$] and a structure with the following repeating unit and composition in the formula (2-1). A residual content of diethyl carbamic acid chloride in the obtained polycarbonate copolymer was found to be 15 mass ppm based on a total mass of the polycarbonate copolymer.

[Chemical Formula 63]

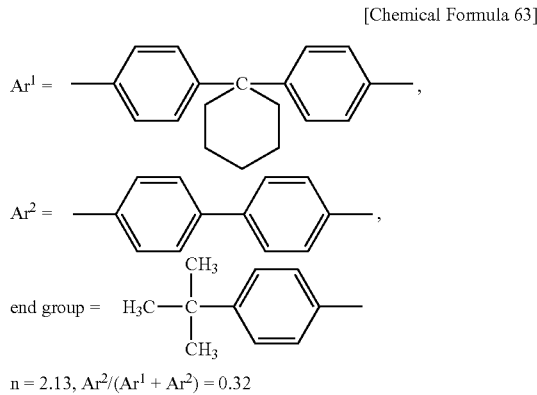

n = 2.13, Ar²/(Ar¹ + Ar²) = 0.32

Example 4A

A reactor was attached with a mechanical stirrer, stirring vane and baffle plate. Methylene chloride (36 mL) was added to Z-CF2 (24 mL) obtained in Manufacturing Example 4. To the reactor, p-tert-butylphenol (hereinafter referred to as PTBP) (0.04 g) as a terminal terminator and 0.2 g of siloxane modified phenol represented by the following formula (2-4A) were added and stirred for sufficient mixing.

A biphenol monomer solution was prepared by a monomer-solution preparation method including: preparing 10 mL of 2N aqueous sodium hydroxide; cooling the solution at the room temperature or less; adding 0.1 g of hydrosulphite and 2.6 g of 4,4'-biphenol as an antioxidant; and completely dissolving the mixed solution. All amount of a biphenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N hydrochloric acid one time, and with 0.1 L of water five times in this order. The obtained methylene chloride solution was dropped into warm water with stirring. While evaporating methylene chloride, a solid content of a resin was obtained. The obtained deposit was filtered and dried to prepare a polycarbonate copolymer (PC-4A) with the following structure. A mass ratio of an organic siloxane modified phenyl group in the PC copolymer (PC-4A) is 3 mass % based on a total mass of the PC copolymer. n=39 is given in the following formula 2-4A.

[Chemical Formula 64]

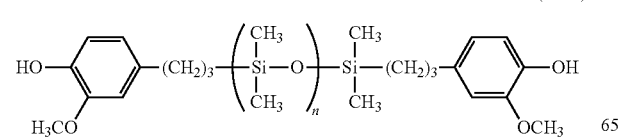

(2-4A)

The PC copolymer (PC-4A) was identified as a PC copolymer having 1.16 dl/g of a reduced viscosity [$\eta_{SP}/C$] and a structure with the following repeating unit and composition in the formula (2-1). A content of diethyl carbamic acid chloride in the PC copolymer was 5 ppm.

[Chemical Formula 65]

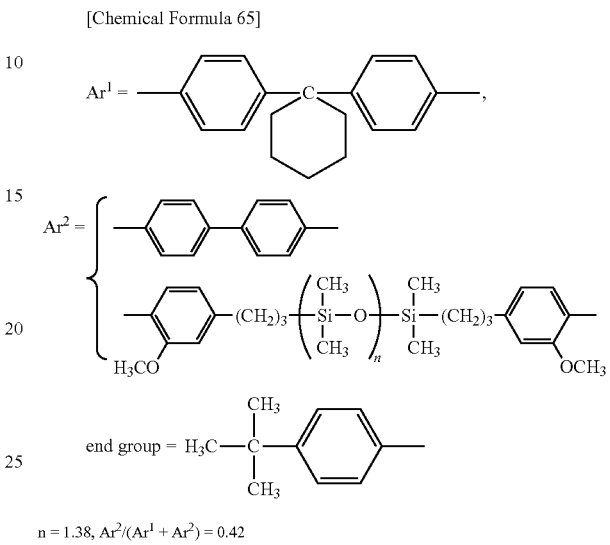

n = 1.38, Ar²/(Ar¹ + Ar²) = 0.42

Example 4B

A PC copolymer (PC-4B) was manufactured in the same manner as that in Example 4A except that siloxane modified bisphenol was replaced by 0.4 g of siloxane modified phenol represented by the following formula (2-4B). A mass ratio of an organic siloxane modified phenyl group in the PC copolymer (PC-4B) is 5 mass % based on a total mass of the PC copolymer. n=90 is given in the following formula 2-4B.

[Chemical Formula 66]

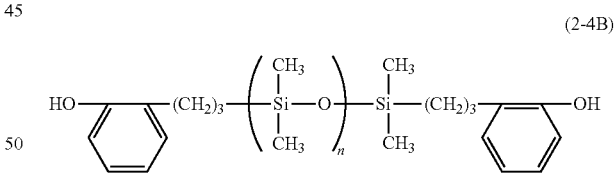

(2-4B)

The PC copolymer (PC-4B) was identified as a PC copolymer having 1.16 dl/g of a reduced viscosity [$\eta_{SP}/C$] and a structure with the following repeating unit and composition in the formula (2-1). A content of diethyl carbamic acid chloride in the PC copolymer was 5 mass ppm.

[Chemical Formula 67]

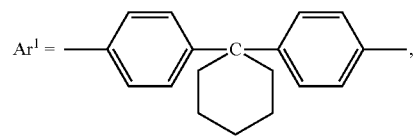

-continued

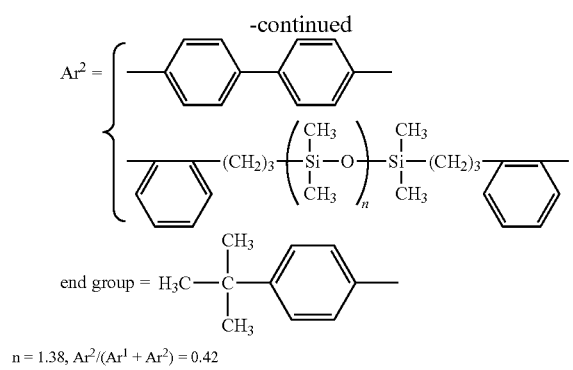

n = 1.38, Ar²/(Ar¹ + Ar²) = 0.42

Example 4C

A PC copolymer (PC-4C) was manufactured in the same manner as that in Example 4A except that siloxane modified bisphenol was replaced by 0.2 g of siloxane modified phenol represented by the following formula (2-4C). A mass ratio of an organic siloxane modified phenyl group in the PC copolymer (PC-4B) is 5 mass % based on a total mass of the PC copolymer. n=150 is given in the following formula 2-4C.

[Chemical Formula 68]

(2-4C)

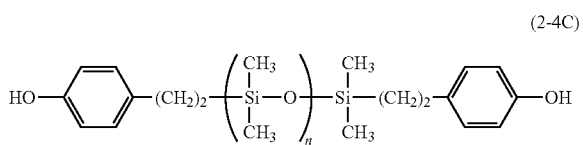

The PC copolymer (PC-4C) was identified as a PC copolymer having 1.16 dl/g of a reduced viscosity [η$_{SP}$/C] and a structure with the following repeating unit and composition in the formula (2-1). A content of diethyl carbamic acid chloride in the PC copolymer was 5 mass ppm.

[Chemical Formula 69]

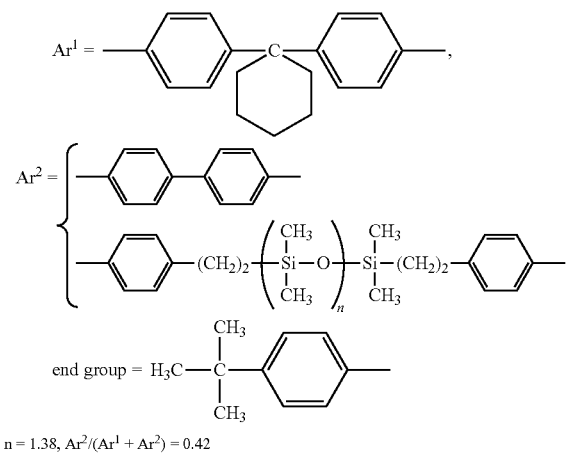

n = 1.38, Ar²/(Ar¹ + Ar²) = 0.42

Example 4D

A PC copolymer (PC-4D) was manufactured in the same manner as that in Example 4A except that siloxane modified bisphenol was replaced by 0.2 g of siloxane modified phenol represented by the following formula (2-4D). A mass ratio of an organic siloxane modified phenyl group in the PC copolymer (PC-4D) is 5 mass % based on a total mass of the PC copolymer. n=60 is given in the following formula 2-4D. A content of diethyl carbamic acid chloride in the PC copolymer was 5 mass ppm.

[Chemical Formula 70]

(2-4D)

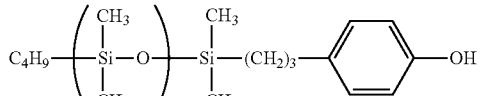

[Chemical Formula 71]

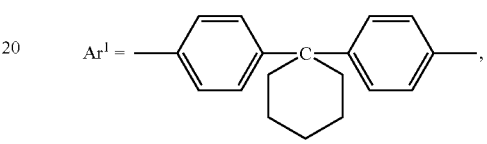

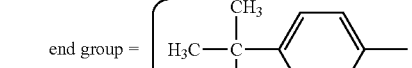

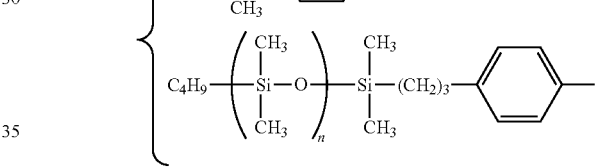

n = 1.38, Ar²/(Ar¹ + Ar²) = 0.42

The PC copolymers obtained in Examples 4A to 4D were further evaluated in terms of a contact angle with water and toner adherability as follows.

Evaluation of Contact Angle with Water

A film was manufactured only by the PC copolymer. A contact angle with ultra-pure water was measured using the film.

DM700 (manufactured by Kyowa Interface Science Co., Ltd) was used as a measuring instrument for measurement of the contact angle.

Evaluation of Toner Adhesiveness

As described above, the electrophotographic photoreceptor was manufactured by using the PC copolymer and evaluated with a commercially available printer (FS-600, manufactured by KYOCERA Corporation.

Specifically, the printer, in which the electrophotographic photoreceptor was mounted on a drum, was repeatedly operated for one hour under ambient temperature and normal humidity (23 degrees C., 50%).

A state where toner was adhered to the electrophotographic photoreceptor in a predetermined central area (a square of 2 cm×2 cm) was visually observed. Evaluation criteria were as follows.

Evaluation Criteria

⊚: no adhesion of toner in the evaluated area of the electrophotographic photoreceptor ○: slight adhesion of toner, which was removable by blowing air.

x: adhesion of toner, which was not removable by blowing air.

Comparative Example 1

According to Example 2 of JP-A-5-70582, a PC copolymer (PC-5) having a mass average molecular weight of 60,000 in terms of GPC polystyrene was manufactured as follows.

625 mL of methylene chloride was added to a reactor with a stirrer and a thermometer, to which 35.3 g of bisphenol A bischloroformate was added with stirring for dissolution. 125 mL of ion-exchange water was further added to this solution. Subsequently, a solution obtained by dissolving 18.6 g of biphenol in 228.6 g of 3.5%-aqueous sodium hydroxide was dropped into the above solution at 20 to 25 degrees C. for one hour. After completion of dropping, stirring was continued at the same temperature for four hours. 14.3 g of 28%-aqueous sodium hydroxide was further added and stirring was continued for five hours. When the molecular weight was 60,000 (GPC in terms of polystyrene), stirring was stopped and left still.

The obtained reactant solution was injected into ice water. Deposited crystals obtained by filtration were cleaned with water and dried, followed by recrystallization with acetone, whereby PC-5 was obtained.

A reduced viscosity $[\eta_{sp}/C]$ of this PC copolymer was 0.53 dl/g.

Comparative Example 2

A solution prepared by dissolving 1,1-bis(4-hydroxyphenyl)cyclohexane (bisphenol Z) (0.17 kg) and 4,4'-biphenol (0.03 kg) in 1.5 L of 2N aqueous potassium hydroxide was mixed with 1.0 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (34 mL) was added to the above oligomer (26 mL). To this solution, PTBP (0.065 g) was added as a terminal terminator and stirred for sufficient mixing. A biphenol monomer solution was prepared by a monomer-solution preparation method including: preparing 15 mL of 2N aqueous sodium hydroxide; cooling the solution at the room temperature or less; adding 0.02 g of hydrosulphite and 1.2 g of 4,4'-biphenol; and completely dissolving the mixed solution. All amount of the biphenol monomer solution separately prepared as described above was added to the above PTBP solution. 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.01N hydrochloric acid one time, and with 0.1 L of water three times in this order. The obtained methylene chloride solution was dropped into methanol with stirring. The obtained redeposit was filtered and dried to prepare a PC copolymer (PC-6).

A reduced viscosity $[\eta_{sp}/C]$ of PC-6 was 1.10 dl/g. The PC copolymer was found to have a component in which two or more repeating units derived from 4,4' biphenol were connected through a carbonate bonding.

Comparative Example 3

A solution prepared by dissolving 0.2 kg of 1,1-bis(4-hydroxyphenyl)cyclohexane in 1.2 kg of 16-weight % aqueous potassium hydroxide was mixed with 1.3 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (190 mL) was added to the above oligomer (260 mL). To this solution, p-tert-butylphenol (0.40 g) was added as a terminal terminator and stirred for sufficient mixing. After 30 mL of 2N aqueous potassium hydroxide separately prepared was added in this solution, 1 mL of triethylamine solution (7 vol %) was added with stirring for ten minutes. A biphenol monomer solution was prepared by a monomer-solution preparation method including: preparing 120 mL of 2N aqueous potassium hydroxide; cooling the solution at the room temperature or less; adding 0.1 g of hydrosulphite and 17.3 g of 1,1-bis(4-hydroxyphenyl)cyclohexane; and completely dissolving the mixed solution. All amount of the biphenol monomer solution separately prepared as described above was added to the above PTBP solution and kept on stirring for one hour.

The obtained reaction mixture was diluted with 2 L of methylene chloride and 1 L of water and cleaned. A lower layer was separated from the reaction mixture. Then, the reaction mixture was cleaned with 1 L of water one time, with 1 L of 0.01N hydrochloric acid one time, and with 1 L of water three times in this order. The obtained methylene chloride solution was dropped into methanol with stirring. The obtained redeposit was filtered and dried to prepare a PC copolymer (PC-7).

A reduced viscosity $[\eta_{sp}/C]$ of PC-7 was 1.14 dl/g. n was more than 3.00.

Comparative Example 4

A PC copolymer (PC-8) was manufactured in the same manner as that in Example 4 except that the bisphenol Z oligomer (Z-CF) used in Example 4 was replaced by the bisphenol Z oligomer (Z-CF3) manufactured in Manufacturing Example 5. The PC copolymer (PC-8) has the same structure and the reduced viscosity as the PC copolymer of Example 4. A content of diethyl carbamic acid chloride in the PC copolymer was 110 ppm.

Evaluation Result

Table 3 shows evaluation results of Examples 1 to 4D and Comparative Examples 1 to 4. Comparing Examples 1 to 4 D with Comparative Examples 1 to 4, the PC copolymers of Examples 1 to 4 D were found to have an excellent wear resistance since solubility of the PC copolymers was kept stable in the organic solvent and a mass reduction of the PC copolymers in wear resistance evaluation was small. Moreover, because of a small value of initial residual potential ($V_R$) and repeating residual potential (increase in $V_R$), the electrophotographic photoreceptors of Examples 1 to 4D were found to have excellent wear resistance, electrical characteristics and electrification characteristics.

On the other hand, the PC copolymer of Comparative Example 1 was not dissolved in the solvent, so that a coating liquid was not prepared. In Comparative Example 2, the PC copolymer was found to have poor solubility. The electrophotographic photoreceptor was found to have poor electrical characteristics and electrification characteristics because the initial residual potential and the repeating residual potential both were large. The PC copolymer of Comparative Example 3 was found to have poor wear resistance because of large mass reduction in the evaluation of wear resistance.

In Examples 1 to 4D, the number of cleaning times of bischloroformate was increased, almost no impurity remained in the PC copolymer, resulting in favorable initial residual potential and repeating residual potential. However, in Comparative Example 4, because of a small number of cleaning times of bischloroformate, a lot of impurities remained in the PC copolymer, resulting in poor initial residual potential and repeating residual potential.

Further, as shown in Table 4, since the divalent organic siloxane modified phenylene group is contained in each PC copolymer in Examples 4A to 4C and the monovalent organic siloxane modified phenyl group is contained in the PC copolymer in Example 4D, the contact angle with water and toner adherability were found to be enhanced in Examples 4A to 4D as compared with Example 4 having no organic siloxane modified phenyl group.

In Table 3, "* impurity content" represents the content of diethyl carbamic acid chloride.

[Chemical Formula 72]

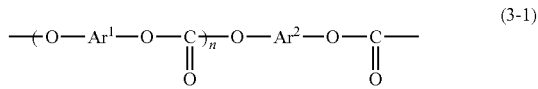

(3-1)

In the formula, $Ar^1$ is a group represented by a formula (3-2) below. $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane. n representing an average repeating number of an $Ar^1$ block is a numeral in a range of 1.09 to 3.0.

The PC copolymer according to this exemplary embodiment is typically manufactured by forming the $Ar^1$ block and reacting the $Ar^1$ block with a monomer having $Ar^2$. Accordingly, n is not a numeral of 1.0 or less. n is a numeral in a range of 1.09 to 3.0, preferably in a range of 1.09 to 2.30. When n is

TABLE 3

| | PC copolymer | | | | Electrophotographic Photoreceptor | | |
|---|---|---|---|---|---|---|---|
| | Reduced Viscosity (dl/g) | Wear Resistance (mg) | Solubility | *Impurity content (ppm) | Wear Resistance (mg) | Initial Residual Potential ($V_R$) | Repeating Residual Potential (increase in $V_R$) |
| Example 1 (PC-1) | 1.13 | 0.3 | ○ | 10 | 0.8 | −10 | 10 |
| Example 2 (PC-2) | 1.11 | 0.44 | ○ | 20 | 1.3 | −10 | 20 |
| Example 3 (PC-3) | 1.13 | 0.48 | ○ | 35 | 1.4 | −10 | 30 |
| Example 4 (PC-4) | 1.16 | 0.33 | ○ | 15 | 0.6 | −10 | 20 |
| Example 4A (PC-4A) | 1.16 | 0.26 | ○ | 5 | 0.4 | −10 | 0 |
| Example 4B (PC-4B) | 1.16 | 0.27 | ○ | 5 | 0.4 | −10 | 0 |
| Example 4C (PC-4C) | 1.16 | 0.27 | ○ | 5 | 0.4 | −10 | 0 |
| Example 4D (PC-4D) | 1.16 | 0.26 | ○ | 5 | 0.4 | −10 | 0 |
| Comparative Example 1 (PC-5) | 0.53 | immeasurable | x | — | immeasurable | immeasurable | immeasurable |
| Comparative Example 2 (PC-6) | 1.1 | 0.33 | whitened | — | 0.9 | −100 | 200 |
| Comparative Example 3 (PC-7) | 1.14 | 0.6 | ○ | — | 1.9 | −10 | 20 |
| Comparative Example 4 (PC-8) | 1.16 | 0.33 | ○ | 110 | 0.6 | −50 | 100 |

TABLE 4

| | Film of PC polymer Contact Angle with Water (degree) | Electrophotograhic Photoreceptor Toner Adherability |
|---|---|---|
| Example 4 (PC-4) | 91 | ○ |
| Example 4A (PC-4A) | 104 | ⊚ |
| Example 4B (PC-4B) | 104 | ⊚ |
| Example 4C (PC-4C) | 104 | ⊚ |
| Example 4D (PC-4D) | 104 | ⊚ |

Third Exemplary Embodiment

A third exemplary embodiment of the invention will be described in detail below.

In describing this exemplary embodiment, what has been described in the above first and second exemplary embodiments will be omitted or simplified.

Structure of PC Copolymer

A PC copolymer according to this exemplary embodiment is a PC copolymer having a repeating unit represented by a formula (3-1) below and a molar copolymer composition represented by $Ar^2/(Ar^1+Ar^2)$ in a range of 25 mol % to 47 mol %.

less than 1.09, regularity of the repeating unit becomes too high to excessively exhibit characteristics of crystalline monomer, so that solubility of the PC copolymer may be deteriorated. When n is more than 3.0, it is difficult to sufficiently increase the content of crystalline components contained in the PC copolymer, so that improvement in wear resistance may become insufficient.

In the PC copolymer according to this exemplary embodiment, the content of the monomer unit of $Ar^2$ is in a range of 25 mol % to 47 mol %, preferably in a range of 29 mol % to 47 mol %, more preferably in a range of 32 mol % to 47 mol %, particularly preferably in a range of 38 mol % to 45 mol %.

When $Ar^2$ is more than 47 mol %, the PC copolymer becomes a copolymer having a highly regular structure, which is analogous to an alternate copolymer, so that solubility of the PC copolymer is decreased. When $Ar^2$ is less than 25 mol %, improvement in wear resistance of the PC copolymer becomes insufficient. The aforementioned mol % is a value obtained when the molar copolymer composition represented by $Ar^2/(Ar^1+Ar^2)$ is represented by percentage.

In a copolymer structured with a bonding block including a plurality of $Ar^2$, since the block component of $Ar^2$ exhibits a low solubility, a solution using such a copolymer may be whitened. Such a solution is not suitable as a coating liquid.

In the formula (3-1), $Ar^1$ is represented by the following formula (3-2).

[Chemical Formula 73]

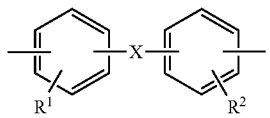

(3-2)

In the formula, $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms. $R^1$ and $R^2$ may be a plurality of groups for a single aromatic ring. In this case, the plurality of groups may be the same or different. X represents a bonding group represented by $-CR^3R^4-$, in which $R^3$ and $R^4$ each independently represent a hydrogen atom, an alkyl group having 1 to 12 carbon atoms, a trifluoromethyl group or a substituted or unsubstituted aryl group having 6 to 12 carbon atoms, provided that $R^3$ and $R^4$ are not the same.

A structure of the formula (3-2) is preferably a structure of the following formula (3-2') in terms of availability of ingredients and wear resistance.

[Chemical Formula 74]

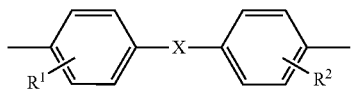

(3-2')

Examples of a halogen atom forming $R^1$ and $R^2$ are a fluorine atom, a chlorine atom and a bromine atom.

Examples of the alkyl group having 1 to 12 carbon atoms which forms $R^1$ and $R^2$ are a linear or branched alkyl group. Examples thereof are a methyl group, an ethyl group, propyl groups, butyl groups, pentyl groups and hexyl groups. Also, the alkyl group may be a cyclic alkyl group such as a cyclohexyl group. Further, a part or an entirety of the hydrogen atom in the alkyl group may be substituted by a halogen atom. Examples of other substituents are a trifluoromethyl group, an aryl group having 6 to 12 carbon atoms, an alkoxy group having 1 to 12 carbon atoms and an aryloxy group having 6 to 12 carbon atoms. Examples of the alkyl group forming the substituents are the same groups as the above. Examples of the aryl group forming the substituents are the following groups.

Examples of the aryl group having 6 to 12 carbon atoms which forms $R^1$ and $R^2$ are a phenyl group.

The above groups are examples for the alkyl group and the aryl group which form the alkoxy group having 1 to 12 carbon atoms and the aryloxy group having 6 to 12 carbon atoms, the alkoxy group and the aryloxy group forming $R^1$ and $R^2$.

When the aryl group and the aryloxy group have a substituent in the above groups, for instance, the substituent may be an alkyl group having 1 to 6 carbon atoms. Examples of the alkyl group having 1 to 6 carbon atoms are the group exemplified in the above description for $R^1$ and $R^2$. Examples of other substituents are a halogen atom and a trifluoromethyl group.

All of $R^1$ and $R^2$ may be a hydrogen atom. When a plurality of groups other than the hydrogen atom are present in $R^1$ and $R^2$, the plurality of groups may be the same or different.

X in the formula (3-2) represents a bonding group represented by $-CR^3R^4-$. X is preferably a bonding group having 2 to 20 carbon atoms. The alkyl group having 1 to 12 carbon atoms and the aryloxy group having 6 to 12 carbon atoms for forming $R^3$ and $R^4$ are the same groups for $R^1$ and $R^2$, provided that $R^3$ and $R^4$ are not the same. When $R^3$ and $R^4$ are not the same, improvement in solubility is recognized.

$Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane.

When $Ar^2$ is a biphenol derivative, $Ar^2$ is preferably bonded at 4,4'-position in terms of improvement in mechanical properties and wear resistance. When $Ar^2$ is a naphthylene group, the naphthylene group is bonded to an oxygen atom at one of 1 to 8-positions. The naphthylene group is preferably bonded to an oxygen atom at 2,7-position, 2,6-position, 1,4-position or 1,5-position in terms of improvement in mechanical properties and wear resistance. A bonding position of $Ar^2$ with other substituents and oxygen atoms is the same as those in the description for $Ar^1$.

In this exemplary embodiment, it is preferable that the examples of $Ar^2$ further include a divalent organic siloxane modified phenylene group in the same manner as those in the first and second exemplary embodiments.

In the same manner as in the first and second exemplary embodiments, in a solution where the PC copolymer according to this exemplary embodiment is dissolved in a solvent of methylene chloride at a concentration of 0.5 g/dl, the PC copolymer preferably exhibits reduced viscosity $[\eta_{SP}/C]$ at 20 degrees C. in a range of 0.1 dl/g to 5 dl/g, more preferably 0.2 dl/g to 3 dl/g, particularly preferably 0.3 dl/g to 2.5 dl/g. When the reduced viscosity $[\eta_{sp}/C]$ is less than 0.1 dl/g, wear resistance of the PC copolymer may be insufficient in use for the electrophotographic photoreceptor. When the reduced viscosity $[\eta_{sp}/C]$ is more than 5 dl/g, coating viscosity of the PC copolymer may become too high for manufacturing a molded product (the electrophotographic photoreceptor and the like) from a coating liquid, so that productivity of the electrophotographic photoreceptor may be unfavorably lowered.

In this exemplary embodiment as well as the second exemplary embodiment, the PC copolymer of the formula (3-1) is preferably a PC copolymer having a chain end terminated by a monovalent aromatic group or a monovalent fluorine-containing aliphatic group in terms of improvement in electrical properties.

The PC copolymer with improved electric properties has a monovalent aromatic group or a monovalent fluorine-containing aliphatic group as an end group in the same manner as that in the second exemplary embodiment. The monovalent aromatic group may be a group containing an aliphatic group such as an alkyl group. The monovalent fluorine-containing aliphatic group may be a group containing an aromatic group.

The monovalent aromatic group for the end group is preferably an aryl group having 6 to 12 carbon atoms in the same manner as that in the second exemplary embodiment. Examples of the aryl group are a phenyl group and a biphenyl group. Examples of the substituent for the aromatic group and the aliphatic group such as the alkyl group for the aromatic group are halogen atoms such as a fluorine atom, a chlorine atom and a bromine atom. The substituent for the aromatic group is exemplified by an alkyl group having 1 to 20 carbon atoms. This alkyl group may be a group substituted by a halogen atom as described above and a group substituted by an aryl group.

The monovalent fluorine-containing aliphatic group for the end group is exemplified by a fluorine-containing alkyl group having 1 to 20 carbon atoms in the same manner as that in the second exemplary embodiment.

When the monovalent aromatic group is at the chain end, the monovalent aromatic group may be an organic siloxane modified phenyl group in the same manner as those in the first and second exemplary embodiments.

Manufacturing Method of PC Copolymer

The PC copolymer according to this exemplary embodiment is exemplarily obtainable by reacting a divalent aromatic phenol compound (a comonomer represented by a formula (3-4) below) in the presence of a base with a bischloroformate oligomer having a small number of repeating units represented by a formula (3-3) below. The PC copolymer having an average repeating number of an $Ar^1$ block in a range of 1.09 to 3.0 can easily be manufactured by using such oligomers.

[Chemical Formula 75]

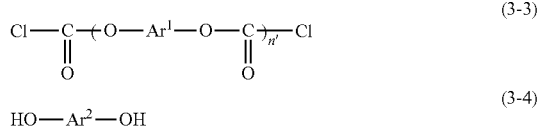

n' representing the average number of repeating units of the bischloroformate oligomer is different from n in the formula (3-1) in the same manner as that in the second exemplary embodiment. n and n' are approximately the same, but n is larger than n'. This is because, when the manufactured $Ar^1$ oligomer reacts with a monomer including $Ar^2$, the bischloroformate group at the end of the $Ar^1$ oligomer may react with a base present in the reaction system to form a hydroxyl group, resulting in polycondensation of the hydroxyl group with another $Ar^1$ oligomer having chlorine at its end.

In the bischloroformate oligomer of the formula (3-3), the average number of repeating units n' is in a range of 1.0 to 1.99 in the same manner as that in the second exemplary embodiment. The PC copolymer according to this exemplary embodiment is easily manufactured by using the bischloroformate oligomer having the average number of repeating units in a range of 1.0 to 1.99. A method for calculating the average number of repeating units n' is exemplified by a method described later in Examples.

In this exemplary embodiment, $Ar^1$ represented by the formula (3-2) is preferably a divalent group induced from a monomer selected from 1,1-bis(3-methyl-4-hydroxyphenyl)ethane, 1,1-bis(4-hydroxyphenyl)ethane, 2,2-bis(3-methyl-4-hydroxyphenyl)butane, 2,2-bis(4-hydroxyphenyl)butane, 1,1-bis(4-hydroxyphenyl)-1-phenylethane, and 1,1-bis(4-hydroxyphenyl)-1-phenylmethane, in terms of improvement in solubility in the organic solvent.

The ingredient including bischloroformate oligomer represented by the formula (3-3) may contain an amido compound as impurities in the same manner as those in the first and second exemplary embodiments.

The manufacturing method of the PC copolymer according to this exemplary embodiment is exemplified by polycondensation of the bischloroformate oligomer induced from a bisphenol compound represented by a formula (3-5) below and a divalent phenol compound represented by a formula (3-6) below, the divalent phenol compound induced from biphenol, dihydroxynaphthalene, hydroquinone, resorcin, catechol, 9,9-bis(hydroxyphenyl)fluorene or 4,4'-dihydroxydiphenylmethane.

[Chemical Formula 76]

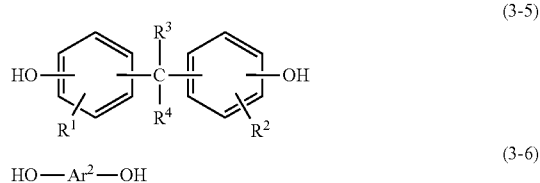

Examples of the bisphenol compound represented by the formula (3-5) are 1,1-bis(3-methyl-4-hydroxyphenyl)ethane, 1,1-bis(4-hydroxyphenyl)ethane, 2,2-bis(3-methyl-4-hydroxyphenyl)butane, 2,2-bis(4-hydroxyphenyl)butane, 1,1-bis(4-hydroxyphenyl)-1-phenylethane, and 1,1-bis(4-hydroxyphenyl)-1-phenylmethane The bisphenol compound is preferable since the bisphenol compound provides a PC copolymer having an excellent solubility. In addition, when the PC copolymer is applied for electrophotographic photoreceptors, the PC copolymer is preferable since the PC copolymer provides a favorable coating liquid. One of the above may be singularly used, or two or more of the above may be used together.

Next, a monomer represented by the formula (3-6) will be described. An example of a monomer as an ingredient for $Ar^2$ (the other configuration unit of the PC copolymer of this exemplary embodiment) is a divalent phenol monomer in terms of wear resistance. The divalent phenol monomer and the bisphenol monomer have 2 mass % or less of solubility to methylene chloride (homopolymer) or are substantially incapable of synthesizing a homopolymer having a number average molecular weight of 10000 or more because of crystallization of polymers formed during a polycarbonate synthesis reaction by the interfacial polycondensation method.

Whether the solubility to methylene chloride is 2 mass % or less is checked by whether decrease in mass of the homopolymer is 0.04 mass parts or more. Such decrease in mass of the homopolymer is calculated by immersing 2 mass parts of the solid homopolymer in 98 mass parts of methylene chloride at the room temperature for 24 hours, the homopolymer having an organic solvent content of 500 mass ppm or less and a viscosity average molecular weight in a range of 15000 to 30000; separating solids from liquid; and drying the solids.

Since the monomers represented by the formula (3-6) are the same as those in the second exemplary embodiment, description thereof will be omitted here.

The PC copolymer according to this exemplary embodiment is obtainable in the same manner as that in the second exemplary embodiment by polymerizing the monomer represented by the formula (3-6) in which $Ar^2$ is a divalent organic siloxane modified phenylene group.

The PC copolymer according to this exemplary embodiment is easily obtainable by conducting interfacial polycondensation using the bischloroformate oligomer obtained from the monomer represented by the formula (3-5) and the monomer represented by the formula (3-6). For instance, by conducting interfacial polycondensation under the presence of an acid-binding agent with use of various carbonyl dihalides such as phosgene, carbonate ester bonding can be favorably formed. The above reaction(s) is conducted under the presence of at least one of a terminal terminator and a branching agent as needed in the same manner as those in the first and second exemplary embodiments. Since the terminal terminator and the branching agent are the same as those in the first and second exemplary embodiments, description thereof will be omitted here. Moreover, in manufacturing the PC copolymer according to this exemplary embodiment, two or more kinds of monomers derived from $Ar^2$ may be used to provide a multicomponent copolymer.

Since the interfacial polycondensation is conducted in the same as in the second exemplary embodiment, description thereof will be omitted here.

The manufacturing method of the PC copolymer according to this exemplary embodiment is specifically applicable in various embodiments. For instance, the bischloroformate oligomer having a small number of repeating units is manufactured by reacting the bisphenol compound represented by the formula (3-5) with phosgene, and then the bischloroformate oligomer is reacted with the monomer represented by the formula (3-6) under the presence of a mixture of the above solvent and an alkali aqueous solution of the above acid-binding agent. This method is preferable in that n in the formula (3-1) is adjustable to a preferable range.

When the bischloroformate oligomer is manufactured by the following method, the method is preferable in that cleaning process in manufacturing the PC copolymer can be simplified.

A manufacturing method of the bischloroformate oligomer having n' of the formula (3-3) in a range of 1.0 to 1.99 is exemplified by the following. Firstly, the bisphenol compound of the formula (3-5) is suspended in a hydrophobic solvent such as methylene chloride and is added with phosgene to provide a mixed solution. On the other hand, a tertiary amine such as triethylamine is dissolved in a hydrophobic solvent such as methylene chloride to form a solution. The solution is dropped into the above mixed solution at the room temperature or less for reaction. Hydrochloric acid and deionized water are added to a residual solution of the obtained reactant mixture for cleaning. An organic layer including a polycarbonate oligomer having a small number of repeating units is obtained.

A dropping temperature and a reaction temperature are typically in a range of 0 to 70 degrees C., preferably in a range of 5 to 65 degrees C. Reaction time is in a range of 15 minutes to 4 hours, preferably 30 minutes to 3 hours. Thus obtained polycarbonate oligomer has an average number of repeating units (n') is preferably in a range of 1.00 to 1.99, more preferably in a range of 1.00 to 1.60.

An organic phase containing the bischloroformate oligomer thus obtained having a small number of repeating units is added with the aromatic divalent phenol monomer represented by the formula (3-6) for reaction. The reaction temperature is 0 to 150 degrees C., preferably 5 to 40 degrees C., particularly preferably 10 to 25 degrees C.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 2 hours.

In the reaction, the aromatic divalent phenol monomer represented by the formula (3-6) is desirably added in a form of an aqueous solution or an organic-solvent solution. The order of the addition is not specifically limited. In the above manufacturing method, the catalyst, the terminal terminator, the branching agent and the like may be added as needed at the time of manufacturing bischloroformate or at the time of subsequent polymerization reaction, or both at the time of manufacturing bischloroformate oligomer and at the time of subsequent polymerization reaction.

The PC copolymer thus obtained is a copolymer formed of a repeating unit(s) represented by a formula (3-9) below and a repeating unit(s) represented by a formula (3-10) below.

As long as an object of the invention is not hampered, the PC copolymer may contain a polycarbonate unit having a structure unit other than those of the formulae $Ar^1$ and $Ar^2$, or a unit having a polyester structure or a polyether structure.

[Chemical Formula 77]

(3-9)

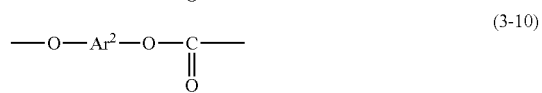

(3-10)

Structure of Coating Liquid

A coating liquid according to this exemplary embodiment at least contains the PC copolymer according to this exemplary embodiment and a solvent capable of dissolving or dispersing the PC copolymer according to this exemplary embodiment. Since the structure and the contents of the coating liquid other than the above are the same as those of the first and second exemplary embodiments except that the PC copolymer according to this exemplary embodiment is used, description thereof will be omitted here.

Structure of Electrophotographic Photoreceptor

As long as the above-described PC copolymer is used in a photosensitive layer, the electrophotographic photoreceptor according to this exemplary embodiment may be any electrophotographic photoreceptor (e.g. one of known various electrophotographic photoreceptors). However, the photosensitive layer of the electrophotographic photoreceptor is preferably a layered electrophotographic photoreceptor including at least one charge generating layer and at least one charge transporting layer, or alternatively the photosensitive layer of the electrophotographic photoreceptor is preferably a single-layer electrophotographic photoreceptor including both a charge generating material and a charge transporting material. Since the structure and the contents of the electrophotographic photoreceptor other than the above are the same as those of the first and second exemplary embodiments except that the PC copolymer according to this exemplary embodiment is used, description thereof will be omitted here.

Examples of Third Exemplary Embodiment

Next, examples and comparatives of a third exemplary embodiment will be described in detail. However, the second exemplary embodiment is not limited to the examples but may include various modifications and applications as long as such modifications and applications do not depart from a technical idea of the invention.

MANUFACTURING EXAMPLE

Preparation of Oligomer

Manufacturing Example 1: Synthesis of Bisphenol E Oligomer (Bischloroformate)

73.0 g (0.341 mol) of 1,1-bis(4-hydroxyphenyl)ethane (bisphenol E) was suspended in 410 mL of methylene chloride, to which 68.7 g (0.682 mol) of triethylamine was added for dissolution. The obtained solution was dropped into a solution, which was prepared by dissolving 65.0 g (0.689 mol) of phosgene in 245 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol E oligomer having a chloroformate group at its molecular terminal was obtained. The obtained solution had a chloroformate concentration of 0.98 mol/L, a solid concentration of 0.21 kg/L and an average number of repeating units (n') of 1.37. A content of an amide compound contained in the obtained bisphenol E oligomer equals to a value obtained by subtracting a mass of nitrogen derived from triethylamine from a mass of nitrogen in the bisphenol E oligomer. The content of the amide compound was found to be 90 mass ppm based on the mass of the bisphenol E oligomer. The mass of nitrogen derived from triethylamine was 0.3 mass ppm. The total mass of nitrogen in the bisphenol E oligomer was determined by the chemiluminescence method according to JIS K2609 The total mass of nitrogen in the bisphenol E was analyzed by Gas chromatography to determine an amount of triethylamine. The amount of triethylamine was converted to the mass of nitrogen. By subtracting this mass of nitrogen from the total mass of nitrogen, the mass of nitrogen derived from the amide compound was obtained. This obtained ingredient will be referred to as "E-CF" hereinafter.

The total mass of nitrogen was determined using TS-100 manufactured by Mitsubishi Chemical Analytech Co., Ltd. according to JIS K2609 (chemiluminescence method). Measuring methods on liquid are described in JIS. Solid samples were measured using the same instruments as those for liquid.

The methylene chloride solution of the bischloroformate compound was dried and hardened at 50 degrees C. under a reduced pressure to obtain methylene chloride. The obtained solid content was used for measurement. By comparing the result of the measurement with calibration curve separately obtained based on pyridine as the reference material, the mass of nitrogen was determined. The obtained result was converted to a concentration of the bischloroformate compound in the methylene chloride solution, whereby the total mass of nitrogen in the bischloroformate compound.

0.5N—NaOH aqueous solution was added to the solid content of the bischloroformate compound obtained by the above method so that the obtained solution has 8 or more pH. To this solution, chloroform was added. Triethylamine was extracted as extraction component by chloroform extraction method and was analyzed by Gas chromatography. The amount of triethylamine was determined by the absolute calibration method.

Conditions for Gas chromatography analysis were as follows.
Product model: 7890A manufactured by Agilent Technologies
Column: CP-VOLAMINE (manufactured by Varian) with 60 m×0.32 mm (inner diameter)
Inlet temperature: 150 degrees C.
Column temperature: heating a column at 50 degrees C. per minute when the column temperature is from 40 degrees C. to 150 degrees C., keeping the column temperature at 150 degrees C. for ten minutes, and heating the column at 50 degrees C. per minute until the column temperature reached 250 degrees C.

Carrier gas: helium with a constant speed of 40 cm per second
Injected amount: 2 µl
Injection method: splitless injection
Detector: FID
FID temperature: 260 degrees C.

The average number of repeating units (n') was obtained using the following formula.

The average number of repeating units (n')=1+(Mav−M1)/M2 (Formula 1) In the formula 1, Mav represents (2×1000/(CF value), M2 represents (M1−98.92), and M1 represents a molecular weight of the bischloroformate compound when n'=1 in the formula (3-3). The CF value (N/kg) represents (CF value/concentration). The CF value represents the number of chlorine molecule in the bischloroformate compound represented by the formula (3-3) contained in 1 L of the reaction solution. The concentration (kg/L) represents an amount of the solid content obtained by concentrating the 3-L reaction solution. Herein, 98.92 is a total atom weight of two chlorine atoms, one oxygen atom and one carbon atom which are desorbed at polycondensation of the bischloroformate compounds.

Manufacturing Example 2: Synthesis of BisB Oligomer (Bischloroformate)

A methylene chloride solution of a bisphenol B oligomer having a chloroformate group at its molecular terminal was obtained in the same manner as that in Manufacturing Example 1 except that the bisphenol E was replaced by 65.8 g (0.272 mol) of 2,2-bis(4-hydroxyphenyl)butane (BisB), the amount of triethylamine was changed to 53.8 g (0.533 mol), and the methylene chloride solution of phosgene was replaced by a solution in which 52.7 g (0.533 mol) of phosgene was dissolved in 225 mL of methylene chloride in Manufacturing Example 1. The obtained solution had a chloroformate concentration of 0.99 mol/L, a solid concentration of 0.21 kg/L and an average number of repeating units (n') of 1.21. A content of an amide compound in the obtained BisB oligomer was found to be 90 mass ppm. A mass of nitrogen derived from triethylamine was 0.3 mass ppm. This obtained ingredient will be referred to as "BisB-CF" hereinafter.

Manufacturing Example 3: Synthesis of $Ar^1$ Oligomer (Bischloroformate)

A methylene chloride solution of an AP oligomer having a chloroformate group at its molecular terminal was obtained in the same manner as that in Manufacturing Example 1 except that the bisphenol E was replaced by 78.9 g (0.272 mol) of 1,1-bis(4-hydroxyphenyl)-1-phenylethane (AP), the amount of triethylamine was changed to 53.8 g (0.533 mol), and the methylene chloride solution of phosgene was replaced by a solution in which 52.7 g (0.533 mol) of phosgene was dissolved in 225 mL of methylene chloride in Manufacturing Example 1. The obtained solution had a chloroformate concentration of 0.91 mol/L, a solid concentration of 0.21 kg/L and an average number of repeating units (n') of 1.15. A content of an amide compound in the obtained AP oligomer was found to be 90 mass ppm. A mass of nitrogen derived from triethylamine was 0.3 mass ppm. This obtained ingredient will be referred to as "$Ar^1$-CF" hereinafter.

Manufacturing Example 4: Synthesis of Bisphenol A Oligomer (Bischloroformate)

80.2 g (0.352 mol) of 2,2-bis(4-hydroxyphenyl)propane (bisphenol A) was suspended in 450 mL of methylene chloride, to which 70.4 g (0.702 mol) of triethylamine was added for dissolution. The obtained solution was dropped into a solution, in which 69.8 g (0.631 mol) was dissolved in 250 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol A oligomer having a chloroformate group at its molecular terminal was obtained. The obtained solution had a chloroformate concentration of 0.88 mol/L, a solid concentration of 0.21 kg/L and an average number of repeating units (n') of 1.49. A content of an amide compound in the obtained bisphenol A oligomer was found to be 150 mass ppm. A mass of nitrogen derived from triethylamine was 0.3 mass ppm. This obtained ingredient will be referred to as "A-CF" hereinafter.

Manufacturing Example 5: Synthesis of Bisphenol E Oligomer (Bischloroformate)

Synthesis of bisphenol E oligomer was performed in the same manner as that in Manufacturing Example 1 except that the number of times for cleaning with deionized water after synthesis of the bisphenol E oligomer (E-CF) was decreased from four times in Manufacturing Example 1 to two times in Manufacturing Example 5.

A content of an amide compound in the obtained bisphenol E oligomer was found to be 720 mass ppm. This obtained ingredient will be referred to as "E-CF2" hereinafter.

Example 1

Manufacturing of PC Copolymer

E-CF (17 mL) of Manufacturing Example 1 and methylene chloride (43 mL) were injected to a reactor with a mechanical stirrer, stirring vane and baffle plate. To the reactor, p-tert-butylphenol (hereinafter referred to as PTBP) (0.05 g) as a terminal terminator was added and stirred for sufficient mixing. A divalent phenol monomer solution was prepared by a monomer-solution preparation method including: preparing 14 mL of 2N aqueous sodium hydroxide; cooling the solution at the room temperature or less; adding 0.1 g of hydrosulphite and 1.6 g of 4,4'-biphenol as an antioxidant; and completely dissolving the mixed solution. All amount of the divalent phenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N-hydrochloric acid one time, and with 0.1 L of water three times in this order. The obtained methylene chloride solution was dropped into methanol with stirring. The obtained redeposit was filtered and dried to prepare a PC copolymer (PC-1) with the following structure.
Identification of PC Copolymer Then, the PC copolymer (PC-1) thus obtained was dissolved in methylene chloride to prepare a solution having a concentration of 0.5 g/dl. When reduced viscosity [$\eta_{sp}/C$] thereof at 20 degrees C. was measured, the result was 1.24 dl/g. A structure and a composition of the obtained PC-1 were analyzed by $^1$H-NMR spectrum method and $^{13}$C-NMR spectrum method. The obtained PC-1 was identified as a PC copolymer having a repeating unit, the number of the repeating unit and a composition as follows. A residual content of diethyl carbamic acid chloride in the obtained polycarbonate copolymer was found to be 10 mass ppm based on a total mass of the polycarbonate copolymer.

[Chemical Formula 78]

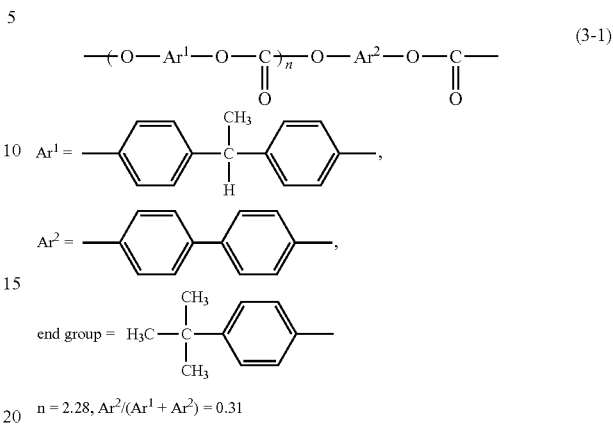

$n = 2.28$, $Ar^2/(Ar^1 + Ar^2) = 0.31$

A structure of the PC copolymer in the formula (3-1) was identified according to the following procedure. Firstly, it was confirmed using $^{13}$C-NMR spectrum method that $Ar^2$ is not bonded to another $Ar^2$. Next, a polymerization ratio of each of $Ar^1$ and $Ar^2$ was calculated using $^1$H-NMR spectrum method. Subsequently, n was calculated according to the following formula 2.

$$Ar^2/(Ar^1+Ar^2)=1/(n+1) \quad \text{(Formula 2)}$$

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. 0.5 parts by mass of oxotitanium phthalocyanine was used as a charge generating material while 0.5 parts by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting material, 0.5 g of a compound (CTM-1) represented by the following formula (3-11) and 0.5 g of the obtained PC copolymer (PC-1) were dispersed in 10 ml of tetrahydrofuran to prepare a coating liquid. The coating liquid was applied onto the charge generating layer with an applicator and dried, thereby providing a charge transporting layer having a film thickness of approximately 20 μm.

[Chemical Formula 79]

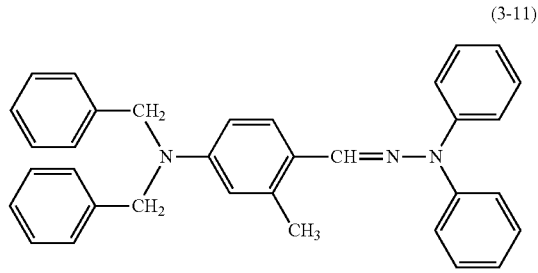

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as ○, a case where the PC copolymer was partially undissolved was marked as x, and a case where the PC copolymer was whitened was marked as "whitened."

Wear resistance of the PC copolymer and the electrophotographic photoreceptor was evaluated as follows.

(1) Sample preparation for evaluation on wear resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

(2) Sample preparation for evaluation on wear resistance of the photoreceptor: PC-1 (1 g) and CTM-1 (1 g) were dissolved in methylene chloride (10 mL) and the obtained solution was cast into film on a commercially available PET film using an applicator. This film was heated under reduced pressure and a solvent was removed to obtain a film sample having a thickness of about 30 μm.

(3) Evaluation: wear resistance of cast surfaces of the films manufactured at (1) and (2) process was evaluated using a Suga wear test instrument NUS-ISO-3 model (manufactured by Suga Test Instruments Co., Ltd.). Testing conditions: An abrasion paper having an alumina particle with a particle size of 3 μm was given a 4.9-N load. The sample was put into reciprocating motion 2000 times on the abrasion paper in contact with a surface of a photosensitive layer. A mass reduction of the sample was measured.

(4) Measurement of a content of impurities (diethyl carbamic acid chloride) contained in the PC copolymer: diethyl carbamic acid chloride was measured by the absolute calibration method using Gas chromatography.

Measuring conditions are as follows.
Sample: 0.5 g of the PC copolymer was dissolved in 13.3 g of methylene chloride and defined as a measuring sample.
Product model: 7890A manufactured by Agilent Technologies
Column: HP-1 with 30m×0.25 mm (inner diameter) (a film thickness: 0.25 μm)
Column temperature: heating a column at 10 degrees C. per minute when the column temperature was from 40 degrees C. to 300 degrees C., and keeping the column temperature at 300 degrees C. for 30 minutes
Inlet temperature: 300 degrees C. at split
Detector: 310 degrees C. (FID)
Carrier gas: helium with a speed of 40 cm per second
Injected amount: 1 μl Next, electrophotographic characteristics of the obtained electrophotographic photoreceptor were measured using an electrostatic charge tester EPA-8100 (manufactured by Kawaguchi Electric Works Co., Ltd.). Specifically, corona discharge of −6 kV was conducted in the static mode. Then, the initial surface potential ($V_0$), residual potential (initial residual potential ($V_R$)) after five seconds of light irradiation (10 Lux), and half-life exposure amount ($E_{1/2}$) were measured. Further, a commercially available printer (FS-600, manufactured by Kyocera Corporation) was modified so as to measure the surface potential of the photoreceptor. Then, the photoreceptor was mounted on a drum and evaluated in terms of electrification characteristics (repeating residual-potential increase ($V_R$ increase) before and after 24-hour-consecutive operation under conditions of high temperature and high humidity (35 degrees C., 85%) without use of a toner and a paper.

The results are shown in Table 5. The following Examples 2 to 5 and Comparative Examples 1 to 4 were evaluated in the same manner. The results are also shown in Table 5.

Example 2

A PC copolymer (PC-2) was manufactured in the same manner as that in Example 1 except that E-CF was replaced by 17 mL of BisB-CF of Manufacturing Example 2 and 4,4'-biphenol was replaced by 1.4 g of 2,7-dihydroxynaphthalene in Example 1.

The PC copolymer (PC-2) was identified as a PC copolymer having 1.16 dl/g of a reduced viscosity [$\eta_{SP}/C$] and a structure with the following repeating unit and composition in the formula (3-1). A residual content of diethyl carbamic acid chloride in the obtained polycarbonate copolymer was found to be 10 mass ppm based on a total mass of the polycarbonate copolymer.

[Chemical Formula 80]

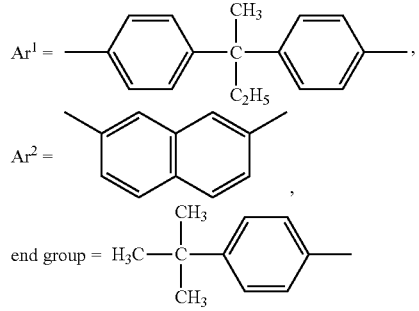

n = 1.99, $Ar^2/(Ar^1 + Ar^2)$ = 0.33

Example 3

In Example 1, E-CF (17 mL) was replaced by $Ar^1$-CF (17 mL) of Manufacturing Example 3, 4,4'-biphenol was replaced by 0.9 g of resorcin, and the amount of aqueous sodium hydroxide was changed to 13 mL. Except for the above, a PC copolymer (PC-3) was manufactured in the same manner as that in Example 1.

The PC copolymer (PC-3) was identified as a PC copolymer having 1.16 dl/g of a reduced viscosity [$\eta_{SP}/C$] and a structure with the following repeating unit and composition in the formula (3-1). A residual content of diethyl carbamic acid chloride in the obtained polycarbonate copolymer was found to be 10 mass ppm based on a total mass of the polycarbonate copolymer.

[Chemical Formula 81]

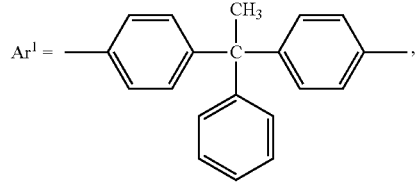

-continued

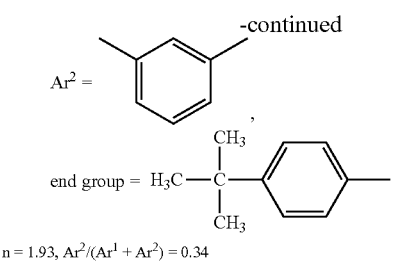

n = 1.93, $Ar^2/(Ar^1 + Ar^2) = 0.34$

Example 4

In Example 1, 4,4'-biphenol was replaced by 3.3 g of 9,9-bis(3-methyl-4-hydroxyphenyl)fluorene and aqueous sodium hydroxide was replaced by 14 mL of 2N aqueous potassium hydroxide. Except for the above, a PC copolymer (PC-4) was manufactured in the same manner as that in Comparative Example 1.

The PC copolymer (PC-4) was identified as a PC copolymer having 1.15 dl/g of a reduced viscosity [$\eta_{SP}$/C] and a structure with the following repeating unit and composition in the formula (1). A residual content of diethyl carbamic acid chloride in the obtained polycarbonate copolymer was found to be 10 mass ppm based on a total mass of the polycarbonate copolymer.

[Chemical Formula 82]

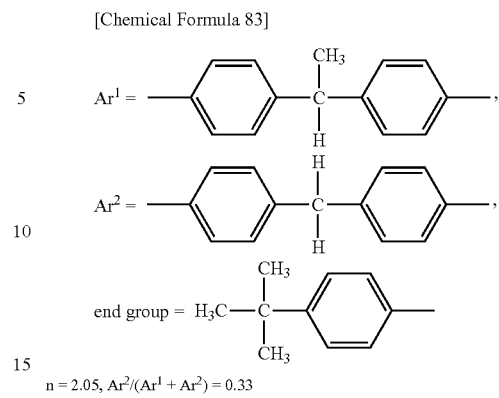

n = 2.15, $Ar^2/(Ar^1 + Ar^2) = 0.32$

Example 5

In Example 1, 4,4'-biphenol was replaced by 1.7 g of bis(4-hydroxyphenyl)methane and the amount of aqueous sodium hydroxide was changed to 14 mL. Except for the above, a PC copolymer (PC-5) was manufactured in the same manner as that in Example 1.

The PC copolymer (PC-5) was identified as a PC copolymer having 1.13 dl/g of a reduced viscosity [$\eta_{SP}$/C] and a structure with the following repeating unit and composition in the formula (3-1). A residual content of diethyl carbamic acid chloride in the obtained polycarbonate copolymer was found to be 10 mass ppm based on a total mass of the polycarbonate copolymer.

[Chemical Formula 83]

$Ar^1 =$ ![structure]

$Ar^2 =$ ![structure]

end group = ![structure]

n = 2.05, $Ar^2/(Ar^1 + Ar^2) = 0.33$

Example 10A

In Example 1, at the same time when methylene chloride was poured, 0.1 g of a siloxane modified phenol represented by the following formula (3-10A) was added and stirred for sufficient mixing.

A biphenol monomer solution was prepared by a monomer-solution preparation method including: preparing 10 mL of 2N aqueous sodium hydroxide; cooling the solution at the room temperature or less; adding 0.1 g of hydrosulphite and 2.6 g of 4,4'-biphenol as an antioxidant; and completely dissolving the mixed solution. All amount of the biphenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N hydrochloric acid one time, and with 0.1 L of water five times in this order. The obtained methylene chloride solution was dropped into warm water with stirring. While evaporating methylene chloride, a solid content of a resin was obtained. The obtained deposit was filtered and dried to prepare a polycarbonate copolymer (PC-10A) with the following structure. A mass ratio of an organic siloxane modified phenyl group in the PC copolymer (PC-10A) is 2 mass % based on a total mass of the PC copolymer. n=39 is given in the following formula (3-10A).

[Chemical Formula 84]

(3-10A)

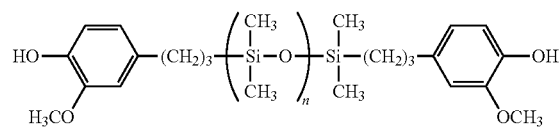

The PC copolymer (PC-10) was identified as a PC copolymer having 1.24 dl/g of a reduced viscosity [$\eta_{SP}$/C] and a structure with the following repeating unit and composition in the formula (3-1). A residual content of diethyl carbamic acid chloride in the obtained polycarbonate copolymer was found to be 5 mass ppm based on a total mass of the polycarbonate copolymer.

[Chemical Formula 85]

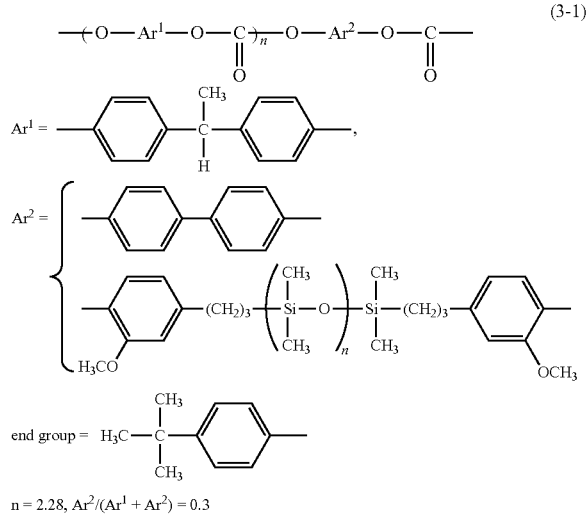

(3-1)

n = 2.28, Ar²/(Ar¹ + Ar²) = 0.3

Example 10B

A PC copolymer (PC-10B) was manufactured in the same manner as that in Example 10A except that siloxane modified bisphenol was replaced by 0.2 g of siloxane modified phenol represented by the following formula (3-10B). A mass ratio of an organic siloxane modified phenyl group in the PC copolymer (PC-10B) is 4 mass % based on a total mass of the PC copolymer. n=90 is given in the following formula (3-10B).

[Chemical Formula 86]

(3-10B)

HO—⟨⟩—(CH₂)₃—(Si(CH₃)₂—O)ₙ—Si(CH₃)₂—(CH₂)₃—⟨⟩—OH

The PC copolymer (PC-10B) was identified as a PC copolymer having 1.24 dl/g of a reduced viscosity [$\eta_{SP}/C$] and a structure with the following repeating unit and composition in the formula (3-1). A residual content of diethyl carbamic acid chloride in the obtained polycarbonate copolymer was found to be 5 mass ppm based on a total mass of the polycarbonate copolymer.

[Chemical Formula 87]

Ar¹ = —⟨⟩—C(CH₃)(H)—⟨⟩—,

Ar² = { —⟨⟩—⟨⟩—, —⟨⟩—(CH₂)₃—(Si(CH₃)₂—O)ₙ—Si(CH₃)₂—(CH₂)₃—⟨⟩— } end group = H₃C—C(CH₃)₂—⟨⟩— n = 2.28, Ar²/(Ar¹ + Ar²) = 0.31

Example 10C

A PC copolymer (PC-10C) was manufactured in the same manner as that in Example 10A except that siloxane modified bisphenol was replaced by 0.25 g of siloxane modified phenol represented by the following formula (3-10C). A mass ratio of an organic siloxane modified phenyl group in the PC copolymer (PC-10C) is 5 mass % based on a total mass of the PC copolymer. n=150 is given in the following formula 3-10C.

[Chemical Formula 88]

(3-10C)

HO—⟨⟩—(CH₂)₂—(Si(CH₃)₂—O)ₙ—Si(CH₃)₂—(CH₂)₂—⟨⟩—OH

The PC copolymer (PC-10C) was identified as a PC copolymer having 1.24 dl/g of a reduced viscosity [$\eta_{SP}/C$] and a structure with the following repeating unit and composition in the formula (3-1). A residual content of diethyl carbamic acid chloride in the obtained polycarbonate copolymer was found to be 5 mass ppm based on a total mass of the polycarbonate copolymer.

[Chemical Formula 89]

Ar¹ = —⟨⟩—C(CH₃)(H)—⟨⟩—,

Ar² = { —⟨⟩—⟨⟩—, —⟨⟩—(CH₂)₂—(Si(CH₃)₂—O)ₙ—Si(CH₃)₂—(CH₂)₂—⟨⟩— } end group = H₃C—C(CH₃)₂—⟨⟩— n = 2.28, Ar²/(Ar¹ + Ar²) = 0.31

Example 10D

A PC copolymer (PC-10D) was manufactured in the same manner as that in Example 10A except that siloxane modified bisphenol was replaced by 0.2 g of siloxane modified phenol represented by the following formula (3-10D). A mass ratio of an organic siloxane modified phenyl group in the PC copolymer (PC-10D) is 4 mass % based on a total mass of the PC copolymer. n=60 is given in the following formula 3-10D.

[Chemical Formula 90]

(3-10D)

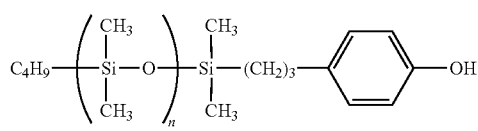

The PC copolymer (PC-10D) was identified as a PC copolymer having 1.24 dl/g of a reduced viscosity [$\eta_{SP}/C$] and a structure with the following repeating unit and composition in the formula (3-1). A residual content of diethyl carbamic acid chloride in the obtained polycarbonate copolymer was found to be 5 mass ppm based on a total mass of the polycarbonate copolymer.

[Chemical Formula 91]

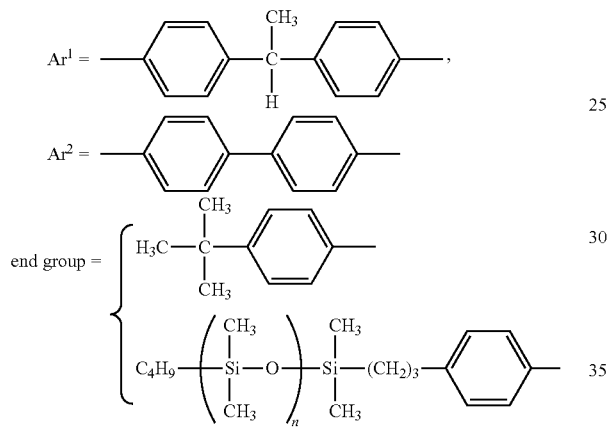

n = 2.28, Ar$^2$/(Ar$^1$ + Ar$^2$) = 0.31

The PC copolymers obtained in Examples 10A to 10D were further evaluated in terms of a contact angle with water and toner adherability as follows.
Evaluation of Contact Angle with Water A film was manufactured only by the PC copolymer. A contact angle with ultra-pure water was measured using the film.

DM700 (manufactured by Kyowa Interface Science Co., Ltd) was used as a measuring instrument for measurement of the contact angle.
Evaluation of Toner Adhesiveness As described above, the electrophotographic photoreceptor was manufactured by using the PC copolymer and evaluated with a commercially available printer (FS-600, manufactured by KYOCERA Corporation.

Specifically, the printer, in which the electrophotographic photoreceptor was mounted on a drum, was repeatedly operated for one hour under ambient temperature and normal humidity (23 degrees C., 50%).

A state where toner was adhered to the electrophotographic photoreceptor in a predetermined central area (a square of 2 cm×2 cm) was visually observed. Evaluation criteria were as follows.
Evaluation Criteria
◎: no adhesion of toner in the evaluated area of the electrophotographic photoreceptor
○: slight adhesion of toner, which was removable by blowing air.
×: adhesion of toner, which was not removable by blowing air.

Comparative Example 1

In Example 1, E-CF (17 mL) was replaced by A-CF (17 mL) of Manufacturing Example 4, the amount of PTBP was changed to 0.045 g, the amount of 4,4'-biphenol was changed to 1.4 g, and the amount of aqueous sodium hydroxide was changed to 10 mL. Except for the above, a PC copolymer (PC-6) was manufactured in the same manner as that in Example 1.

The PC copolymer (PC-6) was identified as a PC copolymer having 1.13 dl/g of a reduced viscosity [$\eta_{SP}/C$] and a structure with the following repeating unit and composition in the formula (3-1). A residual content of diethyl carbamic acid chloride in the obtained polycarbonate copolymer was found to be 15 mass ppm based on a total mass of the polycarbonate copolymer.

[Chemical Formula 92]

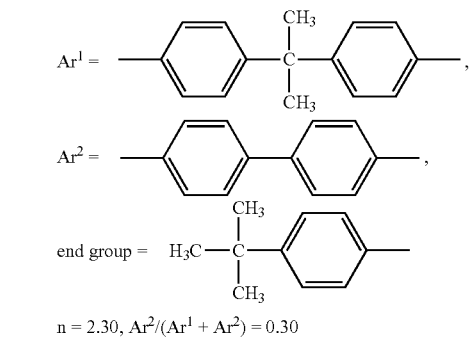

n = 2.30, Ar$^2$/(Ar$^1$ + Ar$^2$) = 0.30

Comparative Example 2

According to Example 2 of JP-A-5-70582, a PC copolymer (PC-7) having a mass average molecular weight of 60,000 in terms of GPC polystyrene was manufactured as follows.

625 mL of methylene chloride was added to a reactor with a stirrer and a thermometer, to which 35.3 g of bisphenol A bischloroformate was added with stirring for dissolution. 125 mL of ion-exchange water was further added to this solution. Subsequently, a solution obtained by dissolving 18.6 g of biphenol in 228.6 g of 3.5%-aqueous sodium hydroxide was dropped into the above solution at 20 to 25 degrees C. for one hour. After completion of dropping, stirring was continued at the same temperature for four hours. 14.3 g of 28%-aqueous sodium hydroxide was further added and stirring was continued for five hours. When the molecular weight was 60,000 (GPC in terms of polystyrene), stirring was stopped and left still.

The obtained reactant solution was injected into ice water. Deposited crystals obtained by filtration were cleaned with water and dried, followed by recrystallization with acetone, whereby PC-7 was obtained.

A reduced viscosity [$\eta_{sp}/C$] of PC-7 was 0.53 dl/g.

Comparative Example 3

A solution prepared by dissolving 1,1-bis(4-hydroxyphenyl)cyclohexane (bisphenol Z) (0.17 kg) and 4,4'-biphenol (0.03 kg) in 1.5 L of 2N aqueous potassium hydroxide was mixed with 1.0 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (34 mL) was added to the above oligomer (26 mL). To this solution, PTBP (0.065 g) was added as a terminal terminator and stirred for sufficient mixing. A biphenol monomer solution was prepared by a monomer-solution preparation method including: preparing 15 mL of 2N aqueous sodium hydroxide; cooling the solution at the room temperature or less; adding 0.02 g of hydrosulphite and 1.2 g of 4,4'-biphenol; and completely dissolving the mixed solution. All amount of the biphenol monomer solution separately prepared as described above was added to the above PTBP solution. 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.01N hydrochloric acid one time, and with 0.1 L of water three times in this order. The obtained methylene chloride solution was dropped into methanol with stirring. The obtained redeposit was filtered and dried to prepare a PC copolymer (PC-8).

A reduced viscosity $[\eta_{sp}/C]$ of PC-8 was 1.10 dl/g. The PC copolymer was found to have a component in which two or more repeating units derived from 4,4' biphenol were connected through a carbonate bonding.

Comparative Example 4

A solution prepared by dissolving 0.2 kg of 1,1-bis(4-hydroxyphenyl)cyclohexane in 1.2 kg of 16-weight % aqueous potassium hydroxide was mixed with 1.3 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (190 mL) was added to the above oligomer (260 mL). To this solution, p-tert-butylphenol (0.40 g) was added as a terminal terminator and stirred for sufficient mixing. After 30 mL of 2N aqueous potassium hydroxide separately prepared was added in this solution, 1 mL of triethylamine solution (7 vol %) was added with stirring for ten minutes. A biphenol monomer solution was prepared by a monomer-solution preparation method including: preparing 120 mL of 2N aqueous potassium hydroxide; cooling the solution at the room temperature or less; adding 0.1 g of hydrosulphite and 17.3 g of 1,1-bis(4-hydroxyphenyl)cyclohexane; and completely dissolving the mixed solution. All amount of the biphenol monomer solution separately prepared as described above was added to the above PTBP solution and kept on stirring for one hour.

The obtained reaction mixture was diluted with 2 L of methylene chloride and 1 L of water and cleaned. A lower layer was separated from the reaction mixture. Then, the reaction mixture was cleaned with 1 L of water one time, with 1 L of 0.01N hydrochloric acid one time, and with 1 L of water three times in this order. The obtained methylene chloride solution was dropped into methanol with stirring. The obtained redeposit was filtered and dried to prepare a PC copolymer (PC-9).

A reduced viscosity $[\eta_{sp}/C]$ of PC-9 was 1.14 dl/g.

Comparative Example 5

A PC copolymer (PC-10) was manufactured in the same manner as that in Example 10A except that the bisphenol E oligomer (E-CF) used in Example 10A was replaced by the bisphenol E oligomer (E-CF2) manufactured in Manufacturing Example 5. The PC copolymer (PC-10) has the same structure and the reduced viscosity as the PC copolymer of Example 10A. A residual content of diethyl carbamic acid chloride in the obtained polycarbonate copolymer was found to be 110 mass ppm based on a total mass of the polycarbonate copolymer.

Evaluation Result

Table 5 shows evaluation results of Examples 1 to 5 and 10A to 10D and Comparative Examples 1 to 5. When Examples 1 to 5 and 10A to 10D was compared with Comparative Examples 1 to 5, the PC copolymers of Examples 1 to 5 and 10A to 10D were found to have an excellent wear resistance since solubility of the PC copolymers was kept stable in the organic solvent and a mass reduction of the PC copolymers in wear resistance evaluation was small. Moreover, because of a small value of initial residual potential ($V_R$) and repeating residual potential (increase in $V_R$), the electrophotographic photoreceptors of Examples 1 to 5 and 10A to 10D were found to have excellent wear resistance, electrical characteristics and electrification characteristics.

On the other hand, the electrophotographic photoreceptors of Comparative Examples 1 and 4 were found to have poor wear resistance because of large mass reduction in the evaluation of wear resistance.

The PC copolymers of Comparative Examples 2 and 3 had poor solubility. Particularly, the PC copolymer of Comparative Example 2 was not dissolved. In Comparative Example 3, the solution was whitened and initial residual potential ($V_R$) and repeating residual potential (increase in $V_R$) of the electrophotographic photoreceptor were large, so that the electrophotographic photoreceptor was found to have poor electrical characteristics and electrification characteristics.

In Examples 1 to 5 and 10A to 10D, the number of cleaning times of bischloroformate was increased, almost no impurity remained in the PC copolymer, resulting in favorable initial residual potential and repeating residual potential. However, in Comparative Example 5, because of a small number of cleaning times of bischloroformate, a lot of impurities remained in the PC copolymer, resulting in poor initial residual potential and repeating residual potential.

Further, as shown in Table 6, since the divalent organic siloxane modified phenylene group is contained in each PC copolymer in Examples 10A to 10C and the monovalent organic siloxane modified phenyl group is contained in the PC copolymer in Example 10D, the contact angle with water and toner adherability were found to be enhanced in Examples 10A to 10C as compared with Example 1 having no organic siloxane modified phenyl group.

In Table 5, "* impurity content" represents the content of diethyl carbamic acid chloride.

TABLE 5

| | PC copolymer | | | | Electrophotographic Photoreceptor | | |
|---|---|---|---|---|---|---|---|
| | Reduced Viscosity (dl/g) | Wear Resistance (mg) | Solubility | *Impurity content (mass ppm) | Wear Resistance (mg) | Initial Residual Potential ($V_R$) | Repeating Residual Potential (increase in $V_R$) |
| Example 1 (PC-1) | 1.24 | 0.45 | ○ | 10 | 0.8 | −10 | 10 |
| Example 2 (PC-2) | 1.16 | 0.48 | ○ | 10 | 0.9 | −10 | 10 |
| Example 3 (PC-3) | 1.16 | 0.49 | ○ | 10 | 0.9 | −10 | 10 |
| Example 4 (PC-4) | 1.24 | 0.49 | ○ | 10 | 0.9 | −10 | 10 |
| Example 5 (PC-5) | 1.24 | 0.44 | ○ | 10 | 0.8 | −10 | 10 |
| Example 10A (PC-10A) | 1.24 | 0.45 | ○ | 5 | 0.8 | −10 | 0 |
| Example 10B (PC-10B) | 1.24 | 0.45 | ○ | 5 | 0.8 | −10 | 0 |
| Example 10C (PC-10C) | 1.24 | 0.46 | ○ | 5 | 0.8 | −10 | 0 |
| Example 10D (PC-10D) | 1.24 | 0.45 | ○ | 5 | 0.8 | −10 | 0 |
| Comparative Example 1 (PC-6) | 1.13 | 0.57 | ○ | 15 | 1.6 | −10 | 20 |
| Comparative Example 2 (PC-7) | 0.5 | immeasurable | x | — | immeasurable | immeasurable | immeasurable |
| Comparative Example 3 (PC-8) | 1.1 | 0.33 | whitened | — | 0.9 | −100 | 200 |
| Comparative Example 4 (PC-9) | 1.14 | 0.6 | ○ | — | 1.9 | −10 | 20 |
| Comparative Example 5 (PC-10) | 1.24 | 0.45 | ○ | 110 | 0.8 | −50 | 100 |

TABLE 6

| | Film of PC polymer Contact Angle with Water (degree) | Electrophotograhic Photoreceptor Toner Adherability |
|---|---|---|
| Example 1 (PC-1) | 90 | ○ |
| Example 10 (PC-10A) | 104 | ⊚ |
| Example 10 (PC-10B) | 104 | ⊚ |
| Example 10 (PC-10C) | 104 | ⊚ |
| Example 10 (PC-10D) | 104 | ⊚ |

Fourth Exemplary Embodiment

A fourth exemplary embodiment of the invention will be described in detail below.

In describing this exemplary embodiment, what has been described in the above first, second and third exemplary embodiments will be omitted or simplified.

Structure of PC Copolymer

A PC copolymer according to this exemplary embodiment is a polycarbonate copolymer having a repeating unit represented by a formula (4-1) below and a molar copolymer composition represented by $Ar^2/(Ar^1+Ar^2)$ in a range of 25 mol % to 47 mol %.

[Chemical Formula 93]

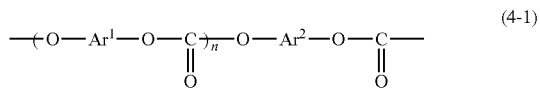

(4-1)

In the formula, $Ar^1$ is a group represented by a formula (4-2) below. $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane. n representing an average repeating number of an $Ar^1$ block is in a range of 1.09 to 3.00.

The PC copolymer according to this exemplary embodiment is typically manufactured by forming the $Ar^1$ block and reacting the $Ar^1$ block with a monomer having $Ar^2$. Accordingly, n is not a numeral of 1.0 or less. n is a numeral in a range of 1.09 to 3.0, preferably in a range of 1.09 to 1.99. When n is less than 1.09, regularity of the repeating unit becomes too high to excessively exhibit characteristics of crystalline monomer, so that solubility of the PC copolymer may be deteriorated. When n is more than 3.0, it is difficult to sufficiently increase the content of crystalline components contained in the PC copolymer, so that improvement in wear resistance may become insufficient.

In the PC copolymer according to this exemplary embodiment, the content of the monomer unit of $Ar^2$ is in a range of 25 mol % to 47 mol %, preferably in a range of 33 mol % to 47 mol %, particularly preferably in a range of 38 mol % to 45 mol %.

When $Ar^2$ is more than 47 mol %, the PC copolymer becomes a copolymer having a highly regular structure, which is analogous to an alternate copolymer, so that solubility of the PC copolymer is decreased. When $Ar^2$ is less than 25 mol %, improvement in wear resistance of the PC copolymer becomes insufficient. The aforementioned mol % is a value obtained when the molar copolymer composition represented by $Ar^2/(Ar^1+Ar^2)$ is represented by percentage.

In a copolymer structured with a bonding block including a plurality of $Ar^2$, since the block component of $Ar^2$ exhibits a low solubility, a polymer solution dissolved in an organic solvent may be whitened. Such a polymer solution is not suitable as a coating liquid.

In the formula (4-1), $Ar^1$ is represented by the following formula (4-2).

[Chemical Formula 94]

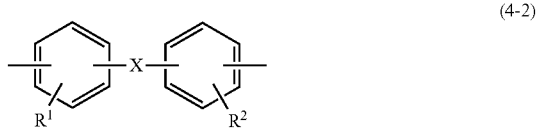

(4-2)

In the formula, $R^1$ and $R^2$ each represent a hydrogen atom, a halogen atom, an alkyl group having 1 to 12 carbon atoms or a substituted or unsubstituted aryl group having 6 to 12 carbon atoms. $R^1$ and $R^2$ may be a plurality of groups for a single aromatic ring. In this case, the plurality of groups may be the same or different, provided that not all of $R^1$ and $R^2$ are hydrogen atoms. X is —$CR^3R^4$— (in which $R^3$ and $R^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a substituted or unsubstituted 1,8-menthanediyl group, a 2,8-menthanediyl group, a substituted or unsubstituted α,ω-alkylene group having 2 to 12 carbon atoms.

The number of $R^1$ and $R^2$ which are not a hydrogen atom may be one or more. One of $R^1$ and $R^2$ may be absent.

A structure of the formula (4-2) is preferably a structure of the following formula (4-2') in terms of availability of ingredients and wear resistance.

In terms of availability of ingredients and wear resistance, $R^1$ and $R^2$ which are not a hydrogen atom are preferably an alkyl group having 1 to 12 carbon atoms or a substituted or unsubstituted aryl group having 6 to 12 carbon atoms.

[Chemical Formula 95]

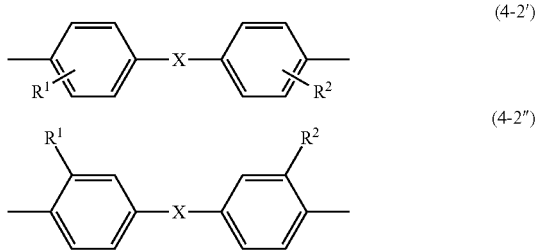

Examples of a halogen atom forming $R^1$ and $R^2$ are a fluorine atom, a chlorine atom and a bromine atom.

Examples of the alkyl group having 1 to 12 carbon atoms which forms $R^1$, $R^2$, $R^3$ and $R^4$ are a linear or branched alkyl group. Examples thereof are a methyl group, an ethyl group, propyl groups, butyl groups, pentyl groups and hexyl groups. Also, the alkyl group may be a cyclic alkyl group such as a cyclohexyl group. Further, a part or an entirety of the hydrogen atom in the alkyl group may be substituted by a halogen atom. Examples of other substituents are a trifluoromethyl group, an aryl group having 6 to 12 carbon atoms, an alkoxy group having 1 to 12 carbon atoms and an aryloxy group having 6 to 12 carbon atoms. Examples of the alkyl group forming the substituents are the same groups as the above. Examples of the aryl group forming the substituents are the following groups.

Examples of the aryl group having 6 to 12 carbon atoms which forms $R^1$, $R^2$, $R^3$ and $R^4$ are a phenyl group.

When the aryl group has a substituent in the above groups, for instance, the substituent may be an alkyl group having 1 to 6 carbon atoms. Examples of the alkyl group having 1 to 6 carbon atoms are the group exemplified in the above description for $R^1$, $R^2$, $R^3$ and $R^4$. Examples of other substituents are a halogen atom and a trifluoromethyl group.

$R^1$, $R^2$, $R^3$ and $R^4$ may be the same or different.

Examples of the substituted or unsubstituted cycloalkylidene group having 5 to 20 carbon atoms and the bicyclo- or tricyclo-hydrocarbon-diyl group having 5 to 20 carbon atoms, which form X, are groups derived from cyclopentane, cyclohexane, cycloheptane, cyclooctane, cyclononane, cyclodecane, tricyclodecane, adamanthane and dicyclopentadiene. As a substituent for the cycloalkylidene group or the bicyclo- or tricyclo-hydrocarbon-diyl group, an alkyl group having 1 to 6 carbon atoms may be enumerated. Examples of the alkyl group having 1 to 6 carbon atoms are the group exemplified in the above description for $R^1$, $R^2$, $R^3$ and $R^4$. Not only a single substituent but a plurality of different substituents may be added.

The substituted or unsubstituted α,ω-alkylene group having 2 to 12 carbon atoms which forms X is exemplified by a linear or branched alkylene group. Examples of the alkylene group are a divalent group derived from ethane, propane and butane. Examples of a substituent for the α,ω-alkylene group include an alkyl group having 1 to 6 carbon atoms and an aryl group having 6 to 12 carbon atoms. Examples of the alkyl group having 1 to 6 carbon atoms are the group exemplified in the above description for $R^1$, $R^2$, $R^3$ and $R^4$. The aryl group having 6 to 12 carbon atoms is exemplified by a phenyl group.

The 1,8-menthanediyl group and the 2,8-menthanediyl group, which form X, may be substituted by a substituent, examples of which includes an alkyl group having 1 to 6 carbon atoms and an aryl group having 6 to 12 carbon atoms. Examples of the alkyl group having 1 to 6 carbon atoms are the group exemplified in the above description for $R^1$, $R^2$, $R^3$ and $R^4$. The aryl group having 6 to 12 carbon atoms is exemplified by a phenyl group.

$Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane.

When $Ar^2$ is a biphenol derivative, $Ar^2$ is preferably bonded at 4,4'-position in terms of improvement in mechanical properties and wear resistance. When $Ar^2$ is a naphthylene group, the naphthylene group is bonded to an oxygen atom at one of 1 to 8-positions. The naphthylene group is preferably bonded to an oxygen atom at 2,7-position, 2,6-position, 1,4-position or 1,5-position in terms of improvement in mechanical properties and wear resistance. A bonding position of $Ar^2$ with other substituents and oxygen atoms is the same as those in the description for $Ar^1$.

In this exemplary embodiment, it is preferable that the examples of $Ar^2$ further include a divalent organic siloxane modified phenylene group in the same manner as those in the first, second and third exemplary embodiments.

In the same manner as in the first, second and third exemplary embodiments, in a solution where the PC copolymer according to this exemplary embodiment is dissolved in a solvent of methylene chloride at a concentration of 0.5 g/dl, the PC copolymer preferably exhibits reduced viscosity [$\eta_{SP}$/C] at 20 degrees C. in a range of 0.1 dl/g to 5 dl/g, more preferably 0.2 dl/g to 3 dl/g, particularly preferably 0.3 dl/g to 2.5 dl/g. When the reduced viscosity [$\eta_{sp}$/C] is less than 0.1 dl/g, wear resistance of the PC copolymer may be insufficient in use for the electrophotographic photoreceptor. When the reduced viscosity [$\eta_{sp}$/C] is more than 5 dl/g, coating viscosity of the PC copolymer may become too high for manufacturing a molded product (the electrophotographic photoreceptor and the like) from a coating liquid, so that productivity of the electrophotographic photoreceptor may be unfavorably lowered.

In this exemplary embodiment as well as the second and third exemplary embodiments, the PC copolymer of the formula (4-1) is preferably a polycarbonate copolymer having a chain end terminated by a monovalent aromatic group or a monovalent fluorine-containing aliphatic group in terms of improvement in electrical properties.

The PC copolymer with improved electric properties has a monovalent aromatic group or a monovalent fluorine-containing aliphatic group as an end group in the same manner as that in the second and third exemplary embodiments. The monovalent aromatic group may be a group containing an aliphatic group such as an alkyl group. The monovalent fluorine-containing aliphatic group may be a group containing an aromatic group.

The monovalent aromatic group for the end group is preferably an aryl group having 6 to 12 carbon atoms in the same manner as those in the second and third exemplary embodiments. Examples of the aryl group are a phenyl group and a biphenyl group. Examples of the substituent for the aromatic group and the aliphatic group such as the alkyl group for the aromatic group are halogen atoms such as a fluorine atom, a chlorine atom and a bromine atom. The substituent for the aromatic group is exemplified by an alkyl group having 1 to 20 carbon atoms. This alkyl group may be a group substituted by a halogen atom as described above and a group substituted by an aryl group.

The monovalent fluorine-containing aliphatic group for the end group is exemplified by a fluorine-containing alkyl group having 1 to 20 carbon atoms in the same manner as those in the second and third exemplary embodiments.

When the monovalent aromatic group is at the chain end, the monovalent aromatic group may be an organic siloxane modified phenyl group in the same manner as those in the first, second and third exemplary embodiments.

Manufacturing Method of PC Copolymer

The PC copolymer according to this exemplary embodiment is exemplarily obtainable by reacting a divalent phenol compound (a comonomer represented by a formula (4-4) below) in the presence of a base with a bischloroformate oligomer having a small number of repeating units represented by a formula (4-3) below.

[Chemical Formula 96]

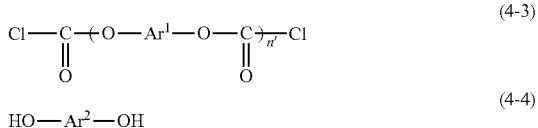

(4-3)

(4-4)

n' representing the average number of repeating units of the bischloroformate oligomer is different from n in the formula (4-1) in the same manner as n' in the second and third exemplary embodiments. n and n' are approximately the same, but n is larger than n'. This is because, when the manufactured $Ar^1$ oligomer reacts with a monomer including $Ar^2$, the bischloroformate group at the end of the $Ar^1$ oligomer may react with a base present in the reaction system to form a hydroxyl group, resulting in polycondensation of the hydroxyl group with another $Ar^1$ oligomer having chlorine at its end.

In the bischloroformate oligomer of the formula (4-3), the average number of repeating units n' is in a range of 1.0 to 1.99 in the same manner as n' in the second and third exemplary embodiments. The PC copolymer according to this exemplary embodiment is easily manufactured by using the bischloroformate oligomer having the average number of repeating units in a range of 1.0 to 1.99. A method for calculating the average number of repeating units n' is exemplified by a method described later in Examples.

In this exemplary embodiment, $Ar^1$ is preferably a divalent group induced from a monomer selected from 1,1-bis(3-methyl-4-hydroxyphenyl)ethane, 2,2-bis(3-methyl-4-hydroxyphenyl)butane, 2,2-bis(3-methyl-4-hydroxyphenyl)propane, 2,2-bis(3-phenyl-4-hydroxyphenyl)propane, 1,1-bis(3-methyl-4-hydroxyphenyl)cyclohexane, and 1,1-bis(3-methyl-4-hydroxyphenyl)cyclopentane, in terms of improvement in solubility in the organic solvent.

The ingredient including bischloroformate oligomer represented by the formula (4-3) may contain an amido compound as impurities in the same manner as those in the first, second and third exemplary embodiments.

The manufacturing method of the PC copolymer according to this exemplary embodiment is exemplified by polycondensation of the bischloroformate oligomer induced from a bisphenol compound represented by a formula (4-5) below and a divalent phenol compound represented by a formula (4-6) below, the divalent phenol compound induced from biphenol, dihydroxynaphthalene, hydroquinone, resorcin, catechol, 9,9-bis(hydroxyphenyl)fluorene or 4,4'-dihydroxydiphenylmethane.

[Chemical Formula 97]

(4-5)

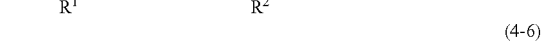

(4-6)

Examples of the bisphenol compound represented by the formula (4-5) are 1,1-bis(3-methyl-4-hydroxyphenyl)cyclopentane, 2,2-bis(3-methyl-4-hydroxyphenyl)adamantane, 1,3-bis(3-methyl-4-hydroxyphenyl)adamantane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(3-methyl-4-hydroxyphenyl)cycloheptane, 1,1-bis(3-methyl-4-hydroxyphenyl)cyclooctane, 1,1-bis(3-methyl-4-hydroxyphenyl)cyclononane, 1,1-bis(3-methyl-4-hydroxyphenyl)cyclodecane, 1,1-bis(3-methyl-4-hydroxyphenyl)cycloundecane, 1,1-bis(3-methyl-4-hydroxyphenyl)cyclododecane, 1,1-bis(3-methyl-4-hydroxyphenyl)ethane, 2,2-bis(3-methyl-4-hydroxyphenyl)butane, 2,2-bis(3-methyl-4-hydroxyphenyl)propane, and 2,2-bis(3-phenyl-4-hydroxyphenyl)propane.

Among these, 1,1-bis(3-methyl-4-hydroxyphenyl)cyclopentane, 2,2-bis(3-methyl-4-hydroxyphenyl)adamantane, 1,3-bis(3-methyl-4-hydroxyphenyl)adamantane, 1,1-bis(3-methyl-4-hydroxyphenyl)cyclohexane, 1,1-bis(3-methyl-4-hydroxyphenyl)cyclododecane, 1,1-bis(3-methyl-4-hydroxyphenyl)ethane, 2,2-bis(3-methyl-4-hydroxyphenyl)butane, 2,2-bis(3-methyl-4-hydroxyphenyl)propane, and 2,2-bis(3-phenyl-4-hydroxyphenyl)propane, which provide excellent solubility to the PC copolymer, are preferable. In addition, when the PC copolymer is applied for electrophotographic photoreceptors, the PC copolymer is preferable since the PC copolymer provides a favorable coating liquid. One of the above may be singularly used, or two or more of the above may be used together.

Next, a monomer represented by the formula (4-6) will be described. An example of a monomer as an ingredient for $Ar^2$ (the other configuration unit of the PC copolymer of this exemplary embodiment) is a divalent phenol monomer in terms of wear resistance. The divalent phenol monomer and the bisphenol monomer have 2 mass % or less of solubility to methylene chloride (homopolymer) or are substantially incapable of synthesizing a homopolymer having a number average molecular weight of 10000 or more because of crystallization of polymers formed during a polycarbonate synthesis reaction by the interfacial polycondensation method.

Whether the solubility to methylene chloride is 2 mass % or less is checked by whether decrease in mass of the homopolymer is 0.04 mass parts or more. Such decrease in mass of the homopolymer is calculated by immersing 2 mass parts of the solid homopolymer in 98 mass parts of methylene chloride at the room temperature for 24 hours, the homopolymer having an organic solvent content of 500 mass ppm or less and a viscosity average molecular weight in a range of 15000 to 30000; separating solids from liquid; and drying the solids.

Since the monomers represented by the formula (4-6) are the same as those in the second and third exemplary embodiments, description thereof will be omitted here.

The PC copolymer according to this exemplary embodiment is obtainable in the same manner as those in the second and third exemplary embodiments by further polymerizing the monomer represented by the formula (4-6) in which $Ar^2$ is a divalent organic siloxane modified phenylene group.

The PC copolymer according to this exemplary embodiment is obtainable by conducting interfacial polycondensation using the bischloroformate oligomer obtained from the monomer represented by the formula (4-5) and the monomer represented by the formula (4-6). For instance, by conducting interfacial polycondensation under the presence of an acid-binding agent with use of various carbonyl dihalides such as phosgene, carbonate ester bonding can be favorably formed. The above reaction(s) is conducted under the presence of a terminal terminator and/or a branching agent as needed in the same manner as those in the first, second and third exemplary embodiments. Since the terminal terminator and the branching agent are the same as those in the first, second and third exemplary embodiments, description thereof will be omitted here. Moreover, in manufacturing the PC copolymer according to this exemplary embodiment, two or more kinds of monomers derived from $Ar^2$ may be used to provide a multi-component copolymer.

Since the interfacial polycondensation is conducted in the same as those in the second and third exemplary embodiments, description thereof will be omitted here.

The manufacturing method of the PC copolymer according to this exemplary embodiment is specifically applicable in various embodiments. For instance, the bischloroformate oligomer having a small number of repeating units is manufactured by reacting the bisphenol compound represented by the formula (4-5) with phosgene, and then the bischloroformate oligomer is reacted with the monomer represented by the formula (4-6) under the presence of a mixture of the above solvent and an alkali aqueous solution of the above acid-binding agent. This method is preferable in that n in the formula (4-1) is adjustable to a preferable range.

When the bischloroformate oligomer is manufactured by the following method, the method is preferable in that cleaning process in manufacturing the PC copolymer can be simplified.

A manufacturing method of the bischloroformate oligomer having n' of the formula (4-3) in a range of 1.0 to 1.99 is exemplified by the following. Firstly, the bisphenol compound of the formula (4-5) is suspended in a hydrophobic solvent such as methylene chloride and is added with phosgene to provide a mixed solution. On the other hand, a tertiary amine such as triethylamine is dissolved in a hydrophobic solvent such as methylene chloride to form a solution. The solution is dropped into the above mixed solution at the room temperature or less for reaction. Hydrochloric acid and deionized water are added to a residual solution of the obtained reactant mixture for cleaning. An organic layer including a polycarbonate oligomer having a small number of repeating units is obtained.

A dropping temperature and a reaction temperature are typically in a range of 0 to 70 degrees C., preferably in a range of 5 to 65 degrees C. Reaction time is in a range of 15 minutes to 4 hours, preferably 30 minutes to 3 hours. Thus obtained polycarbonate oligomer has an average number of repeating units (n') is preferably in a range of 1.00 to 1.99, more preferably in a range of 1.00 to 1.60.

An organic phase containing the bischloroformate oligomer thus obtained having a small number of repeating units is added with the aromatic divalent phenol monomer represented by the formula (4-6) for reaction. The reaction temperature is 0 to 150 degrees C., preferably 5 to 40 degrees C., particularly preferably 10 to 25 degrees C.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 3 hours.

In the reaction, the aromatic divalent phenol monomer represented by the formula (4-6) is desirably added in a form of an aqueous solution or an organic-solvent solution. The order of the addition is not specifically limited. In the above manufacturing method, the catalyst, the terminal terminator, the branching agent and the like may be added as needed at the time of manufacturing bischloroformate or at the time of subsequent polymerization reaction, or both at the time of manufacturing bischloroformate oligomer and at the time of subsequent polymerization reaction.

The PC copolymer thus obtained is a copolymer formed of a repeating unit(s) represented by a formula (4-9) below and a repeating unit(s) represented by a formula (4-10) below.

As long as an object of the invention is not hampered, the PC copolymer may contain a polycarbonate unit having a structure unit other than those of the formulae $Ar^1$ and $Ar^2$, or a unit having a polyester structure or a polyether structure.

[Chemical Formula 98]

(4-9)

(4-10)

Structure of Coating Liquid

A coating liquid according to this exemplary embodiment at least contains the PC copolymer according to this exemplary embodiment and a solvent capable of dissolving or dispersing the PC copolymer according to this exemplary embodiment. Since the structure and the contents of the coating liquid are the same as those of the first, second and third exemplary embodiments except that the PC copolymer according to this exemplary embodiment is used, description thereof will be omitted here.

Structure of Electrophotographic Photoreceptor

As long as the above-described PC copolymer is used in a photosensitive layer, the electrophotographic photoreceptor according to this exemplary embodiment may be any electrophotographic photoreceptor (e.g. one of known various electrophotographic photoreceptors). However, the photosensitive layer of the electrophotographic photoreceptor is preferably a layered electrophotographic photoreceptor including at least one charge generating layer and at least one charge transporting layer, or alternatively the photosensitive layer of the electrophotographic photoreceptor is preferably a single-layer electrophotographic photoreceptor including both a charge generating material and a charge transporting material. Since the structure and the contents of the electrophotographic photoreceptor are the same as those of the first, second and third exemplary embodiments except that the PC copolymer according to this exemplary embodiment is used, description thereof will be omitted here.

Examples of Fourth Exemplary Embodiment

Next, examples and comparatives of a fourth exemplary embodiment will be described in detail. However, the second exemplary embodiment is not limited to the examples but may include various modifications and applications as long as such modifications and applications do not depart from a technical idea of the invention.

MANUFACTURING EXAMPLE

Preparation of Oligomer

Manufacturing Example 1: Synthesis of Bisphenol C Oligomer (Bischloroformate)

230 g (0.897 mol) of 2,2-bis(3-methyl-4-hydroxyphenyl)propane (bisphenol C), 1058 ml of methylene chloride and 187 g (1.89 mol) of phosgene were mixed into a solution. To the mixed solution, a solution prepared by diluting 199.4 g (1.97 mol) of triethylamine in 460 ml of methylene chloride was dropped at 13 to 16 degrees C. for three hours and six minutes. The reactant mixture was stirred at 14 to 16 degrees C. for one hour and 38 minutes. 5.0 ml of concentrated hydrochloric acid and 200 ml of deionized water were added to the reactant mixture for cleaning. Subsequently, water cleaning was repeated until an aqueous layer became neutral. The resultant methylene chloride solution was a bischloroformate compound-containing solution (1848.4 g).

The obtained solution had a chloroformate concentration of 1.16 mol/L, a solid concentration of 0.24 kg/L and an average number of repeating units (n') of 1.12. A content of an amide compound contained in the obtained bisphenol C oligomer equals to a value obtained by subtracting a mass of nitrogen derived from triethylamine from the total mass of nitrogen in the bisphenol C oligomer. The content of the amide compound was found to be 90 mass ppm based on the total mass of the bisphenol C oligomer. The mass of nitrogen derived from triethylamine was 0.3 mass ppm. The mass of nitrogen in the bisphenol A oligomer was determined by the chemiluminescence method according to JIS K2609 The total mass of nitrogen in the bisphenol C was analyzed by Gas chromatography to determine an amount of triethylamine. The amount of triethylamine was converted to the mass of nitrogen. By subtracting this mass of nitrogen from the total mass of nitrogen, the mass of nitrogen derived from the amide compound was obtained. This obtained ingredient will be referred to as "C-CF" hereinafter.

The total mass of nitrogen was determined using TS-100 manufactured by Mitsubishi Chemical Analytech Co., Ltd. according to JIS K2609 (chemiluminescence method). Measuring methods on liquid are described in JIS. Solid samples were measured using the same instruments as those for liquid.

The methylene chloride solution of the bischloroformate compound was dried and hardened at 50 degrees C. under a reduced pressure to obtain methylene chloride. The obtained solid content was used for measurement. By comparing the result of the measurement with calibration curve separately obtained based on pyridine as the reference material, the amount of nitrogen was determined. The obtained result was converted to a concentration of the bischloroformate compound in the methylene chloride solution, whereby the total mass of nitrogen in the bischloroformate compound.

0.5N—NaOH aqueous solution was added to the solid content of the bischloroformate compound obtained by the above method so that the obtained solution has 8 or more pH. To this solution, chloroform was added. Triethylamine was extracted as extraction component by chloroform extraction method and was analyzed by Gas chromatography. The amount of triethylamine was determined by the absolute calibration method.

Conditions for Gas chromatography analysis were as follows.

Product model: 7890A manufactured by Agilent Technologies

Column: CP-VOLAMINE (manufactured by Varian) with 60 m×0.32 mm (inner diameter)

Inlet temperature: 150 degrees C.

Column temperature: heating a column at 50 degrees C. per minute when the column temperature is from 40 degrees C. to 150 degrees C., keeping the column temperature at 150 degrees C. for ten minutes, and heating the column at 50 degrees C. per minute until the column temperature reached 250 degrees C.

Carrier gas: helium with a constant speed of 40 cm per second

Injected amount: 2 μl

Injection method: splitless injection

Detector: FID

FID temperature: 260 degrees C.

The average number of repeating units (n') was obtained using the following formula. The average number of repeating units (n')=1+(Mav−M1)/M2 (Formula 1) In the formula 1, Mav represents (2×1000/(CF value), M2 represents (M1−98.92), and M1 represents a molecular weight of the bischloroformate compound when n'=1 in the formula (4-3). The CF value (N/kg) represents (CF value/concentration). The CF value represents the number of chlorine molecule in the bischloroformate compound represented by the formula (4-3) contained in 1 L of the reaction solution. The concentration (kg/L) represents an amount of the solid content obtained by concentrating the 3-L reaction solution. Herein, 98.92 is a total atom weight of two chlorine atoms, one oxygen atom and one carbon atom which are desorbed at polycondensation of the bischloroformate compounds.)

Manufacturing Example 2: Synthesis of DMCP Oligomer (Bischloroformate)

76.7 g (0.272 mol) of 1,1-bis(3-methyl-4-hydroxyphenyl)cyclopentane (DMCP) was suspended in 410 mL of methylene chloride, to which 53.8 g (0.533 mol) of triethylamine was added for dissolution. The obtained solution was dropped into a solution, which was prepared by dissolving 52.7 g (0.533 mol) of phosgene in 225 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol E oligomer having a chloroformate group at its molecular terminal was obtained. The obtained solution had a chloroformate concentration of 0.89 mol/L, a solid concentration of 0.20 kg/L and an average number of repeating units (n') of 1.14. A content of an amide compound in the obtained DMCP oligomer was found to be 90 mass ppm. A mass of nitrogen derived from triethylamine was 0.3 mass ppm. This obtained ingredient will be referred to as "DMCP-CF" hereinafter.

Manufacturing Example 3: Synthesis of CZ Oligomer (Bischloroformate)

A methylene chloride solution of a bisphenol E oligomer having a chloroformate group at its molecular terminal was obtained in the same manner as that in Manufacturing Example 2 except that DMCP was replaced by 80.5 g (0.272 mol) of 1,1-bis(3-methyl-4-hydroxyphenyl)cyclohexane (CZ) in Manufacturing Example 2. The obtained solution had a chloroformate concentration of 0.89 mol/L, a solid concentration of 0.21 kg/L and an average number of repeating units (n') of 1.16. A content of an amide compound in the obtained CZ oligomer was found to be 90 mass ppm. A mass of nitrogen derived from triethylamine was 0.3 mass ppm. This obtained ingredient will be referred to as "CZ-CF" hereinafter.

Manufacturing Example 4: Synthesis of PH Oligomer (Bischloroformate)

A methylene chloride solution of a bisphenol E oligomer having a chloroformate group at its molecular terminal was obtained in the same manner as that in Manufacturing Example 2 except that DMCP was replaced by 103.4 g (0.272 mol) of 2,2-bis(3-phenyl-4-hydroxyphenyl)propane (PH) in Manufacturing Example 2. The obtained solution had a chloroformate concentration of 0.79 mol/L, a solid concentration of 0.23 kg/L and an average number of repeating units (n') of 1.19. A content of an amide compound in the obtained PH oligomer was found to be 210 mass ppm. A mass of nitrogen derived from triethylamine was 0.3 mass ppm. This obtained ingredient will be referred to as "PH-CF" hereinafter.

Manufacturing Example 5: Synthesis of Bisphenol A Oligomer (Bischloroformate)

80.2 g (0.352 mol) of 2,2-bis(4-hydroxyphenyl)propane (bisphenol A) was suspended in 450 mL of methylene chloride, to which 70.4 g (0.702 mol) of trietylamine was added for dissolution. The obtained solution was dropped into a solution, in which 69.8 g (0.631 mol) was dissolved in 250 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol A oligomer having a chloroformate group at its molecular terminal was obtained. The obtained solution had a chloroformate concentration of 0.88 mol/L, a solid concentration of 0.21 kg/L and an average number of repeating units (n') of 1.49. A content of an amide compound in the obtained bisphenol A oligomer was found to be 150 mass ppm. A mass of nitrogen derived from triethylamine was 0.3 mass ppm. This obtained ingredient will be referred to as "A-CF" hereinafter.

Manufacturing Example 6: Synthesis of Bisphenol C Oligomer (Bischloroformate)

56.6 kg (224 mol) of 1,1-bis(4-hydroxyphenyl)cyclohexane (bisphenol Z) was suspended in 1080 L of methylene chloride, to which 66.0 kg (667 mol) of phosgene was added for dissolution. To the obtained solution, a solution prepared by dissolving 44.0 kg (435 mol) of triethylamine in 120 L of methylene chloride was dropped at 2.2 to 17.8 degrees C. for 2 hours and 50 minutes. After stirring at 17.9 to 19.6 degrees C. for 30 minutes, 900 L of methylene chloride was distilled away at 14 to 20 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a bisphenol Z oligomer having a chloroformate group at its molecular terminal was obtained. The obtained solution had a chloroformate concentration of 1.14 mol/L, a solid concentration of 0.22 kg/L and an average number of repeating units of 1.02. A content of an amide compound in the obtained bisphenol C oligomer was found to be 20 mass ppm. A mass of nitrogen derived from triethylamine was 0.3 mass ppm. This obtained ingredient will be referred to as "C-CF2" hereinafter.

Manufacturing Example 7: Synthesis of Bisphenol C Oligomer (Bischloroformate)

Synthesis of bisphenol C oligomer was performed in the same manner as that in Manufacturing Example 1 except that the number of times for cleaning with deionized water after synthesis of the bisphenol C oligomer (C-CF) was decreased from four times in Manufacturing Example 1 to two times in Manufacturing Example 5.

A content of an amide compound in the obtained bisphenol C oligomer was found to be 720 mass ppm. This obtained ingredient will be referred to as "C-CF3" hereinafter.

Example 1

Manufacturing of PC Copolymer

C-CF (30 mL) of Manufacturing Example 1 and methylene chloride (30 mL) were injected to a reactor with a mechanical stirrer, stirring vane and baffle plate. To the reactor, p-tert-butylphenol (hereinafter referred to as PTBP) (0.05 g) as a terminal terminator was added and stirred for sufficient mixing. An aromatic divalent phenol monomer solution was prepared by a monomer-solution preparation method including: preparing 29 mL of 2N sodium hydroxide aqueous solution; cooling the solution at the room temperature or less; adding 0.1 g of hydrosulphite and 2.8 g of 2.7-dihydroxynaphthalene as an antioxidant; and completely dissolving the mixed solution. All amount of the divalent phenol monomer solution separately prepared as describe above was added to the PTBP solution. After the reactor was cooled down to 15 degrees C. of its inner temperature, 0.2 mL of a triethylamine aqueous solution (7 vol %) was added with stirring and kept on stirring for three hours.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N-hydrochloric acid one time, and with 0.1

L of water three times in this order. The obtained methylene chloride solution was dropped into methanol with stirring. The obtained redeposit was filtered and dried to prepare a PC copolymer (PC-1) with the following structure.
Identification of PC Copolymer Then, the PC copolymer (PC-1) thus obtained was dissolved in methylene chloride to prepare a solution having a concentration of 0.5 g/dl. When reduced viscosity $[\eta_{sp}/C]$ thereof at 20 degrees C. was measured, the result was 0.55 dl/g. A structure and a composition of the obtained PC-1 were analyzed by $^1$H-NMR spectrum method and $^{13}$C-NMR spectrum method. The obtained PC-1 was identified as a PC copolymer having a repeating unit, the number of the repeating unit and a composition as follows. A residual content of diethyl carbamic acid chloride in the obtained polycarbonate copolymer was found to be 10 mass ppm based on a total mass of the polycarbonate copolymer.

[Chemical Formula 99]

(4-1)

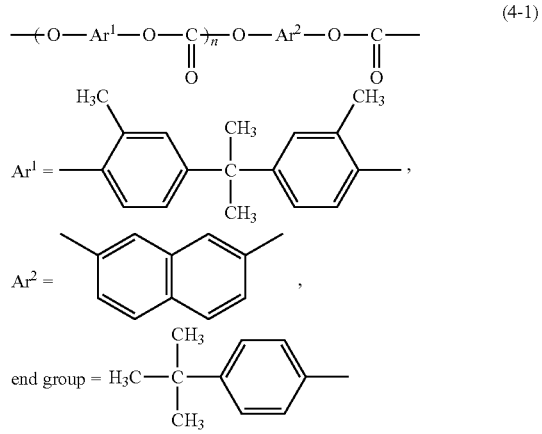

n = 1.60, Ar²/(Ar¹ + Ar²) = 0.38

A structure of the PC copolymer in the formula (4-1) was identified according to the following procedure. Firstly, it was confirmed using $^{13}$C-NMR spectrum method that $Ar^2$ is not bonded to another $Ar^2$. Next, a polymerization ratio of each of $Ar^1$ and $Ar^2$ was calculated using $^1$H-NMR spectrum method. Subsequently, n was calculated according to the following formula 2.

$Ar^2/(Ar^1+Ar^2)=1/(n+1)$ (Formula 2)

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. 0.5 parts by mass of oxotitanium phthalocyanine was used as a charge generating material while 0.5 parts by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting material, 0.5 g of a compound (CTM-1) represented by the following formula (4-11) and 0.5 g of the obtained PC copolymer (PC-1) were dispersed in 10 ml of tetrahydrofuran to prepare a coating liquid. The coating liquid was applied onto the charge generating layer with an applicator and dried, thereby providing a charge transporting layer having a film thickness of approximately 20 μm.

[Chemical Formula 100]

(4-11)

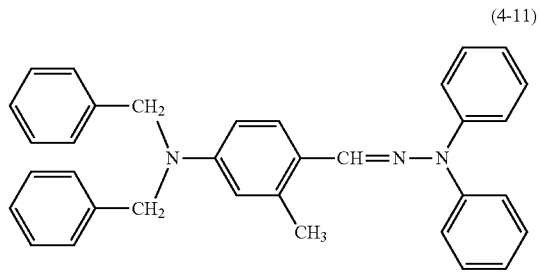

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as ○, a case where the PC copolymer was partially undissolved was marked as x, and a case where the PC copolymer was whitened was marked as "whitened."

Wear resistance of the PC copolymer and the electrophotographic photoreceptor was evaluated as follows.

(1) Sample preparation for evaluation on wear resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

(2) Sample preparation for evaluation on wear resistance of the photoreceptor: PC-1 (1 g) and CTM-1 (1 g) of the formula (4-11) were dissolved in methylene chloride (10 mL) and the obtained solution was cast into film on a commercially available PET film using an applicator. This film was heated under reduced pressure and a solvent was removed to obtain a film sample having a thickness of about 30 μm.

(3) Evaluation: wear resistance of cast surfaces of the films manufactured at (1) and (2) process was evaluated using a Suga wear test instrument NUS-ISO-3 model (manufactured by Suga Test Instruments Co., Ltd.). Testing conditions: An abrasion paper having an alumina particle with a particle size of 3 μm was given a 4.9-N load. The sample was put into reciprocating motion 2000 times on the abrasion paper in contact with a surface of a photosensitive layer. A mass reduction of the sample was measured.

(4) Measurement of a content of impurities (diethyl carbamic acid chloride) contained in the PC copolymer: diethyl carbamic acid chloride was measured by the absolute calibration method using Gas chromatography.
Measuring conditions are as follows.
Sample: 0.5 g of the PC copolymer was dissolved in 13.3 g of methylene chloride and defined as a measuring sample.
Product model: 7890A manufactured by Agilent Technologies
Column: HP-1 with 30m×0.25 mm (inner diameter) (a film thickness: 0.25 μm)

Column temperature: heating a column at 10 degrees C. per minute when the column temperature was from 40 degrees C. to 300 degrees C., and keeping the column temperature at 300 degrees C. for 30 minutes
Inlet temperature: 300 degrees C. at split
Detector: 310 degrees C. (FID)
Carrier gas: helium with a speed of 40 cm per second
Injected amount: 1 μl Next, electrophotographic characteristics of the obtained electrophotographic photoreceptor were measured using an electrostatic charge tester EPA-8100 (manufactured by Kawaguchi Electric Works Co., Ltd.). Specifically, corona discharge of −6 kV was conducted in the static mode. Then, the initial surface potential ($V_0$), residual potential (initial residual potential ($V_R$)) after five seconds of light irradiation (10 Lux), and half-life exposure amount ($E_{1/2}$) were measured. Further, a commercially available printer (FS-600, manufactured by Kyocera Corporation) was modified so as to measure the surface potential of the photoreceptor. Then, the photoreceptor was mounted on a drum and evaluated in terms of electrification characteristics (repeating residual-potential increase ($V_R$ increase) before and after 24-hour-consecutive operation under conditions of high temperature and high humidity (35 degrees C., 85%) without use of a toner and a paper.

The results are shown in Table 7. The following Examples 2 to 10D and Comparative Examples 1 to 4 were evaluated in the same manner. The results are also shown in Table 7.

Example 2

A PC copolymer (PC-2) was manufactured in the same manner as that in Example 1 except that C-CF (30 mL) was replaced by DMCP-CF (18 mL) of Manufacturing Example 2, the amount of methylene chloride was changed to 42 mL, the amount of PTBP was changed to 0.03 g, 2,7-dihydroxynaphthalene was replaced by 1.4 g of 4,4'-biphenol, the amount of 2N aqueous sodium hydroxide was changed to 10 mL and the reaction time was changed to one hour.

The PC copolymer (PC-2) was identified as a PC copolymer having 1.17 dl/g of a reduced viscosity [$\eta_{SP}/C$] and a structure with the following repeating unit and composition in the formula (4-1). A content of diethyl carbamic acid chloride in the PC copolymer was 10 mass ppm.

[Chemical Formula 101]

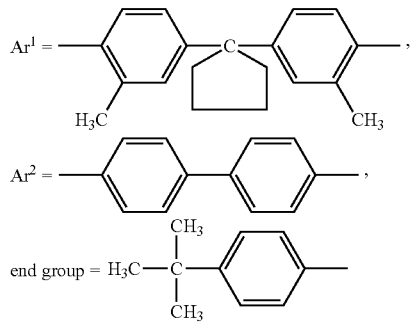

n = 1.93, $Ar^2/(Ar^1 + Ar^2) = 0.34$

Example 3

In Example 1, C-CF (30 mL) was replaced by CZ-CF (34 mL) of Manufacturing Example 3. The amount of methylene chloride was changed to 26 mL. 2,7-Dihydroxynaphthalene was replaced by 1.7 g of resorcin. The amount of aqueous sodium hydroxide was changed to 26 mL. Except for the above, a PC copolymer (PC-3) was manufactured in the same manner as that in Example 1.

The PC copolymer (PC-3) was identified as a PC copolymer having 0.53 dl/g of a reduced viscosity [$\eta_{SP}/C$] and a structure with the following repeating unit and composition in the formula (4-1). A content of diethyl carbamic acid chloride in the PC copolymer was 10 mass ppm.

[Chemical Formula 102]

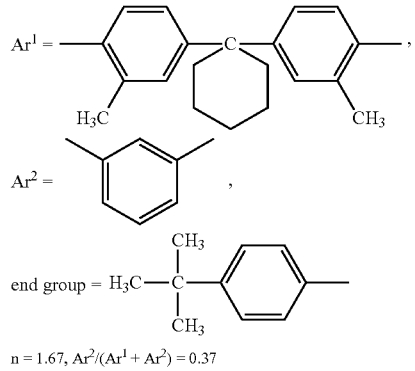

n = 1.67, $Ar^2/(Ar^1 + Ar^2) = 0.37$

Example 4

In Example 1, 2,7-dihydroxynaphthalene was replaced by 6.6 g of 9,9-bis(3-methyl-4-hydroxyphenyl)fluorene and 29 mL of aqueous sodium hydroxide was replaced by 29 mL of 2N aqueous potassium hydroxide. Except for the above, a PC copolymer (PC-4) was manufactured in the same manner as that in Example 1.

The PC copolymer (PC-4) was identified as a PC copolymer having 0.50 dl/g of a reduced viscosity [$\eta_{SP}/C$] and a structure with the following repeating unit and composition in the formula (4-1). A content of diethyl carbamic acid chloride in the PC copolymer was 10 mass ppm.

[Chemical Formula 103]

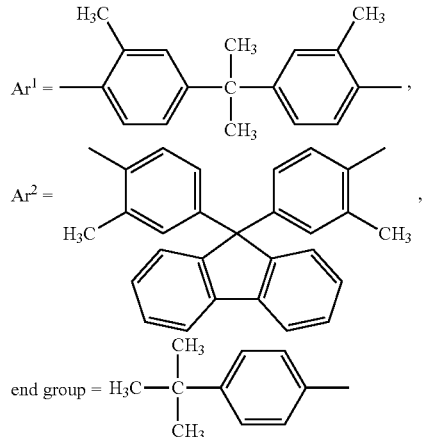

n = 1.55, $Ar^2/(Ar^1 + Ar^2) = 0.39$

Example 5

A PC copolymer (PC-5) was manufactured in the same manner as that in Example 1 except that C-CF (30 mL) was replaced by PH-CF (16 mL) of Manufacturing Example 4, the amount of methylene chloride was changed to 44 mL, the amount of PTBP was changed to 0.03 g, the amount of 2N aqueous sodium hydroxide was changed to 10 mL and the reaction time was changed to one hour.

The PC copolymer (PC-5) was identified as a PC copolymer having 1.12 dl/g of a reduced viscosity $[\eta_{SP}/C]$ and a structure with the following repeating unit and composition in the formula (4-1). A content of diethyl carbamic acid chloride in the PC copolymer was 20 mass ppm.

[Chemical Formula 104]

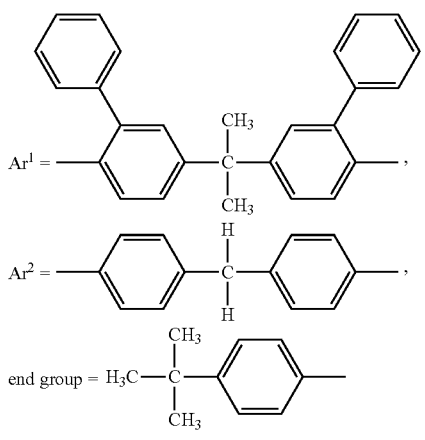

n = 1.44, $Ar^2/(Ar^1 + Ar^2) = 0.41$

Example 10A

C-CF2 (24 mL) of Manufacturing Example 6 and methylene chloride (36 mL) were injected to a reactor with a mechanical stirrer, stirring vane and baffle plate. To the reactor, p-tert-butylphenol (hereinafter referred to as PTBP) (0.04 g) as a terminal terminator and 0.1 g of siloxane modified phenol represented by the following formula (4-10A) were added and stirred for sufficient mixing.

A biphenol monomer solution was prepared by a monomer-solution preparation method including: preparing 10 mL of 2N sodium hydroxide aqueous solution; cooling the solution at the room temperature or less; adding 0.1 g of hydrosulphite and 2.6 g of 4,4'-biphenol as an antioxidant; and completely dissolving the mixed solution. All amount of the biphenol monomer solution separately prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N-hydrochloric acid one time, and with 0.1 L of water five times in this order. The obtained methylene chloride solution was dropped into warm water with stirring. While evaporating methylene chloride, a solid content of a resin was obtained. The obtained deposit was filtered and dried to prepare a polycarbonate copolymer (PC-10A) with the following structure. A mass ratio of an organic siloxane modified phenyl group in the PC copolymer (PC-10A) is 3 mass % based on a total mass of the PC copolymer. n=39 is given in the following formula (4-10A).

[Chemical Formula 105]

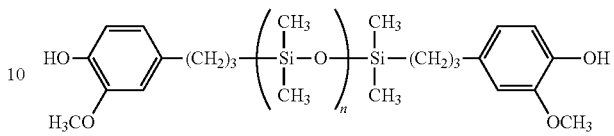

(4-10A)

The PC copolymer (PC-10A) was identified as a PC copolymer having 1.16 dl/g of a reduced viscosity $[\eta_{SP}/C]$ and a structure with the following repeating unit and composition in the formula (4-1). A content of diethyl carbamic acid chloride in the PC copolymer was 5 mass ppm.

[Chemical Formula 106]

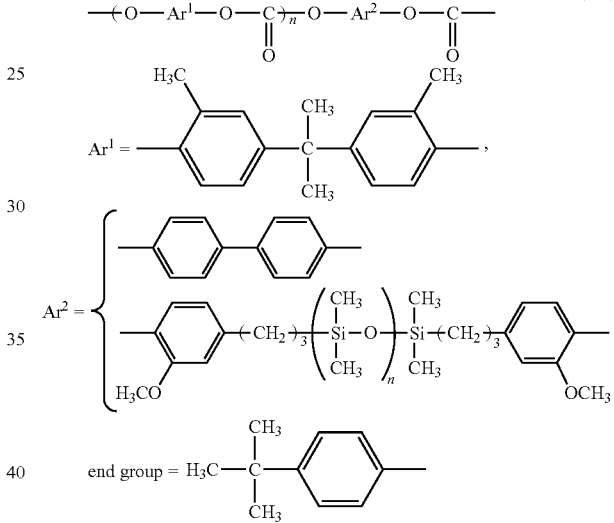

n = 1.38, $Ar^2/(Ar^1 + Ar^2) = 0.42$

Example 10B

A PC copolymer (PC-10B) was manufactured in the same manner as that in Example 10A except that siloxane modified bisphenol was replaced by 0.4 g of siloxane modified phenol represented by the following formula (4-10B). A mass ratio of an organic siloxane modified phenyl group in the PC copolymer (PC-10B) is 5 mass % based on a total mass of the PC copolymer. n=90 is given in the following formula (4-10B).

[Chemical Formula 107]

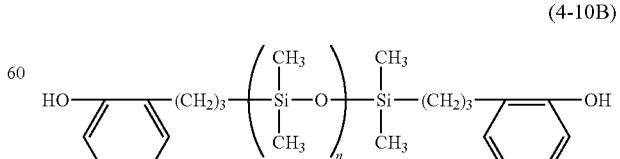

(4-10B)

The PC copolymer (PC-10B) was identified as a PC copolymer having 1.16 dl/g of a reduced viscosity $[\eta_{SP}/C]$ and a structure with the following repeating unit and composition in the formula (4-1). A content of diethyl carbamic acid chloride in the PC copolymer was 5 mass ppm.

[Chemical Formula 108]

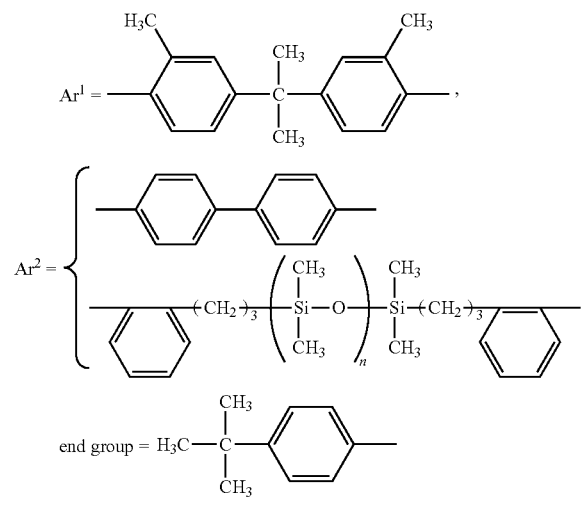

n = 1.38, Ar²/(Ar¹ + Ar²) = 0.42

Example 10C

A PC copolymer (PC-10C) was manufactured in the same manner as that in Example 10A except that siloxane modified bisphenol was replaced by 0.2 g of siloxane modified phenol represented by the following formula (4-10C). A mass ratio of an organic siloxane modified phenyl group in the PC copolymer (PC-10C) is 5 mass % based on a total mass of the PC copolymer. n=150 is given in the following formula 4-10C.

[Chemical Formula 109]

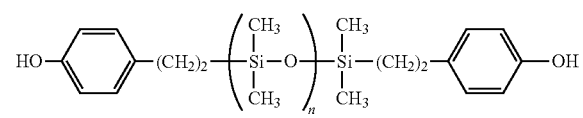
(4-10C)

The PC copolymer (PC-10C) was identified as a PC copolymer having 1.16 dl/g of a reduced viscosity [$\eta_{SP}$/C] and a structure with the following repeating unit and composition in the formula (4-1). A content of diethyl carbamic acid chloride in the PC copolymer was 5 mass ppm.

[Chemical Formula 106]

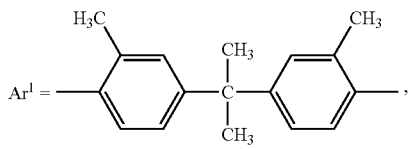

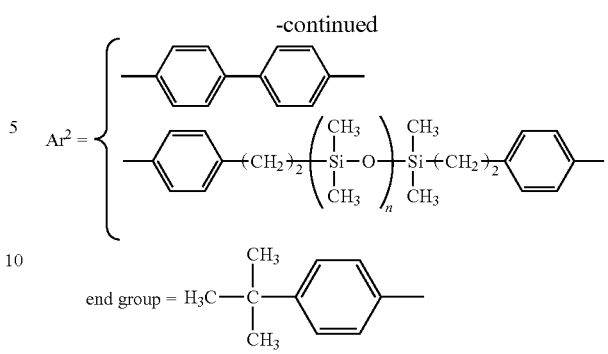

n = 1.38, Ar²/(Ar¹ + Ar²) = 0.42

Example 10D

A PC copolymer (PC-10D) was manufactured in the same manner as that in Example 10A except that siloxane modified bisphenol was replaced by 0.2 g of siloxane modified phenol represented by the following formula (4-10D). A mass ratio of an organic siloxane modified phenyl group in the PC copolymer (PC-10D) is 5 mass % based on a total mass of the PC copolymer. n=60 is given in the following formula 4-10D.

[Chemical Formula 111]

(4-10D)

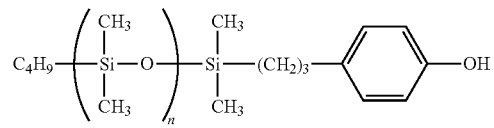

The PC copolymer (PC-10D) was identified as a PC copolymer having 1.16 dl/g of a reduced viscosity [$\eta_{SP}$/C] and a structure with the following repeating unit and composition in the formula (4-1). A content of diethyl carbamic acid chloride in the PC copolymer was 5 mass ppm.

[Chemical Formula 112]

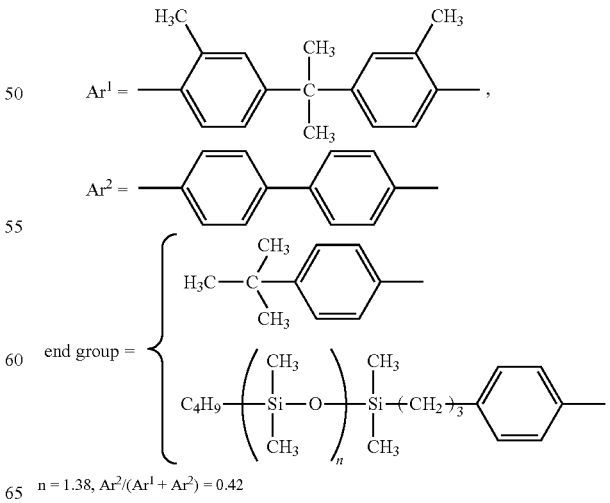

n = 1.38, Ar²/(Ar¹ + Ar²) = 0.42

The PC copolymers obtained in Examples 10A to 10D were further evaluated in terms of a contact angle with water and toner adherability as follows.

Evaluation of Contact Angle with Water

A film was manufactured only by the PC copolymer. A contact angle with ultra-pure water was measured using the film.

DM700 (manufactured by Kyowa Interface Science Co., Ltd) was used as a measuring instrument for measurement of the contact angle.

Evaluation of Toner Adhesiveness

As described above, the electrophotographic photoreceptor was manufactured by using the PC copolymer and evaluated with a commercially available printer (FS-600, manufactured by KYOCERA Corporation.

Specifically, the printer, in which the electrophotographic photoreceptor was mounted on a drum, was repeatedly operated for one hour under ambient temperature and normal humidity (23 degrees C., 50%).

A state where toner was adhered to the electrophotographic photoreceptor in a predetermined central area (a square of 2 cm×2 cm) was visually observed. Evaluation criteria were as follows.

Evaluation Criteria

◎: no adhesion of toner in the evaluated area of the electrophotographic photoreceptor ○: slight adhesion of toner, which was removable by blowing air.

x: adhesion of toner, which was not removable by blowing air.

Comparative Example 1

In Example 1, C-CF (30 mL) was replaced by A-CF (17 mL) of Manufacturing Example 5. The amount of methylene chloride was changed to 43 mL and the amount of PTBP was changed to 0.100 g. 2.8 g of 2,7-dihydroxynaphthalene was replaced by 1.4 g of 4,4'-biphenol. The amount of 2N aqueous sodium hydroxide was changed to 10 mL. The reaction time was changed to three hours. Except for the above, a PC copolymer (PC-6) was manufactured in the same manner as that that in Example 1.

The PC copolymer (PC-6) was identified as a PC copolymer having 0.52 dl/g of a reduced viscosity [$\eta_{SP}/C$] and a structure with the following repeating unit and composition in the formula (4-1).

[Chemical Formula 113]

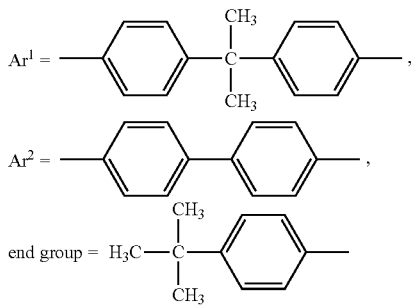

n = 2.30, Ar²/(Ar¹ + Ar²) = 0.30

Comparative Example 2

According to Example 2 of JP-A-5-70582, a PC copolymer (PC-7) having a mass average molecular weight of 60,000 in terms of GPC polystyrene was manufactured as follows.

625 mL of methylene chloride was added to a reactor with a stirrer and a thermometer, to which 35.3 g of bisphenol A bischloroformate was added with stirring for dissolution. 125 mL of ion-exchange water was further added to this solution. Subsequently, a solution obtained by dissolving 18.6 g of biphenol in 228.6 g of 3.5%-aqueous sodium hydroxide was dropped into the above solution at 20 to 25 degrees C. for one hour. After completion of dropping, stirring was continued at the same temperature for four hours. 14.3 g of 28%-aqueous sodium hydroxide was further added and stirring was continued for five hours. When the molecular weight was 60,000 (GPC in terms of polystyrene), stirring was stopped and left still.

The obtained reactant solution was injected into ice water. Deposited crystals obtained by filtration were cleaned with water and dried, followed by recrystallization with acetone, whereby PC-7 was obtained.

A reduced viscosity [$\eta_{SP}/C$] of this PC copolymer was 0.53 dl/g.

Comparative Example 3

A solution prepared by dissolving 1,1-bis(4-hydroxyphenyl)cyclohexane (bisphenol Z) (0.17 kg) and 4,4'-biphenol (0.03 kg) in 1.5 L of 2N aqueous potassium hydroxide was mixed with 1.0 kg of methylene chloride. Then, while the solution was being stirred, phosgene gas was blown into the solution under cooling at 1 L/min until pH of 9 or less was reached. Subsequently, the reaction solution was separated in a stand still manner, and a methylene chloride solution of an oligomer having an organic layer of 2 to 6 polymerization degree and a chloroformate group at its molecular terminal was obtained.

Next, a reactor was attached with a mechanical stirrer, stirring vane and baffle plate. Methylene chloride (34 mL) was added to the above oligomer (26 mL). To this solution, PTBP (0.065 g) was added as a terminal terminator and stirred for sufficient mixing. A biphenol monomer solution was prepared by a monomer-solution preparation method including: preparing 15 mL of 2N aqueous sodium hydroxide; cooling the solution at the room temperature or less; adding 0.02 g of hydrosulphite and 1.2 g of 4,4'-biphenol; and completely dissolving the mixed solution. All amount of the biphenol monomer solution separately prepared as describe above was added to the above PTBP solution. 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.01N hydrochloric acid one time, and with 0.1 L of water three times in this order. The obtained methylene chloride solution was dropped into methanol with stirring. The obtained redeposit was filtered and dried to prepare a PC copolymer (PC-8) with the following structure.

A reduced viscosity [$\eta_{SP}/C$] of PC-8 was 1.10 dl/g. The PC copolymer was found to have a component in which two or more repeating units derived from 4,4' biphenol were connected through a carbonate bonding.

Comparative Example 4

A PC copolymer (PC-9) was manufactured in the same manner as that in Example 10A except that the bisphenol C oligomer (C-CF2) used in Example 10A was replaced by the bisphenol C oligomer (C-CF3) manufactured in Manufacturing Example 7. The PC copolymer (PC-9) has the same structure and the reduced viscosity as the PC copolymer of Example 1. A content of diethyl carbamic acid chloride in the PC copolymer was 110 mass ppm.

Evaluation Result

Table 7 shows evaluation results of Examples 1 to 5 and 10A to 10D and Comparative Examples 1 to 4. When Examples 1 to 5 and 10A to 10D was compared with Comparative Examples 1 to 4, the PC copolymers of Examples 1 to 5 and 10A to 10D were found to have an excellent wear resistance since solubility of the PC copolymers was kept Further, as shown in Table 8, since the divalent organic siloxane modified phenylene group is contained in each PC copolymer in Examples 10A to 10C and the monovalent organic siloxane modified phenyl group is contained in the PC copolymer in Example 10D, the contact angle with water and toner adherability were found to be enhanced in Examples 10A to 10C as compared with Example 1 having no organic siloxane modified phenyl group.

In Table 7, "* impurity content" represents the content of diethyl carbamic acid chloride.

TABLE 7

| | PC copolymer | | | | Electrophotographic Photoreceptor | | |
| --- | --- | --- | --- | --- | --- | --- | --- |
| | Reduced Viscosity (dl/g) | Wear Resistance (mg) | Solubility | *Impurity content (mass ppm) | Wear Resistance (mg) | Initial Residual Potential ($V_R$) | Repeating Residual Potential (increase in $V_R$) |
| Example 1 (PC-1) | 0.55 | 0.58 | ○ | 10 | 1.7 | −10 | 10 |
| Example 2 (PC-2) | 1.17 | 0.3 | ○ | 10 | 0.7 | −10 | 10 |
| Example 3 (PC-3) | 0.53 | 0.52 | ○ | 10 | 1.7 | −10 | 10 |
| Example 4 (PC-4) | 0.5 | 0.6 | ○ | 10 | 1.8 | −10 | 10 |
| Example 5 (PC-5) | 1.12 | 0.51 | ○ | 20 | 0.9 | −10 | 20 |
| Example 10A (PC-10A) | 1.16 | 0.35 | ○ | 5 | 0.4 | −10 | 0 |
| Example 10B (PC-10B) | 1.16 | 0.37 | ○ | 5 | 0.4 | −10 | 0 |
| Example 10C (PC-10C) | 1.16 | 0.36 | ○ | 5 | 0.4 | −10 | 0 |
| Example 10D (PC-10D) | 1.16 | 0.36 | ○ | 5 | 0.4 | −10 | 0 |
| Comparative Example 1 (PC-6) | 0.52 | 0.84 | ○ | — | 3.1 | −10 | 20 |
| Comparative Example 2 (PC-7) | 0.53 | immeasurable | x | — | immeasurable | immeasurable | immeasurable |
| Comparative Example 3 (PC-8) | 1.1 | 0.33 | whitened | — | 0.9 | −100 | 200 |
| Comparative Example 4 (PC-9) | 0.55 | 0.58 | ○ | 110 | 0.8 | −50 | 100 | stable in the organic solvent and a mass reduction of the PC copolymers in wear resistance evaluation was small. Moreover, because of a small value of initial residual potential ($V_R$) and repeating residual potential (increase in $V_R$), the electrophotographic photoreceptors of Examples 1 to 5 and 10A to 10D were found to have excellent wear resistance, electrical characteristics and electrification characteristics.

On the other hand, the electrophotographic photoreceptor of Comparative Example 1 was found to have poor wear resistance because of large mass reduction in the evaluation of wear resistance.

The PC copolymers of Comparative Examples 2 and 3 had poor solubility. Particularly, the PC copolymer of Comparative Example 2 was not dissolved. In Comparative Example 3, the solution was whitened and initial residual potential ($V_R$) and repeating residual potential (increase in $V_R$) of the electrophotographic photoreceptor were large, so that the electrophotographic photoreceptor was found to have poor electrical characteristics and electrification characteristics.

In Examples 1 to 5 and 10A to 10D, the number of cleaning times of bischloroformate was increased, almost no impurity remained in the PC copolymer, resulting in favorable initial residual potential and repeating residual potential. However, in Comparative Example 5, because of a small number of cleaning times of bischloroformate, a lot of impurities remained in the PC copolymer, resulting in poor initial residual potential and repeating residual potential.

TABLE 8

| | Film of PC polymer Contact Angle with Water (degree) | Electrophotograhic Photoreceptor Toner Adherability |
| --- | --- | --- |
| Example 1 (PC-1) | 90 | ○ |
| Example 10A (PC-10A) | 104 | ◉ |
| Example 10B (PC-10B) | 104 | ◉ |
| Example 10C (PC-10C) | 104 | ◉ |
| Example 10D (PC-10D) | 104 | ◉ |

Industrial Applicability

The invention claimed is:

1. A polycarbonate copolymer comprising: a repeating unit represented by a formula (1) below; and a molar copolymer composition represented by $Ar^2/(Ar^1+Ar^2)$ in a range of 25 mol % to 50 mol %,

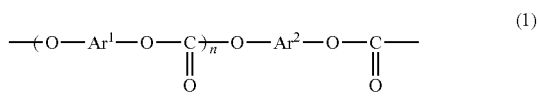

(1)

where: $Ar^1$ and $Ar^2$ represent a divalent aromatic group; a chain end is terminated by a monovalent aromatic group or a monovalent fluorine-containing aliphatic group; n represents an average repeating number of an $Ar^1$ block and is a numeral of 1.0 to 3.0, provided that $Ar^1$ and $Ar^2$ are not the same.

2. The polycarbonate copolymer according to claim 1, wherein
$Ar^1$ is a substituted or unsubstituted phenylene group, a substituted or unsubstituted naphthylene group, or a group having a structure represented by a formula (2) below,

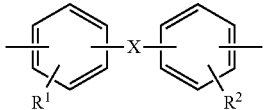
(2)

where: $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms;
$R^1$ and $R^2$ are allowed to be a plurality of groups for a single aromatic ring, in which the plurality of groups are allowed to be the same or different; and
X represents a single bond, —O—, —CO—, —S—, —SO—, —SO$_2$—, —CR$^3$R$^4$— (in which R$^3$ and R$^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a substituted or unsubstituted αω-alkylene group having 2 to 12 carbon atoms, a substituted or unsubstituted 9,9-fluorenylidene group, a 1,8-menthanediyl group, a 2,8-menthanediyl group, a substituted or unsubstituted arylene group having 6 to 12 carbon atoms and a divalent group represented by a formula (3) below,

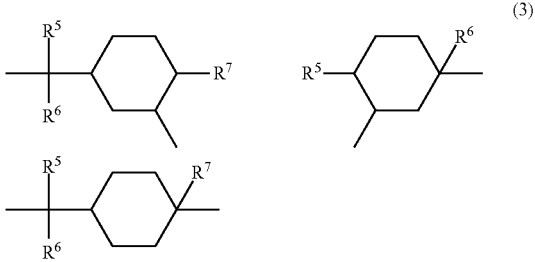
(3)

where: $R^5$ to $R^7$ each represent the same groups for $R^1$ and $R^2$, or a group selected from an alkylidene arylene alkylidene group having 8 to 16 carbon atoms represented by a formula (4) below, and

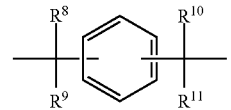
(4)

where: $R^8$ to $R^{11}$ each represent the same groups for $R^1$ and $R^2$.

3. The polycarbonate copolymer according to claim 2, wherein
$Ar^2$ is selected from a substituted or unsubstituted phenylene group, a substituted or unsubstituted naphthylene group, or a group having the same structure as the structure represented by the formula (2) and has a skeleton different from that of $Ar^1$.

4. The polycarbonate copolymer according to claim 1, wherein
the divalent aromatic group for $Ar^2$ further comprises an organic siloxane modified phenylene group and a monovalent aromatic group at a chain end is an organic siloxane modified phenyl group, or
the divalent aromatic group for $Ar^2$ further comprises an organic siloxane modified phenylene group or a monovalent aromatic group at a chain end is an organic siloxane modified phenyl group.

5. The polycarbonate copolymer according to claim 4, wherein
the divalent organic siloxane modified phenylene group is a group represented by a formula (2A) or (2B) below, and
the monovalent organic siloxane modified phenyl group is a group represented by a formula (2C) below,

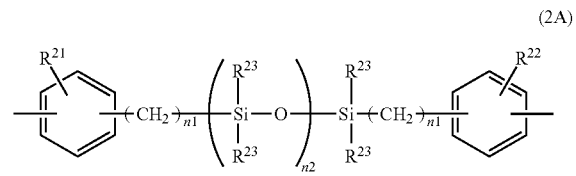
(2A)

where: $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms;
$R^{23}$ independently represents a substituted or unsubstituted alkyl group having 1 to 12 carbon atoms or a substituted or unsubstituted aryl group having 6 to 12 carbon atoms;
n1 is an integer in a range of 2 to 4; and n2 is an integer in a range of 1 to 600,

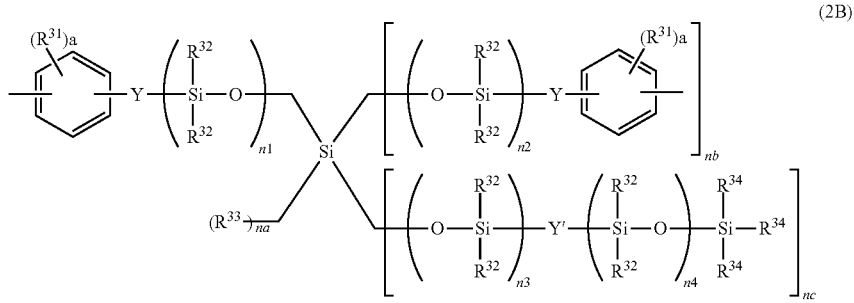
(2B)

where: $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms;

$R^{32}$ independently represents a substituted or unsubstituted alkyl group having 1 to 12 carbon atoms or a substituted or unsubstituted aryl group having 6 to 12 carbon atoms;

$R^{33}$ represents a monovalent hydrocarbon group having no aliphatic unsaturated bond, the monovalent hydrocarbon being the same or different;

$R^{34}$ represents a monovalent hydrocarbon group having no aliphatic unsaturated bond, the monovalent hydrocarbon being the same or different;

Y and Y' are an alkylene group having 2 or more carbon atoms, alkyleneoxyalkylene group or an oxygen atom;

na is 0 or 1, nb is 1 or 2, and nc is 1 or 2, provided that na+nb+nc =3;

n1 to n4 each are an integer in a range of 0 or more, provided a sum of n1, n2, n3 and n4 is an integer in a range of 2 to 600 and a sum of n3 and n4 is an integer in a range of 1 or more; and a is an integer in a range of 0 to 4,

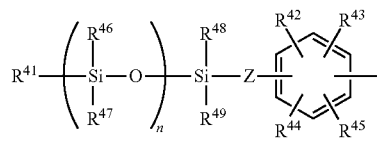
(2C)

where: Z is a hydrocarbon group having 2 to 6 carbon atoms;

$R^{41}$ represents an aliphatic hydrocarbon group having 1 to 6 carbon atoms;

$R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms;

$R^{46}$ to $R^{49}$ independently represent a substituted or unsubstituted alkyl group having 1 to 12 carbon atoms and a substituted or unsubstituted aryl group having 6 to 12 carbon atoms; and n is an integer in a range of 2 to 600 and represents an average number of repeating units in case of molecular weight distribution.

6. The polycarbonate copolymer according to claim 1, wherein an ingredient for the polycarbonate copolymer is a bischloroformate oligomer represented by a formula (5) below and the bischloroformate oligomer has an average number of repeating units (n') in a range of 1.0 to 1.99

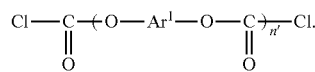
(5)

7. The polycarbonate copolymer according to claim 6, wherein when an amido compound is contained in the ingredient comprising bischloroformate oligomer represented by the formula (5), a content of the amido compound is determined based on a mass of nitrogen atoms contained in the ingredient comprising the bischloroformate oligomer and is 700 mass ppm or less based on a total mass of the ingredient comprising the bischloroformate oligomer except for a solvent.

8. The polycarbonate copolymer according to claim 1, wherein when the polycarbonate copolymer comprises dialkylcarbamate chloride, a content of dialkylcarbamate chloride is 100 mass ppm or less based on a total mass of the polycarbonate copolymer.

9. A coating liquid comprising: the polycarbonate copolymer according to claim 1; and an organic solvent.

10. An electrophotographic photoreceptor comprising a conductive substrate and a photosensitive layer on the conductive substrate, the photosensitive layer comprising the polycarbonate copolymer according to claim 1 as an ingredient.

11. A polycarbonate copolymer comprising: a repeating unit represented by a formula (1) below; and a molar copolymer composition represented by $Ar^2/(Ar^1 +Ar^2)$ in a range of 25 mol % to 47 mol %,

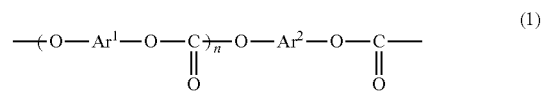
(1)

where: $Ar^1$ is a group represented by a formula (2) below; $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane; and n is an average repeating number of an $Ar^1$ block and represents a numeral of 1.09 to 3.00,

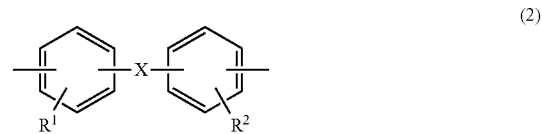
(2)

where: $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms;

$R^1$ and $R^2$ are allowed to be a plurality of groups for a single aromatic ring, in which the plurality of groups are allowed to be the same or different; and X represents a substituted or unsubstituted cycloalkylidene group having 5 to 20 carbon atoms, a substituted or unsubstituted bicyclo- or tricyclo-hydrocarbon-diyl group having 5 to 20 carbon atoms, or a group represented by a formula (3) below,

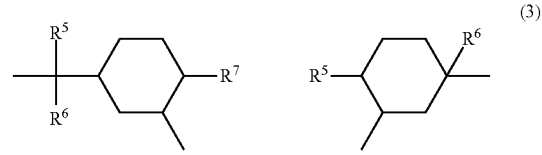
(3)

129

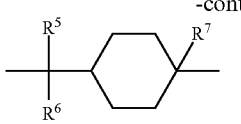

-continued where: $R^5$ to $R^7$ each independently represent a hydrogen atom, an alkyl group having 1 to 12 carbon atoms, a trifluoromethyl group or a substituted or unsubstituted aryl group having 6 to 12 carbon atoms.

12. The polycarbonate copolymer according to claim 11, further comprising: a divalent organic siloxane modified phenylene group for $Ar^2$.

13. The polycarbonate copolymer according to claim 12, wherein
the divalent organic siloxane modified phenylene group is a group represented by a formula (2A) or (2B) below,

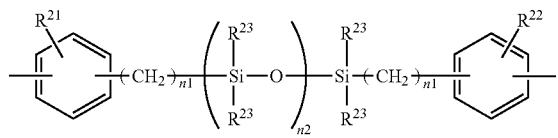

(2A)

where: $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms;
$R^{23}$ independently represents a substituted or unsubstituted alkyl group having 1 to 12 carbon atoms or a substituted or unsubstituted aryl group having 6 to 12 carbon atoms;
n1 is an integer in a range of 2 to 4; and
n2 is an integer in a range of 1 to 600,

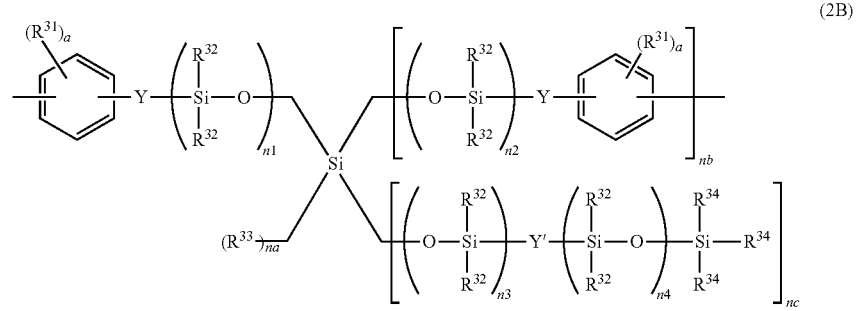

(2B)

where: $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms;
$R^{32}$ independently represents a substituted or unsubstituted alkyl group having 1 to 12 carbon atoms or a substituted or unsubstituted aryl group having 6 to 12 carbon atoms;
$R^{33}$ represents a monovalent hydrocarbon group having no aliphatic unsaturated bond, the monovalent hydrocarbon being the same or different;
$R^{34}$ represents a monovalent hydrocarbon group having no aliphatic unsaturated bond, the monovalent hydrocarbon being the same or different;

130

Y and Y' are an alkylene group having 2 or more carbon atoms, alkyleneoxyalkylene group or an oxygen atom;
na is 0 or 1, nb is 1 or 2, and nc is 1 or 2, provided that na+nb+nc =3;
n1 to n4 each are an integer in a range of 0 or more, provided that a sum of n1, n2, n3 and n4 is an integer in a range of 2 to 600, and a sum of n3 and n4 is an integer in a range of 1 or more; and
a is an integer in a range of 0 to 4.

14. The polycarbonate copolymer according to claim 11, wherein
a chain end is terminated by a monovalent aromatic group or a monovalent fluorine-containing aliphatic group.

15. The polycarbonate copolymer according to claim 14, wherein the monovalent aromatic group at a chain end is a monovalent organic siloxane modified phenyl group.

16. The polycarbonate copolymer according to claim 15, wherein
the monovalent organic siloxane modified phenyl group is a group represented by a formula (2C) below,

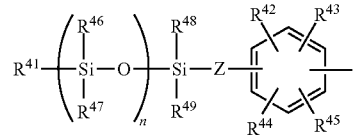

(2C)

where: Z is a hydrocarbon group having 2 to 6 carbon atoms;
$R^{41}$ represents an aliphatic hydrocarbon group having 1 to 6 carbon atoms;
$R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms;
$R^{46}$ to $R^{49}$ independently represent a substituted or unsubstituted alkyl group having 1 to 12 carbon atoms and a substituted or unsubstituted aryl group having 6 to 12 carbon atoms; and
n is an integer in a range of 2 to 600 and represents an average number of repeating units in case of molecular weight distribution.

17. The polycarbonate copolymer according to claim 11, wherein
an ingredient for the polycarbonate copolymer is a bischloroformate oligomer represented by a formula (4) below and the bischloroformate oligomer has an average number of repeating units (n') in a range of 1.0 to 1.99

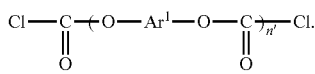
(4)

18. The polycarbonate copolymer according to claim 11, wherein
$Ar^1$ represented by the formula (2) is a divalent group induced from a group selected from 1,1-bis(4-hydroxyphenyl)cyclohexane, 1,1-bis(4-hydroxyphenyl)cyclopentane, 1,1-bis(4-hydroxyphenyl)cyclododecane, 2,2-bis(4-hydroxyphenyl)adamantane, 1,3-bis(4-hydroxyphenyl) adamantane, 1,1-bis(4-hydroxyphenyl)-3,3,5-trimethylcyclohexane, and the group represented by the formula (3).

19. The polycarbonate copolymer according to claim 17, wherein
when an amido compound is contained in the ingredient comprising bischloroformate oligomer represented by the formula (4), a content of the amido compound is determined based on a mass of nitrogen atoms contained in the ingredient comprising the bischloroformate oligomer and is 700 mass ppm or less based on a total mass of the ingredient comprising the bischloroformate oligomer except for a solvent.

20. The polycarbonate copolymer according to claim 11, wherein
when the polycarbonate copolymer comprises dialkylcarbamate chloride, a content of dialkylcarbamate chloride is 100 mass ppm or less based on a total mass of the polycarbonate copolymer.

21. A coating liquid comprising: the polycarbonate copolymer according to claim 11; and an organic solvent.

22. An electrophotographic photoreceptor comprising a conductive substrate and a photosensitive layer on the conductive substrate, the photosensitive layer comprising the polycarbonate copolymer according to claim 11 as an ingredient.

23. A polycarbonate copolymer comprising: a repeating unit represented by a formula (1) below; and a molar copolymer composition represented by $Ar^2/(Ar^1+Ar^2)$ in a range of 25 mol % to 47 mol %,

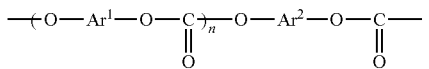
(1)

where: $Ar^1$ is a group represented by a formula (2) below; $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane; and n is an average repeating number of an $Ar^1$ block and represents a numeral of 1.09 to 3.00,

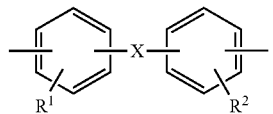
(2)

where: $R^1$ and $R^2$ each represent a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms and a substituted or unsubstituted aryloxy group having 6 to 12 carbon atoms;
$R^1$ and $R^2$ are allowed to be a plurality of groups for a single aromatic ring, in which the plurality of groups are allowed to be the same or different; and X represents a bonding group represented by —$CR^3R^4$— in which $R^3$ to $R^4$ each independently represent a hydrogen atom, an alkyl group having 1 to 12 carbon atoms, a trifluoromethyl group or a substituted or unsubstituted aryl group having 6 to 12 carbon atoms, provided that $R^3$ and $R^4$ are not the same.

24. The polycarbonate copolymer according to claim 23, further comprising:
a divalent organic siloxane modified phenylene group for $Ar^2$.

25. The polycarbonate copolymer according to claim 24, wherein
the divalent organic siloxane modified phenylene group is a group represented by a formula (2A) or (2B) below,

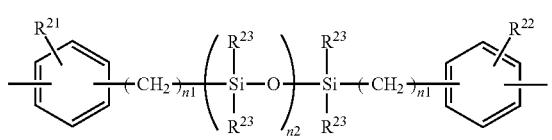
(2A)

where: $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms; $R^{23}$ independently represents a substituted or unsubstituted alkyl group having 1 to 12 carbon atoms or a substituted or unsubstituted aryl group having 6 to 12 carbon atoms; and n1 is an integer in a range of 2 to 4 and n2 is an integer in a range of 1 to 600,

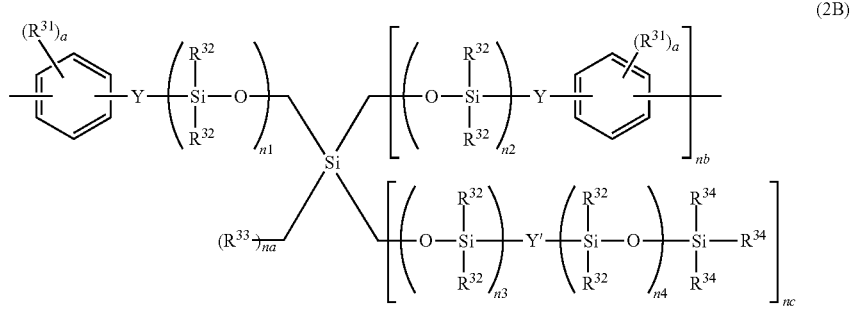
(2B)

where: $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms; $R^{32}$ independently represents a substituted or unsubstituted alkyl group having 1 to 12 carbon atoms or a substituted or unsubstituted aryl group having 6 to 12 carbon atoms; $R^{33}$ represents a monovalent hydrocarbon group having no aliphatic unsaturated bond, the monovalent hydrocarbon being the same or different; $R^{34}$ represents a monovalent hydrocarbon group having no aliphatic unsaturated bond, the monovalent hydrocarbon being the same or different; Y and Y' are an alkylene group having 2 or more carbon atoms, alkyleneoxyalkylene group or an oxygen atom; na is 0 or 1, nb is 1 or 2, and nc is 1 or 2, provided that na+nb+nc =3; n1 to n4 each are an integer in a range of 0 or more, provided that a sum of n1, n2, n3 and n4 is an integer in a range of 2 to 600 and a sum of n3 and n4 is an integer in a range of 1 or more; and a is an integer in a range of 0 to 4.

26. The polycarbonate copolymer according to claim 23, a chain end is terminated by a monovalent aromatic group or a monovalent fluorine-containing aliphatic group.

27. The polycarbonate copolymer according to claim 26, the monovalent aromatic group at the chain end is a monovalent organic siloxane modified phenyl group.

28. The polycarbonate copolymer according to claim 27, the monovalent organic siloxane modified phenyl group is a group represented by a formula (2C) below,

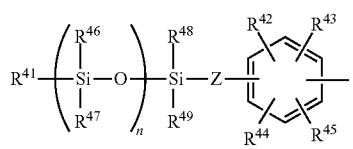

(2C)

where: Z is a hydrocarbon group having 2 to 6 carbon atoms; $R^{41}$ represents an aliphatic hydrocarbon group having 1 to 6 carbon atoms; $R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms; $R^{46}$ to $R^{49}$ independently represent a substituted or unsubstituted alkyl group having 1 to 12 carbon atoms and a substituted or unsubstituted aryl group having 6 to 12 carbon atoms; n is an integer in a range of 2 to 600 and represents an average repeating unit number in case of molecular weight distribution.

29. The polycarbonate copolymer according to claim 23, wherein
an ingredient for the polycarbonate copolymer is a bischloroformate oligomer represented by a formula (3) below and the bischloroformate oligomer has an average number of repeating units (n') in a range of 1.0 to 1.99

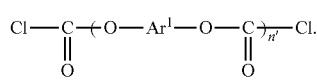

(3)

30. The polycarbonate copolymer according to claim 23, $Ar^1$ represented by the formula (2) is a divalent group induced from a compound selected from 1,1-bis(3-methyl-4-hydroxyphenyl)ethane, 1,1-bis(4-hydroxyphenyl)ethane, 2,2-bis(3-methyl-4-hydroxyphenyl)butane, 2,2-bis(4-hydroxyphenyl)butane, 1,1-bis(4-hydroxyphenyl)-1-phenylethane, and 1,1-bis(4-hydroxyphenyl)-1-phenylmethane.

31. The polycarbonate copolymer according to claim 29, when an amido compound is contained in the ingredient including bischloroformate oligomer represented by the formula (3), a content of the amido compound is determined based on a mass of nitrogen atoms contained in the ingredient comprising the bischloroformate oligomer and is 700 mass ppm or less based on a total mass of the ingredient comprising the bischloroformate oligomer except for a solvent.

32. The polycarbonate copolymer according to claim 23, when the polycarbonate copolymer comprises dialkylcarbamate chloride, a content of dialkylcarbamate chloride is 100 mass ppm or less based on a total mass of the polycarbonate copolymer.

33. A coating liquid comprising: the polycarbonate copolymer according to claim 23; and an organic solvent.

34. An electrophotographic photoreceptor comprising a conductive substrate and a photosensitive layer on the conductive substrate, the photosensitive layer comprising the polycarbonate copolymer according to claim 23 as an ingredient.

35. A polycarbonate copolymer comprising: a repeating unit represented by a formula (1) below; and a molar copolymer composition represented by $Ar^2/(Ar^1+Ar^2)$ in a range of 25 mol % to 47 mol %,

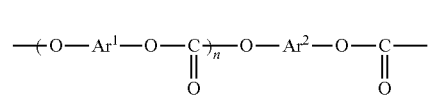

(1)

where: $A^1$ is a group represented by a formula (2) below; $Ar^2$ is a divalent group induced from a substituted or unsubstituted biphenol, dihydroxynaphthalene, hydroquinone, resorcin, catechol, 9,9-bis(hydroxyphenyl)fluorene or 4,4'-dihydroxydiphenylmethane; and n is an average repeating number of an $Ar^1$ block and represents a numeral of 1.09 to 3.00,

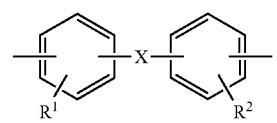

(2)

where: $R^1$ and $R^2$ each represent a hydrogen atom, a halogen atom, an alkyl group having 1 to 12 carbon atoms or a substituted or unsubstituted aryl group having 6 to 12 carbon atoms;
$R^1$ and $R^2$ are allowed to be a plurality of groups for a single aromatic ring, in which the plurality of groups are allowed to be the same or different, provided that not all of $R^1$ and $R^2$ are hydrogen atoms; and
X is —$CR^3R^4$—(in which $R^3$ and $R^4$ each independently are a hydrogen atom, an alkyl group having 1 to 12 carbon atoms, a trifluoromethyl group or a substituted or unsubstituted aryl group having 6 to 12 carbon atoms), a substituted or unsubstituted cycloalkylidene group having 5 to 20 carbon atoms, a substituted or unsubstituted bicyclo- or tricyclo-hydrocarbon-diyl group having 5 to 20 carbon atoms, a 1,8-menthanediyl group, a 2,8-menthanediyl group, a substituted or unsubstituted αω-alkylene group having 2 to 12 carbon atoms.

36. The polycarbonate copolymer according to claim 35, further comprising: a divalent organic siloxane modified phenylene group for $Ar^2$.

37. The polycarbonate copolymer according to claim 36, wherein
the divalent organic siloxane modified phenylene group is a group represented by a formula (2A) or (2B) below,

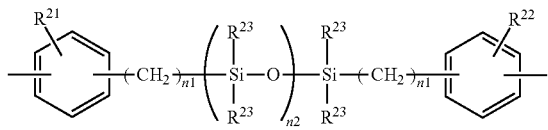
(2A)

where: $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms;
$R^{23}$ independently represents a substituted or unsubstituted alkyl group having 1 to 12 carbon atoms or a substituted or unsubstituted aryl group having 6 to 12 carbon atoms;
n1 is an integer in a range of 2 to 4; and n2 is an integer in a range of 1 to 600,

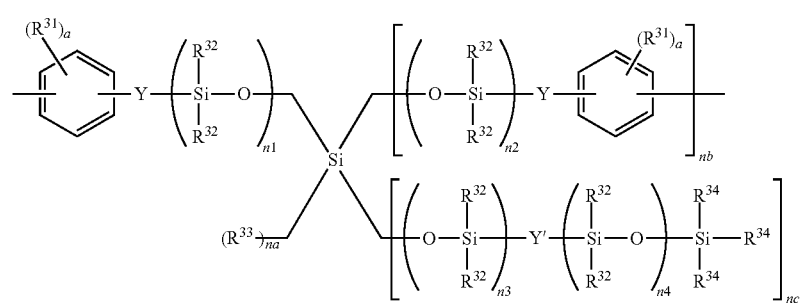
(2B)

where: $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms;
$R^{32}$ independently represents a substituted or unsubstituted alkyl group having 1 to 12 carbon atoms or a substituted or unsubstituted aryl group having 6 to 12 carbon atoms;
$R^{33}$ represents a monovalent hydrocarbon group having no aliphatic unsaturated bond, the monovalent hydrocarbon being the same or different;
$R^{34}$ represents a monovalent hydrocarbon group having no aliphatic unsaturated bond, the monovalent hydrocarbon being the same or different;
Y and Y' are an alkylene group having 2 or more carbon atoms, alkyleneoxyalkylene group or an oxygen atom;
na is 0 or 1, nb is 1 or 2, and nc is 1 or 2, provided that na+nb+nc =3;
n1 to n4 each are an integer in a range of 0 or more, provided a sum of n1, n2, n3 and n4 is an integer in a range of 2 to 600 and a sum of n3 and n4 is an integer in a range of 1 or more; and
a is an integer in a range of 0 to 4.

38. The polycarbonate copolymer according to claim 35, a chain end is terminated by a monovalent aromatic group or a monovalent fluorine-containing aliphatic group.

39. The polycarbonate copolymer according to claim 38, the monovalent aromatic group at the chain end is a monovalent organic siloxane modified phenyl group.

40. The polycarbonate copolymer according to claim 39, the monovalent organic siloxane modified phenyl group is a group represented by a formula (2C) below,

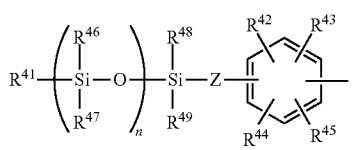
(2C)

where: Z is a hydrocarbon group having 2 to 6 carbon atoms; $R^{41}$ represents an aliphatic hydrocarbon group having 1 to 6 carbon atoms; $R^{42}$ to $R^{45}$ independently represent a hydrogen atom, a substituted or unsubstituted alkyl group having 1 to 12 carbon atoms, a substituted or unsubstituted alkoxy group having 1 to 12 carbon atoms and a substituted or unsubstituted aryl group having 6 to 12 carbon atoms; $R^{46}$ to $R^{49}$ independently represent a substituted or unsubstituted alkyl group having 1 to 12 carbon atoms and a substituted or unsubstituted aryl group having 6 to 12 carbon atoms; n is an integer in a range of 2 to 600 and represents an average repeating unit number in case of molecular weight distribution.

41. The polycarbonate copolymer according to claim 35, wherein
an ingredient for the polycarbonate copolymer is a bischloroformate oligomer Represented by a formula (3) below and the bischloroformate oligomer has an average number of repeating units (n') in a range of 1.0 to 1.99

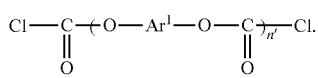
(3)

42. The polycarbonate copolymer according to claim 35, wherein
$Ar^1$ represented by the formula (2) is a divalent group induced from a compound selected from 1,1-bis(3-methyl-4-hydroxyphenyl)ethane, 2,2-bis(3-methyl-4-hydroxyphenyl) butane, 2,2-bis(3-methyl-4-hydroxyphenyl)propane, 2,2-bis(3-phenyl-4-hydroxyphenyl)

propane, 1,1-bis(3-methyl-4-hydroxyphenyl)cyclohexane, and 1,1-bis(3-methyl-4-hydroxyphenyl)cyclopentane.

43. The polycarbonate copolymer according to claim 41, wherein
when an amido compound is contained in the ingredient comprising bischloroformate oligomer represented by the formula (3),
a content of the amido compound is determined based on a mass of nitrogen atoms contained in the ingredient comprising the bischloroformate oligomer and is 700 mass ppm or less based on a total mass of the ingredient comprising the bischloroformate oligomer except for a solvent.

44. The polycarbonate copolymer according to claim 35, wherein
when the polycarbonate copolymer comprises dialkylcarbamate chloride,
a content of dialkylcarbamate chloride is 100 mass ppm or less based on a total mass of the polycarbonate copolymer.

45. A coating liquid comprising: the polycarbonate copolymer according to claim 35; and an organic solvent.

46. An electrophotographic photoreceptor comprising a conductive substrate and a photosensitive layer on the conductive substrate, the photosensitive layer comprising
the polycarbonate copolymer according to claim 35 as an ingredient.

* * * * *